(12) United States Patent
Nakamura et al.

(10) Patent No.: US 6,899,741 B2
(45) Date of Patent: May 31, 2005

(54) FUEL EVAPORATOR

(75) Inventors: Masahito Nakamura, Saitama (JP); Naoyuki Abe, Saitama (JP); Kiyoshi Kasahara, Saitama (JP); Takahiro Tachihara, Saitama (JP)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 890 days.

(21) Appl. No.: 09/740,994

(22) Filed: Dec. 21, 2000

(65) Prior Publication Data

US 2001/0014301 A1 Aug. 16, 2001

(30) Foreign Application Priority Data

Dec. 21, 1999 (JP) ............................................ 11-363479
Dec. 21, 1999 (JP) ............................................ 11-363481
Dec. 21, 1999 (JP) ............................................ 11-363482

(51) Int. Cl.$^7$ ............................................. H01M 8/06
(52) U.S. Cl. ........................... 48/61; 48/127.7; 429/26; 261/79.2; 261/155; 165/115; 422/200
(58) Field of Search ............................... 429/20, 26, 12; 261/155, 79.2; 165/115; 422/200; 48/127.7, 61

(56) References Cited

U.S. PATENT DOCUMENTS

| | | | |
|---|---|---|---|
| 6,536,748 B1 | * | 3/2003 | Tachihara et al. ........... 261/79.2 |
| 6,550,532 B1 | * | 4/2003 | Nakamura et al. .......... 165/115 |
| 6,617,067 B1 | * | 9/2003 | Tachihara et al. ............ 429/20 |

FOREIGN PATENT DOCUMENTS

| | | | |
|---|---|---|---|
| EP | 1 160 902 | * | 12/2001 |
| JP | 2001-650424 | * | 12/1999 |
| JP | A-2000-319002 | | 11/2000 |
| JP | 2002231279 | * | 8/2002 |

* cited by examiner

*Primary Examiner*—N. Bhat
(74) *Attorney, Agent, or Firm*—Arent Fox PLLC

(57) ABSTRACT

A fuel evaporator composed of an evaporation chamber which evaporates a raw liquid fuel by a high temperature thermal medium to provide a raw fuel gas is disclosed. The evaporation chamber comprises a plurality of evaporation chambers serially connected to each other in a ventilation manner, and at least one raw liquid fuel injector for injecting the raw liquid fuel being provided on each of said plurality of evaporation chambers.

22 Claims, 38 Drawing Sheets

FIG.8
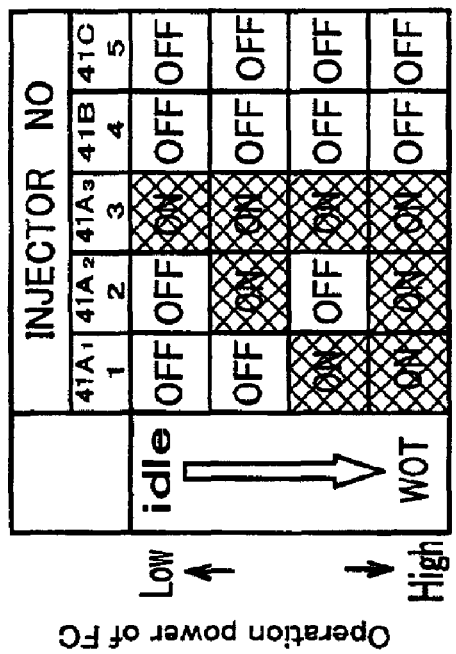
(b)
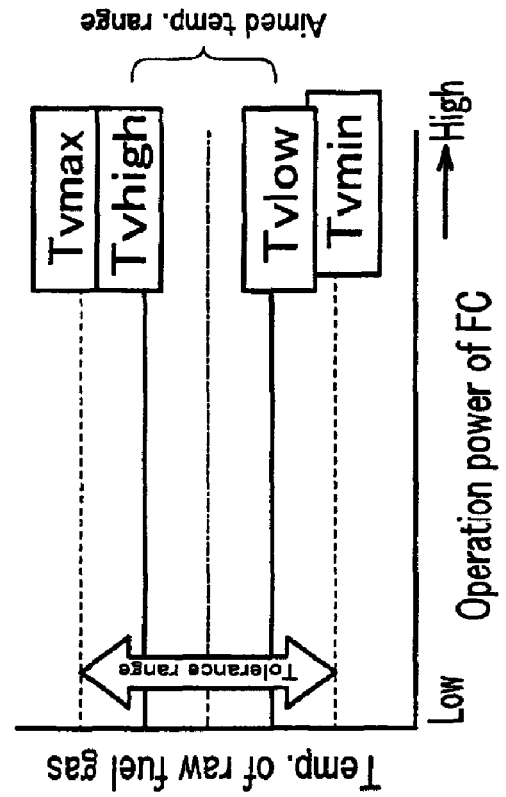
(a)

Acceleration

Controlled by Diluted Air

Stationary

Acceleration

FIG.30
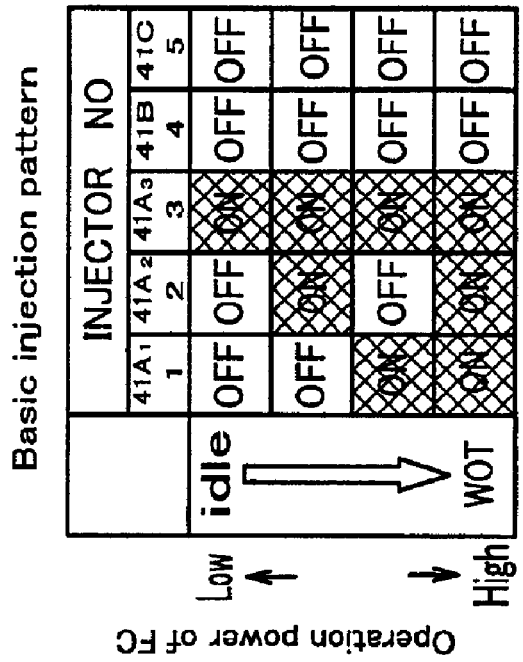
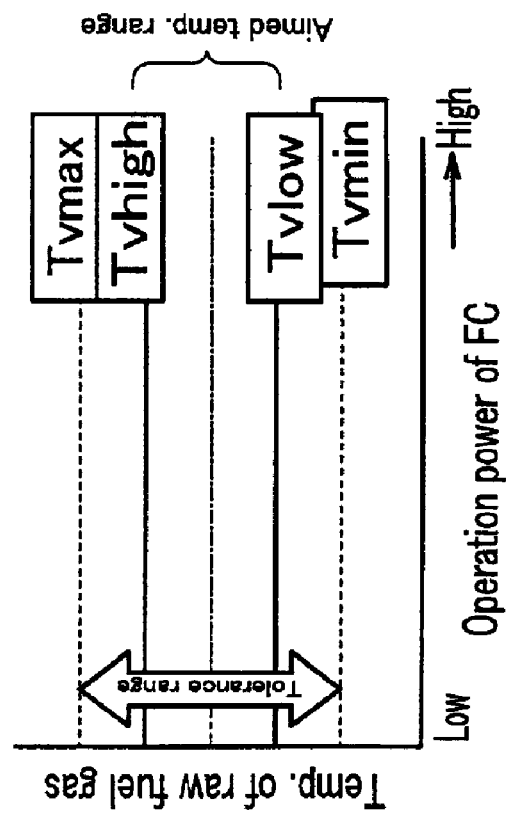

Stationary

Acceleration

Controlled by bypassing

Controlled by Diluted Air

# FUEL EVAPORATOR

FIELD OF THE INVENTION

The present invention relates to a fuel evaporator which can be suitably utilized in a fuel cell system in which a raw fuel gas produced by evaporating a raw liquid fuel is reformed in a reformer, and then supplied to a fuel cell to generate electricity.

BACKGROUND ARTS

A fuel cell system has hitherto been known in which a raw liquid fuel composed of a mixture of methanol with water is injected into a fuel cell evaporator (evaporation chamber) through a raw liquid raw fuel gas injection apparatus to evaporate the raw liquid fuel to thereby produce a raw fuel gas, the resulting raw fuel gas is reformed in a reformer and carbon monoxide contained therein is removed to prepare a raw fuel gas which is a hydrogen enriched gas, and the hydrogen-enriched raw fuel gas is supplied to the fuel cell to generate electricity. Meanwhile, in the case where the fuel cell system constructed as described above is utilized under the conditions that change in the load is extremely large, e.g., in the case of the fuel cell system carried on a fuel cell electric vehicle, if the raw liquid fuel is sharply injected within the fuel evaporator in order to meet the requirement of increasing the operating power, all of the raw liquid fuel cannot be evaporated, sometimes causing residence of the raw liquid fuel (hereinafter referred to as "liquid residence") in the fuel evaporator. Similarly, the liquid residence easily occurs if the fuel evaporator is not sufficiently heated due to the lacking of the heat value used for in evaporation, for example, at the time of starting the fuel cell system.

When the liquid residence is generated, the liquid residence, which sustained within the fuel evaporator, is evaporated even if the injection of the raw liquid fuel is stopped, generating the raw fuel gas. This unduly results in changing the response of the fuel evaporator for the worse. In the case where the raw liquid fuel is made of a mixture, among the resulting liquid residence, the components is evaporated in the order of easiness of the evaporation and, thus, there causes unevenness in the gas compositions of the raw fuel gas. This sometimes causes the situation where the reformer does not exhibit its performance sufficiently or the situation where carbon dioxide cannot be sufficiently removed, decreasing the performance of the fuel cell.

In light of such a situation, for the purpose of attaining good response of the fuel evaporator in order to effectively prevent the generation of the liquid residence and, at the same time, for the purpose of quickly warming up the fuel evaporator, our Japanese Patent Application No. 11-125366 (not disclosed) suggests, a fuel evaporator 100, as shown in FIG. 38. This fuel evaporator 100 is composed of a body 110 of the fuel evaporator and a superheating portion 150 residing at the downstream of the body 110 of the fuel evaporator, and a raw fuel injection apparatus 140 provided on the upper portion of the body 10.

Into this fuel evaporator 100, is supplied a combustion gas HG (high temperature thermal medium) obtained by catalytically combusting a hydrogen-containing off gas, which is generated in the fuel cell (not shown), in a catalytic combustor (not shown) as a heat source. The combustion gas HG enters from an inlet $112_{in}$, and is passed through the inside of a plurality of U-shaped tubes 112 for thermal medium (referred to as thermal medium tubes) provided in a evaporation chamber 111 within the body 110 of the fuel evaporator to reach an outlet $112_{out}$. Subsequently, the combustion gas HG is passed through a combustion gas passage 113 provided on the lower portion of the body 110 of the fuel evaporator, and introduced into the superheating portion 150 provided downstream of the body 110 of the fuel evaporator. The raw liquid fuel FL composed of a mixture of methanol with water is injected from the raw liquid fuel injector 140 in the state of mist, is heated on the thermal medium tubes 112 and is evaporated to be the raw fuel gas FG. The raw fuel gas FG is passed through the interior of evaporation tube 151 provided within the superheating portion 150 to be superheated and then introduced into a reformer (not shown) residing at the downstream of the superheating portion 150.

In this fuel evaporator 100, the lower surface 111b of the evaporation chamber 111 in the body 110 of the fuel evaporator also serves as the upper surface 113t of the combustion gas passage 113. Consequently, since heat is also supplied from the lower surface 111b of the evaporation chamber 111, the generation of the liquid residence is prevented and, even if the liquid residence occurs, the liquid can be quickly evaporated. Accordingly, the fuel evaporator 110 is of good response. Also, the warming up of the fuel evaporator 110 can be conducted in a quick manner.

However, the combustion gas HG, which is a heat source of the conventional fuel evaporator 100 is changed depending upon the operation conditions of the fuel cell and, thus, it is required that a required amount of the raw liquid fuel FL should be evaporated using heat of combusting hydrogen and then is supplied to the reactor. However, there is a problem that the situations of the evaporation in the evaporation chamber 111 (e.g., generation of liquid residence) and the temperature of the raw fuel gas FG are changed by various factors such as the change in the heating value supplied (change in the operation conditions), heat mass of the fuel evaporator itself, and change in atmospheric temperature.

In the case where the fuel cell system is carried on an fuel cell/electric automobile, it is required for the fuel evaporator that the raw liquid fuel is quickly evaporated at the time of starting the system or of sharply changing the load, i.e., the raw fuel gas is obtained with much better response. Furthermore, it is desired for driving the reformer under good conditions that the raw fuel gas is supplied at an appropriate temperature without unevenness of the temperature. In addition, if the raw fuel gas having an appropriate temperature range is obtained at the time of heavy load state, the conventional fuel evaporator has a problem that the temperature of the raw fuel gas under middle or low load conditions becomes unduly high.

SUMMARY OF THE INVENTION

An object of the present invention is, therefore, to provide a fuel evaporator, which can secure sufficient response to a sharp change in the load, which can supply a raw fuel gas at an appropriate temperature into the later reformer, and which can satisfy high requirements of the fuel cell system for carrying a fuel cell/electric automobile.

According to the first aspect of the present invention, there is provided a fuel evaporator composed of an evaporation chamber which evaporates a raw liquid fuel by a high temperature thermal medium to provide a raw fuel gas, said evaporation chamber comprising a plurality of evaporation chambers serially connected to each other in a ventilation manner, and at least one raw liquid fuel injector for injecting said raw liquid fuel being provided on each of said plurality of evaporation chambers.

In this embodiment, it is preferred that a plurality of the raw fuel injector are provided on any one of said plurality of evaporation chambers.

In this embodiment, it is also preferable that the fuel evaporator further comprises a controller for said raw liquid fuel injector, which, upon receiving a signal for the requirement of said raw fuel gas, selects the raw liquid fuel injector or injectors from which the raw liquid fuel is injected.

Also, it is preferable for the fuel evaporator according to this embodiment to have a heat receiving portion for receiving the heat from the heat source, which generates said high temperature thermal medium, provided near the bottom of one of said evaporation chamber, and to have a slope downward to said heat receiving portion provided on the bottom of another evaporation chamber or chambers.

In this specific embodiment, it is further preferable that one of said evaporation chambers is formed so that the thermal conductive area thereof is larger than that or those of another evaporation chamber or chambers, and said heat receiving portion is provided on the bottom of said evaporation chamber having a larger thermal conductive area.

According to another first aspect of the present invention, there is provided a fuel evaporator composed of an evaporation chamber which evaporates a raw liquid fuel by a high temperature thermal medium to provide a raw fuel gas, said evaporation chamber comprising a plurality of evaporation chambers serially connected to each other in a ventilation manner, a chamber for controlling a gas temperature, which controls the temperature of the raw fuel gas transferred from said evaporation chamber by means of heat-exchange with said high temperature thermal medium, and at least one raw liquid fuel injector for injecting said raw liquid fuel being provided on each of said plurality of evaporation chambers.

In this embodiment, it is preferable that the fuel evaporator further comprises: at least one thermo sensor, which detects the temperature within any of said evaporation chambers; and a controller for said raw liquid fuel injector, which, upon receiving a signal for the requirement of said raw fuel gas, selects the raw liquid fuel injector or injectors from which the raw liquid fuel is injected.

In this embodiment, it is also preferable that fuel evaporator further comprises: a low temperature thermal medium inlet, which mix the high temperature thermal medium introduced into said chamber for controlling the gas temperature with a low temperature thermal medium, a low temperature thermal medium passage, and a valve for supplying said low temperature thermal medium; and a controller which controls the opening degree of said valve for supplying said low temperature thermal medium.

Alternative to or in combination with the former preferred embodiment, it is also preferable that fuel evaporator further comprises: a bypass channel, which withdraws and bypasses the high temperature thermal medium to be introduced into said chamber for controlling the gas temperature, and a bypass valve; and a bypass controller which controls the opening degree of said bypass valve.

According to the second aspect of the present invention, there is provided a fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature; a bypass channel, which is communicated with said passage for the high temperature thermal medium, and which discharge said high temperature thermal medium bypassing said chamber for controlling the gas temperature, and a bypass valve; and a bypass controller which controls the opening degree of said bypass valve.

Alternatively, according to the second aspect of the present invention, there is provided a fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature;

a passage for a low temperature thermal medium, which is connected to said passage for the high temperature thermal medium, and which mixes a low temperature thermal medium having a temperature lower than that of said high temperature thermal medium with said high temperature thermal medium, a low temperature thermal medium inlet and a valve for supplying said low temperature thermal medium; and a controller which controls the opening degree of said valve for supplying said low temperature thermal medium.

Also, according to the second aspect of the present invention, there is provided a fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature; a bypass channel, which is communicated with said passage for the high temperature thermal medium, and which discharge said high temperature thermal medium bypassing said chamber for controlling the gas temperature, and a bypass valve; a bypass controller which controls the opening degree of said bypass valve; a passage for a low temperature thermal medium, which is connected to said passage for the high temperature thermal medium, and which mixes a low temperature thermal medium having a temperature lower than that of said high temperature thermal medium with said high temperature thermal medium, a low temperature thermal medium inlet and a valve for supplying said low temperature thermal medium; and a controller which controls the opening degree of said valve for supplying said low temperature thermal medium.

Also included in the present invention is a process for injecting a raw liquid fuel from a plurality of a raw liquid fuel injector provided on a fuel evaporator from the outlet of vapor to the inner part toward a plurality of heat sources provided the fuel evaporator from the outlet of vapor to the inner part to evaporate the raw liquid fuel; which comprises:

a step for injecting the raw liquid fuel from the raw liquid fuel injector or injectors near the outlet of the vapor, when a required amount of evaporating the raw liquid fuel is relatively small; and a step for injecting the raw liquid fuel from the liquid fuel injector or injectors far from the outlet of the vapor in addition to the injector or injectors near the outlet of the vapor, according to increase in the required amount of evaporating the raw liquid fuel.

Further more the present invention relates to a process for injecting a raw liquid fuel from a plurality of a raw liquid fuel injectors provided on a fuel evaporator from the outlet of vapor to the inner part toward a plurality of heat sources provided the fuel evaporator from the outlet of vapor to the inner part to evaporate the raw liquid fuel; which comprises:

setting at least one raw liquid fuel injector, which is not actuated at the stationary operation to set at least one corresponding empty burned heat source, while injecting the raw liquid fuel from other raw liquid fuel injector or injectors; and injecting the liquid fuel from said raw liquid fuel injector, which is not actuated at the stationary operation, in addition to the other raw liquid fuel injector or injectors.

BRIEF DESCRIPTION OF THE DRAWINGS

FIG. 8(*a*) is a drawing which explains an aimed temperature range and a tolerance temperature range of the raw fuel gas, and FIG. 8(*b*) shows a basic injection pattern at a stationary state.

FIG. 30(*a*) is a drawing explaining an aimed temperature range and a tolerance temperature range of the raw fuel gas, and FIG. 30(*b*) shows a basic injection pattern at a stationary state.

DESCRIPTION OF THE PREFERRED EMBODIMENTS

Figure 1:
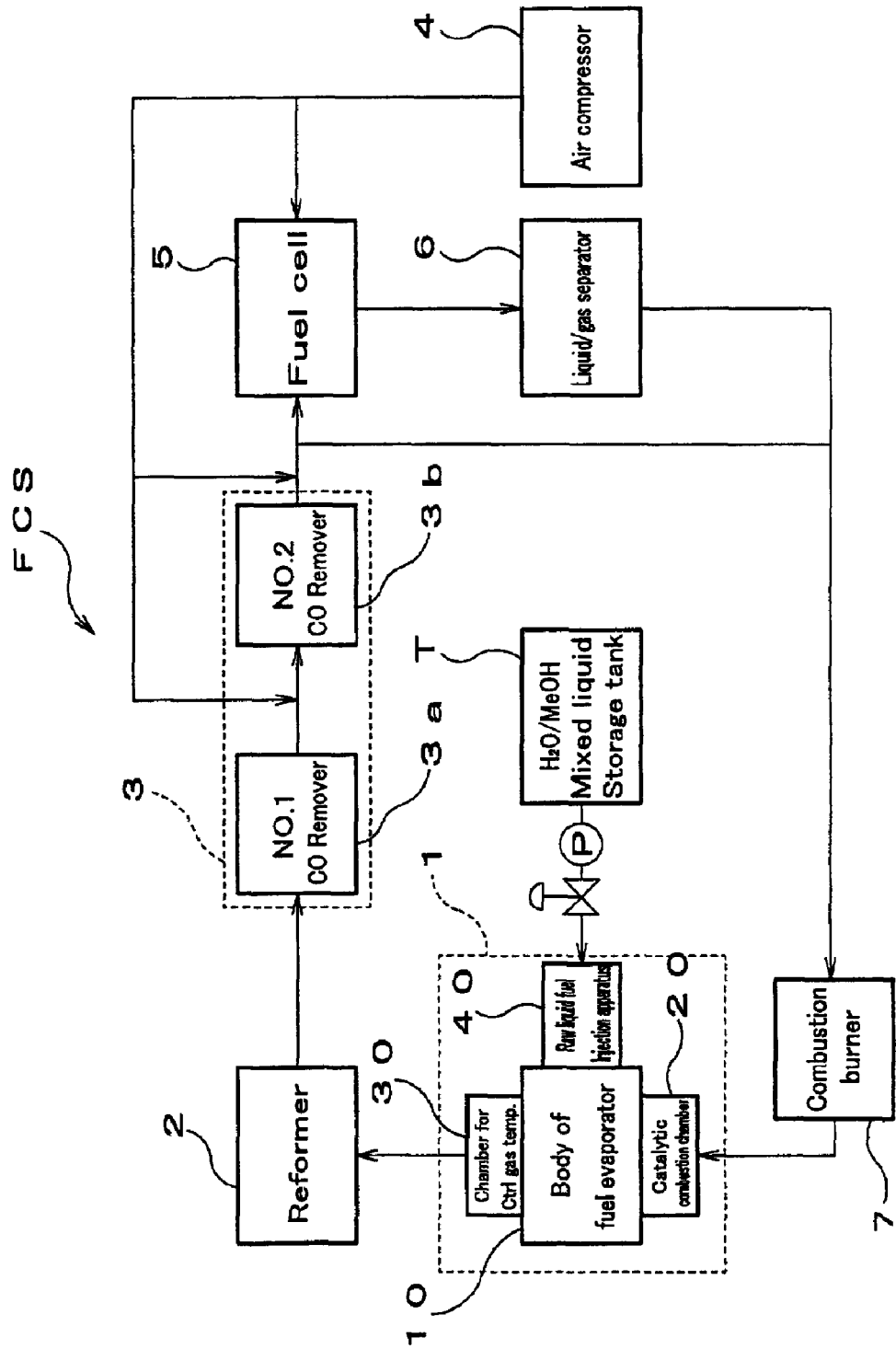
FIG. 1 shows the configuration of a fuel cell system, in which a fuel evaporator according to the first embodiment of the present invention is used.

A fuel evaporator according to the first to second aspects of the present invention will now be described.
(First Aspect)

First, the fuel evaporator according to the first aspect of the present invention will now be described by referring to the drawings. The fuel evaporator according to the first aspect of the present invention is divided into four types (first to fourth embodiments), depending upon the presence or absence of a chamber for controlling the temperature of the raw fuel gas, the method of supplying a high temperature thermal medium into the chamber for controlling the gas temperature, etc. The fuel evaporator of the fourth embodiment has no chamber for controlling the gas temperature.
<<First Embodiment>>

The fuel evaporator of the first embodiment will now be described.

Figure 2:
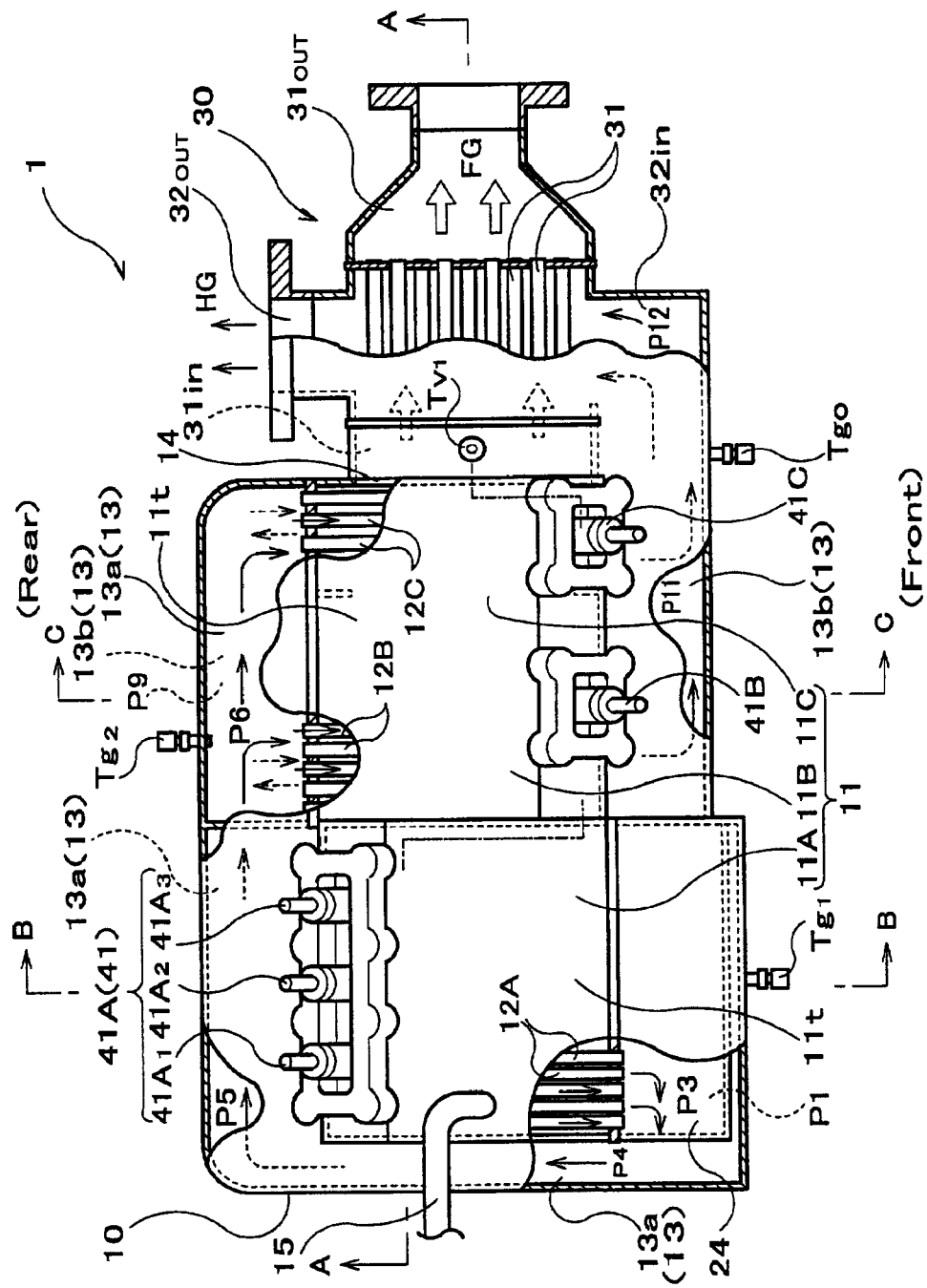
FIG. 2 is a partial cutaway plane view of the fuel evaporator according to the first embodiment of the present invention.
Figure 3:
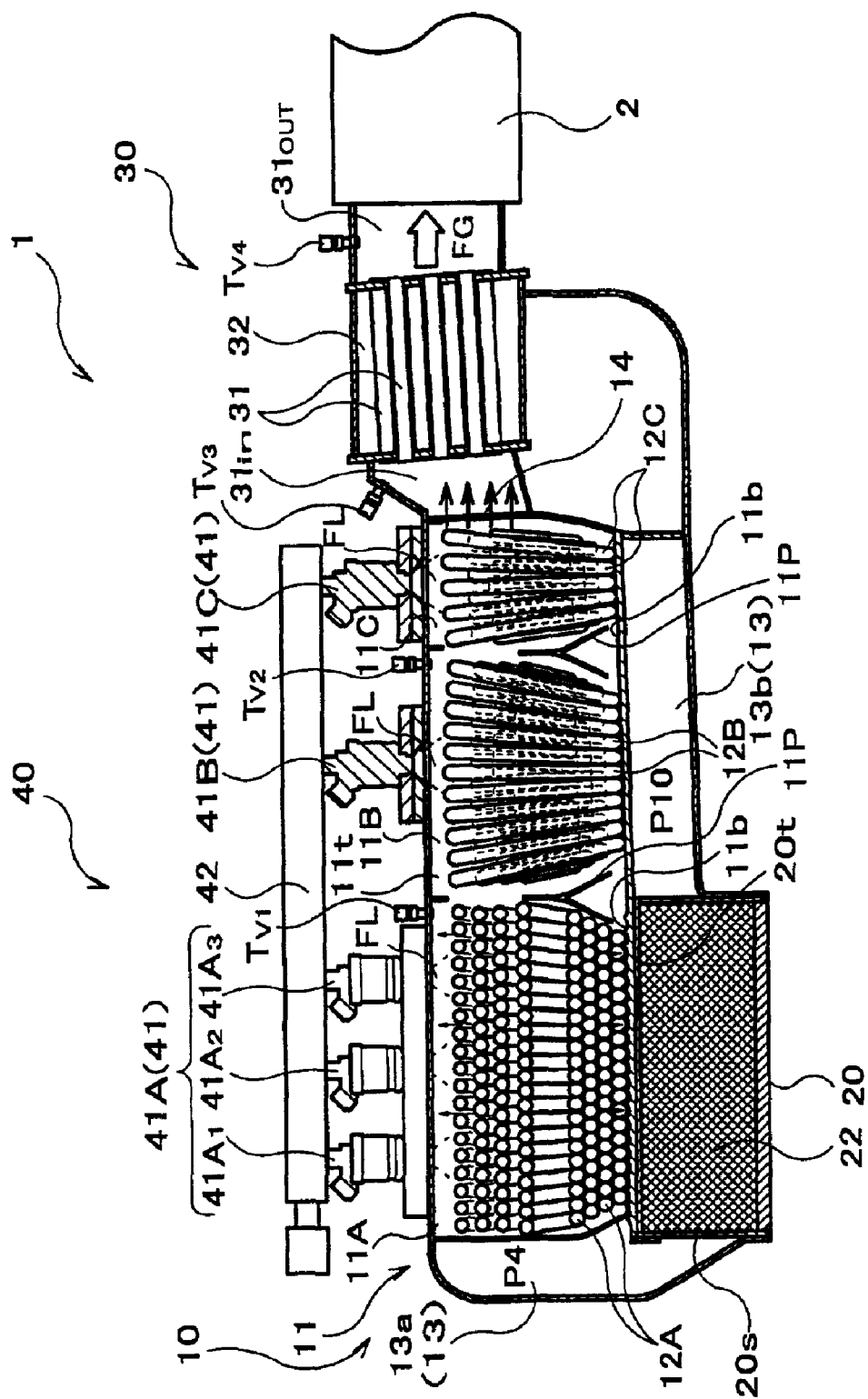
FIG. 3 is a cross-sectional view taken along the line A—A of FIG. 2.
Figure 4:
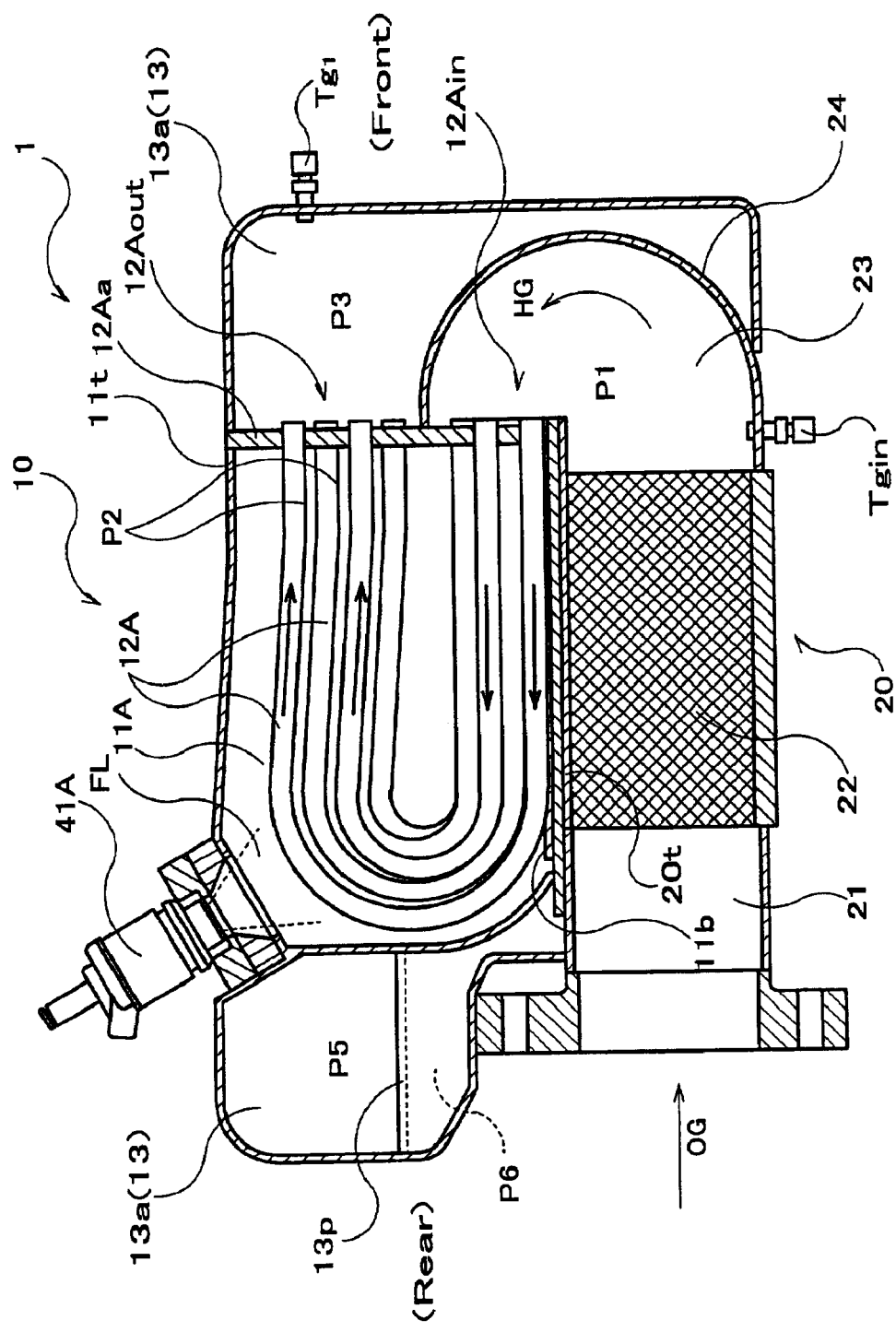
FIG. 4 is a cross-sectional view taken along the line B—B of FIG. 2.
Figure 5:
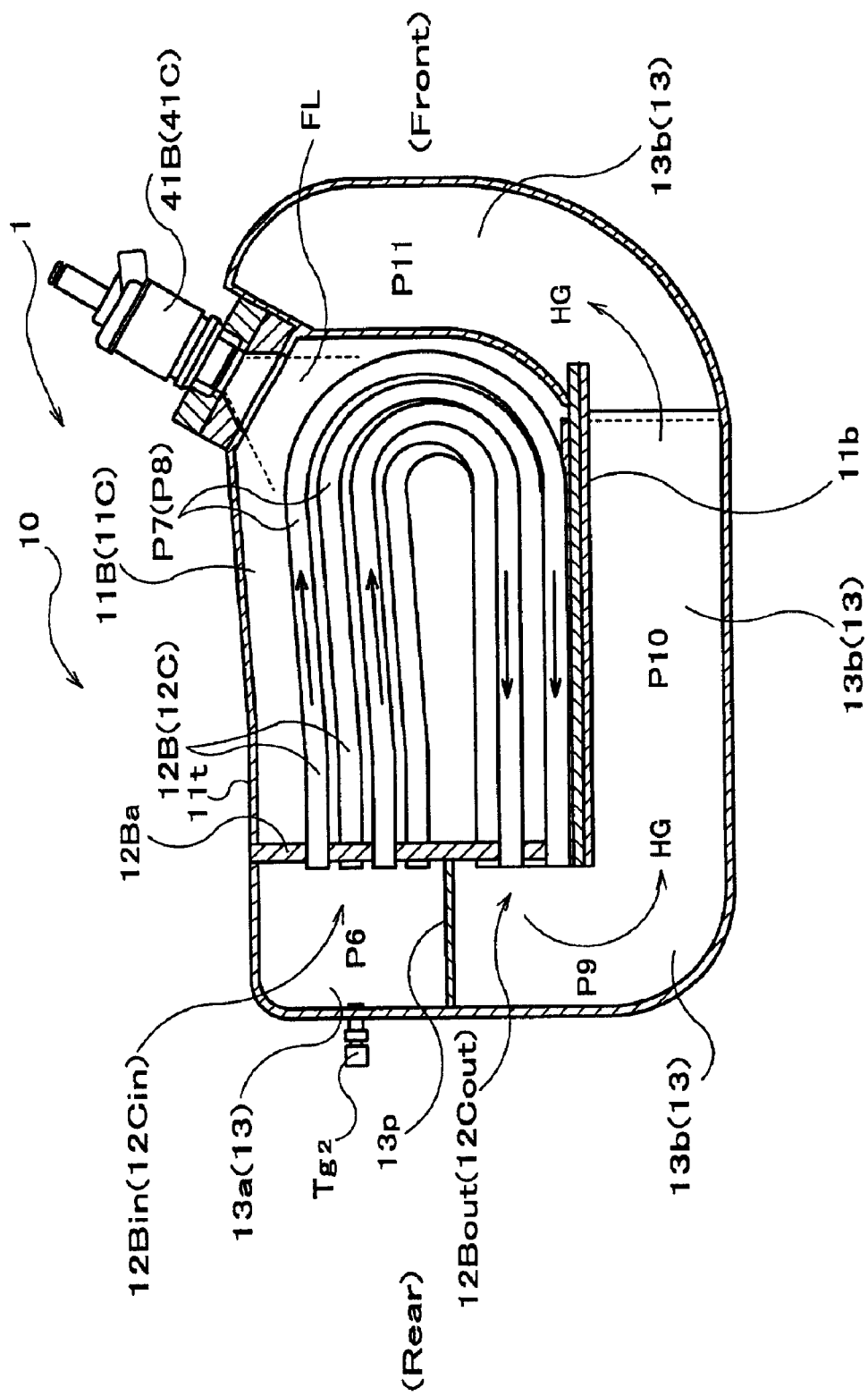
FIG. 5 is a cross-sectional view taken along the line C—C of FIG. 2.
Figure 6:
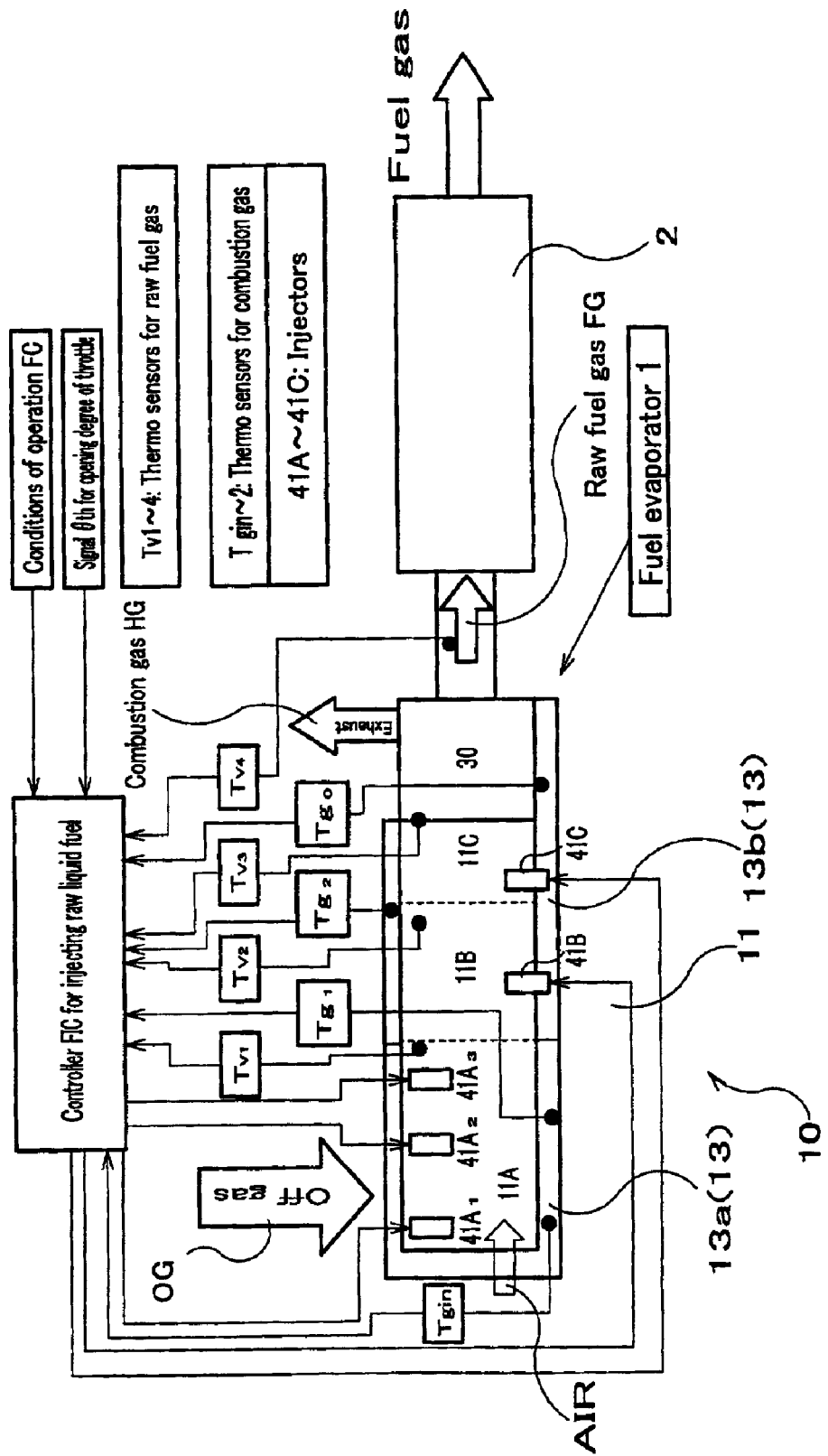
FIG. 6 is a block diagram showing the control system of the fuel evaporator according to the first embodiment of the present invention.

FIG. 1 shows the configuration of a fuel cell system, in which a fuel evaporator according to the first embodiment of the present invention is used, FIG. 2 is a partial cutaway plane view of the fuel evaporator according to the first embodiment of the present invention, FIG. 3 is a cross-sectional view taken along the line A—A of FIG. 2, FIG. 4 is a cross-sectional view taken along the line B—B of FIG. 2, and FIG. 5 is a cross-sectional view taken along the line C—C of FIG. 2.
[Fuel Cell System]

First, the configuration of a fuel cell system FCS in which the fuel evaporator 1 of the first embodiment is used will be described by referring to FIG. 1. The fuel cell system FCS is composed mainly of a fuel evaporator 1, a reformer 2, a CO remover 3, an air compressor 4, a fuel cell 5, a gas/liquid separator 6, a combustion burner 7, and a tank T for a raw liquid fuel (a tank for storing a water/methanol mixed liquid).

The fuel evaporator 1 possesses a body 10 of the fuel evaporator, a catalytic combustor 20, a chamber 30 for controlling the temperature of the gas (hereinafter referred to as temperature-control chamber), and a raw liquid fuel injection apparatus 40. The fuel evaporator 1 is an apparatus in which a raw liquid fuel, such as a water/methanol mixed liquid, pumped from the tank T for the raw liquid fuel via a pump P, is injected into the body 10 of the fuel evaporator to be converted into the raw fuel gas. The high temperature thermal medium for evaporating the raw liquid fuel is a combustion gas supplied from the catalytic combustor 20. The combustion gas is obtained by catalytically combusting the off-gas etc. in the fuel cell 5 in the catalytic combustor 20. The raw fuel gas obtained as described above whose temperature is controlled in the temperature-control chamber 30 is supplied into the reformer 2. The details of the fuel evaporator will be described later on.

The reformer 2 reforms the raw fuel gas supplied from the fuel evaporator 1 into a hydrogen-enriched raw fuel gas due to steam reforming and partial oxidation. With regard to the steam reforming and partial oxidation, the reactions are accelerated by the function of a catalyst filled within the reformer 2. In order to partially oxidize the raw fuel gas, air is supplied into the reformer 2 via the air compressor 4 through pipes (not shown).

In the resulting hydrogen-enriched raw fuel gas, carbon monoxide is selectively reacted in the presence of a catalyst by means of the CO remover. This converts carbon monoxide into carbon dioxide, which is then removed. The removal of carbon monoxide is carried out in order to prevent the platinum catalyst from being poised to enlarge the service life of the fuel cell 5. The CO remover 3 typically possesses two CO removers, i.e., No. 1 CO remover 3a and No. 2 CO remover 3b, and quickly decreases the concentration of carbon monoxide in the hydrogen enriched raw fuel gas. The temperature of the hydrogen-enriched raw fuel gas in the CO remover is controlled by means of a heat exchanger not so as to bring about any undesirable reaction such as converse shifting or methanation.

The air compressor 4 compresses an air to supply the air required in the fuel cell 5 into the fuel cell 5. The air compressor 4 also supplies the air for partial oxidation in the reformer 2 as described above. Furthermore, the air compressor 4 supplies the air to the No. 2 CO remover 3b in order to convert carbon monoxide contained in the raw fuel gas into carbon dioxide. As the power for the air compressor 4, an energy generated during the course of swelling the off gas discharged from the fuel cell 5 can be utilized.

The fuel cell 5 is a solid macromolecular type fuel cell as described above. Into a hydrogen pole is supplied the raw fuel gas, from which carbon monoxide is removed, and into an oxygen pole of the fuel cell 5 is supplied the air from the air compressor 4. Within the fuel cell 5, water and electricity electrochemically occur from hydrogen and oxygen in the presence of the platinum catalyst. The electricity can be used as a power source for an electric vehicle or such.

The off gas containing unused hydrogen and the produced water are discharged from the hydrogen pole of the fuel cell 5, and they are separated into gaseous components and liquid components by means of a gas/liquid separator 6. At the time of starting the fuel cell system FCS, the off gas is supplied into a combustion burner 7 and then combusted to warm up the catalytic combustor 20 etc. After the completion of the warming-up, the off gas is supplied into the fuel evaporator 1 without combustion in the combustion burner 7, and is catalytically combusted in the catalytic combustor 20 to be used as a heat source for the evaporation of the raw liquid fuel. At the time of starting the fuel cell system FCS, a fuel for catalytic combustion (e.g., methanol) is supplied into the catalytic combustor 20 instead of the off gas.

The functions and configuration of the fuel cell system FCS in which the fuel evaporator 1 according to the first embodiment is used are described above.
[Fuel Evaporator]

Subsequently, the fuel evaporator 1 which realizes the present invention will now be described. (See, FIGS. 2 to 5.) The fuel evaporator 1 according to the first embodiment is composed of the body of the fuel evaporator 10, the catalytic combustor 20, the temperature control chamber 30, and the raw liquid fuel injection apparatus 40.

With regard to schematically positional relation, the body 10 of the fuel evaporator is provided on the upper portion of the catalytic combustor 20, the temperature control chamber 30 is provided on one side of the body 10 of the fuel evaporator, and the raw liquid fuel injection apparatus 40 is provided on the upper portion of the body 10 of the fuel evaporator.

(1) Body of Fuel Evaporator

As shown in FIG. 3 or such, the body 10 of the fuel evaporator possesses a boxy evaporation chamber 11 having a plurality of U-shaped tubes 12A for thermal medium (hereinafter simply referred to as the "thermal medium tubes". The evaporation chamber evaporates the raw liquid fuel FL injected from the raw liquid fuel injection apparatus 40 by means of the combustion gas HG, which serves as the high temperature thermal medium, to bring about the raw fuel gas FG. Here, the evaporation chamber 11 is composed such that a first evaporation chamber 11A, a second evaporation chamber 11B and a third evaporation chamber 11C are connected in series in a ventilation manner. The raw fuel gas FG generated in the first evaporation chamber 11A and the second evaporation chamber 11B, is configured to be introduced into the later temperature control chamber 30 via the third evaporation chamber 11C. The symbol 11p is a diaphragm which divides the evaporation chamber 11 in a ventilation manner.

In the evaporation chamber 11, the first evaporation chamber 11A is the biggest; the second evaporation chamber 11B is smaller than the first evaporation chamber 11A; and the third evaporation chamber 11C is the smallest. These evaporation chambers 11A, 11B, and 11C have U-shaped thermal medium tubes 12A, 12B, and 12C provided thereon respectively, according to the size (capacity) of the evaporation chamber. The size (capacity) of the first evaporation chamber 11A is approximately the same as the sum of the size (capacity) of the second evaporation chamber 11B and that of the third evaporation chamber 11C, and is configured so that the heat value thereof becomes larger than those of the other evaporation chambers 11B and 11C by having more thermal medium tubes 12A (the numbers of the thermal medium tubes 12A>the number of the thermal medium tubes 12B>the numbers of the thermal medium tubes 12C). Consequently, the first evaporation chamber 11A has the highest performance for evaporating the raw liquid fuel FL to generate the raw fuel gas HG (as described later on, the first evaporation chamber 11A is also heated from the lower portion by means of the catalytic combustor 29.)

As for the order of serially connecting the evaporation chambers 11, for example, the first evaporation chamber 11A may reside between the second evaporator chamber 11B and the third evaporator chamber 11C.

As shown in FIG. 3, the tubes 12A in the first evaporation chamber are placed so that the distances between the respective thermal medium tubes 12A become wider toward the upper direction and they become narrower toward the lower direction (i.e., the thermal medium tubes become sparser as they are near from the injector 41A, and they become denser as they are far from the injector 41A), in order to widespread the raw liquid fuel FL injected from the injector 41A among every portions of the evaporation chamber 12A including the portion far from the injector 41A. Also, by such a configuration, the generation of big film boiling such as the film boiling spread between the thermal medium tubes 12A can be reduced (i.e., the distances between the thermal medium tubes 12A at the portion near the injector 41A are widened to prevent greatly grow in the portions where the film boiling occurs), to thereby secure the passages of the raw liquid fuel FL and the raw fuel gas FG. By placing the tubes 12A at the lower portion of the first evaporation chamber 11A in a dense manner, and by strongly heating the lower portion of the first evaporation chamber 11A, the liquid residence on the lower portion of the first evaporator chamber 11A can also be prevented (the generation of the liquid residence on the lower portion of the first evaporator 11A is also prevented by increasing the heat mass at the lower portion of the first evaporation chamber 11A). With regard to the placements and the functions of the thermal medium tubes 12B and 12C in the second and third evaporation chambers 11B and 11C, they are substantially the same as those of the tubes 12A in the first evaporation chamber 11A.

As shown in FIG. 3, the cross-section of the lower surface 11b of the first evaporation chamber 11A is configured into a wave form to meet the shape (placements) of the thermal medium tubes 12A residing at the lower portion amongst them, so as to minimize the space between the thermal medium tubes 12A and the lower portion of the evaporation chamber as low as possible not so as to generate any large liquid residence. However, there are some gaps between the lower surface 11b of the first evaporation chamber 11A and the tubes 12A for residing at the lower portion so that they are not come in contact with each other due to the vibration etc.

On the other hand, as shown in FIG. 3, the lower surfaces of the second and the third evaporation chambers 11B and 11C are slanted toward the side of the first evaporation chamber 11A downwardly so that if the liquid residence is brought about on the second or the third evaporation chamber 11B or 11C, the resulting liquid residence flows into the first evaporation chamber 11A. A baffle lip is configured so as to form an opening which allows for the liquid residence flowing into the portion of the lower surface 11b of the evaporation chamber. The height of the opening positioned at the upper portion of the baffle 11p is substantially the same as the thickness of the bundle of the thermal medium tubes 12A (12B and 12C), so that the resulting raw fuel gas FL easily flows.

As shown in FIG. 4, the front side of the first evaporation chamber 11A (on the basis of the fuel evaporator 1) is blocked with a supporting plate 12A to hold the tubes 12A not so as to mix the combustion gas HG with the raw fuel gas FG. Both ends of the thermal medium tube 12A are opened, and the combustion gas HG enters into the thermal medium tube 12A from the lower end of the thermal medium tube 12A (inlet $12A_{in}$ of the thermal medium tube; sometimes referred to as tube inlet $12A_{in}$), while existing from the upper end of the thermal medium tube 12A (outlet $12A_{out}$ of the thermal medium tube; sometimes referred to as tube outlet $12A_{out}$). From the tube outlet $12A_{out}$, a combustion gas passage 13 (a first combustion gas passage 13a), which will be described later on, is started. Here, with regard to the positions such as front, side, and rear sides, they are based on the fuel evaporator 1 (and so forth).

The upper side of the thermal medium tube 12A is slanted so as to descend towards the end thereof. The reason why the thermal medium tube 12A has a slant as described above is that in the case where the raw liquid fuel FL is adhered on the upper side of the tube 12A in the form of droplets, the droplets thus adhered allow for moving towards the supporting plate 12A to thereby evaporate the droplets due to the heat possessed by the supporting plate 12A. Similarly, the thermal medium tubes 12B and 12C of the second and the third evaporation chambers 11B and 11C are also slanted as in the case of the thermal medium tube 12A of the first evaporation chamber 11A.

As shown in FIG. 5, the rear surface (on the basis of the fuel evaporator 1) of the second and the third evaporation chambers 11B and 11C are blocked with a supporting plate 12Ba which holds the thermal medium tubes 12B and 12C in a unification manner, not so as to mix the combustion gas HG with the raw fuel gas FG. Both ends of the respective thermal medium tube 12B or 12C are opened, and the combustion gas HG enters into the thermal medium tube 12B or 12C from the lower end of the thermal medium tube 12B or 12C (tube inlet $12B_{in}$ or $12C_{in}$), while existing from the upper end of the thermal medium tube 12B or 12C (tube outlet $12B_{out}$ or $12C_{out}$). A diaphragm 13p is provided not so as to mix the combustion gas HG of the tube inlet $12B_{in}$ or $12C_{in}$ with combustion gas of the tube outlet $12B_{out}$ or $12C_{out}$. After heating the first evaporation chamber 11A, the combustion gas HG diverges to heat the second and the third evaporation chambers 11B and 11C.

While the body 10 of the fuel evaporator evaporates 11 the raw liquid fuel FL within the evaporation chambers to generate the raw fuel gas FG, the generated raw fuel gas FG is passed through a ventilation means 14 possessed by the third evaporation chamber 11C to be introduced into the temperature control chamber 30 (see FIG. 30). The ventilation means 14 is composed of a punched plate having many small pores etc. so that the droplets of the raw liquid fuel FL such as fly droplets do not directly enter in the temperature control chamber 30.

The fuel evaporator 1 according to this embodiment possesses a combustion gas passage 13 also severing as keeping the evaporation chamber 11 warm. The combustion gas passage 13 is divided into a first combustion gas passage 13A and a second combustion gas passage 13B. The first combustion gas passage 13A is started at the tube outlet $12A_{out}$ of the first evaporation chamber 11A and extends to the tube inlets $12B_{in}$ and $12C_{in}$ of the second and the third evaporation chambers 11B and 11C. Specifically, the first combustion gas passage 13A is provided at the front, side, and rear surfaces of the first evaporation chamber 11A and the rear surfaces (upper halves) of the second and the third evaporation chambers 11B and 11C. The first combustion gas passage 13A according to this embodiment has a construction where it totally covers a diaphragm 24 of the catalytic combustor 20 and a side surface 20s of the catalytic combustor 20.

On the other hand, the second combustion gas passage 13b is started at the tube outlets $12B_{out}$ and $12C_{out}$ of the second and the third evaporation chambers 11B and 11C and extends to the temperature control chamber 30 (shell 32). Specifically, the second combustion gas passage 13b is placed on the rear surfaces (lower halves), the lower surfaces and the front surfaces of the second and the third evaporation chambers 11B and 11C.

The member represented by the symbol 15 in FIG. 2 is an air inlet, which introduces air (oxygen) required for the reformation (partial oxidation) into the reformer 2 at the stage of generating the raw fuel gas FG in the fuel evaporator 1 in order to mix the air with the raw fuel gas FG. By mixing the air with the raw fuel gas FG, the reaction in the reformer 2 takes place smoothly.

Specifically, by introduction of the air at the stage of generating the raw fuel gas in the fuel evaporator 1, during the migration of the raw fuel gas FG within each of the evaporation chambers 11A, 11B, and 11C toward the outlet of the body 10 of the evaporation chamber, the raw fuel gas FC collides with each of the tubes 12A, 12B, and 12C provided within each evaporation chamber 11A, 11B, or 11C and a diaphragm 11p to complete the perfect mixing of the raw fuel gas FG with the air. This makes it possible to introduce the raw fuel gas having a uniform composition containing the air into the reformer 2.

Preference is given to the placement of air inlet 15 on the evaporation chamber 11 (first evaporation chamber 11A) having a high heat value and a high evaporation performance, because of the necessity of the increase in the temperature of the introduced air.

(2) Catalytic Combustor

The catalytic combustor 20 according to the first embodiment of the present invention is in a boxy form similar to the case of the evaporation chamber 11, and has a catalytic layer 22 comprising a catalyst in the shape of a honeycomb accommodated therewith. The catalytic combustor 20 combusts the off gas OG from the fuel cell 5, which is the gas to be combusted, i.e., a mixed gas comprising hydrogen and oxygen. The combusted gas HG generated due to the catalytic combustion of the off gas OG is used as a high temperature thermal medium in the evaporation of the raw liquid fuel FL in the evaporation chamber 11, keeping the temperature of the evaporation chamber 11 warm, and controlling the temperature of the temperature control chamber 30.

Due to catalytic combustion in the interior thereof, the catalytic combustor 20 itself is kept at a high temperature. In this embodiment, since the catalytic combustor 20 itself makes a use of the heat generated, the catalytic combustor 20 is placed so that the upper surface thereof (the upper surface 20t of the catalytic combustor) is in come contact with the lower surface 11b of the evaporation chamber 11A. By such a contact, the heat generated in the catalytic combustor 20 is transmitted to the lower surface 11b of the evaporation chamber in a thermal conductive manner, making it possible to effectively use the heat generated in the catalytic combustor 20.

The lower surface 11b of the evaporation chamber is a place where the liquid residence occurs, and especially the lower surface 11b of the evaporation chamber 11A is a place at which the liquid residence generated in the second and the third evaporation chambers 11B and 11C is collected. Accordingly, strong heating of the lower surface 11b of the evaporation chamber by manes of the catalytic combustor 20 can prevent the generation of the liquid residence and can be intended to rapidly evaporate the liquid residence, if it occurs. Such a configuration can be intended to effectively utilize the exhaust heat. Also, it maybe configured that the upper surface 20t of the catalytic combustor severs as the lower surface 11b of the first evaporation chamber 11A; that an electric heater is intervened between the upper surface 20t of the catalytic combustor and the lower surface 11b of the first evaporation chamber 11A; or that the upper surface 20t of the catalytic combustor and the lower surface 11b of the first evaporation chamber 11A are placed at a several distance so that the heat generated in the catalytic combustor 20 is transmitted to the evaporation chamber 11 due to the radiation and the convection of the generated heat.

With the catalytic combustor 20 is equipped a diaphragm 24 having a semicircular cross-section, which introduces the raw fuel gas HG from the exit 23 of the catalytic combustor into the tube inlet $12A_{in}$ in the first evaporation chamber 11A. This diaphragm 23 forbids the combustion gas HF at the exist 23 of the catalytic combustor (tube inlet $12A_{in}$) and the combustion gas HG at the tube outlet $12A_{out}$ to be mixed with each other. With regard to the materials for the catalytic combustor 20 and the catalytic layer (honeycomb material), stainless steel (e.g., SUS316), which withstands a high temperature and which has corrosion resistance, is suitable.

(3) Chamber for Controlling the Temperature of the Gas

The chamber 30 for controlling the temperature of the gas (temperature control chamber 30) is placed at the downstream of the exit of the evaporation chamber 11 (the third evaporation chamber 11C), projecting from one side of the body 10 of the fuel evaporator. As shown in FIG. 3, the temperature control chamber 30 is a shell and tube type heat exchanger. The raw fuel gas flows in at the side of the tubes of the temperature control chamber 30 (the raw fuel gas FG is introduced into the tube 31 from a tube inlet $31_{in}$, and discharged from a tube outlet $31_{out}$). The combustion gas HG flows in at the side of the shell 32 (the combustion gas HG is introduced in the shell 32 from the shell inlet $32_{in}$ and discharged from the shell outlet $32_{out}$) The temperature control chamber 30 dissociates the temperature unevenness of the raw fuel gas FG generated in the evaporation chamber 11. At the same time, the temperature control chamber 30 also plays a role in superheating the raw fuel gas FG, which will be condensed, to dry vapor, preventing the raw fuel gas FG from being condensed. In this embodiment, the combustion gas HG, which has heated the second and the third evaporation chambers 11B and 11C, is introduced into the temperature control chamber 30.

As shown in FIG. 3, the tube 31 of the temperature control chamber 30 has a taper which is widened toward the side of the reformer 2 so that even if the raw liquid fuel FL remaining un-evaporated enters in the tube 31, it cannot flow to the side of the reformer 2. Similarly, the tube 31 is provided on the upper portion of the evaporation chamber 11 so that the raw liquid fuel FL remaining un-evaporated enters in the tube only with difficulty. Also, a mounting portion (the portion of the tube inlet $31_{in}$) for mounting the evaporation chamber 11 to the temperature control chamber 30 has a taper so that the raw liquid fuel FL remaining un-evaporated enters in the tube only with difficulty (there is also a certain distance between the ventilation means 14 and the tube inlet $31_{in}$ so that the raw liquid fuel FL remaining un-evaporated enters in the tube only with difficulty). The tube 31 is provided approximately perpendicular to the ventilation means 14 so that the raw fuel gas FG flowing through the ventilation means 14 straightly enters in the tube 31.

(4) Raw Fuel Gas Injection Apparatus

The raw fuel gas injection apparatus 40 is an injection apparatus having a single fluid nozzle and injects the raw fuel gas FG into the evaporation chamber 11. The raw fuel gas injection apparatus 40 comprises injectors 41 for injecting the raw fuel gas FL and a tube 42 for supplying the raw liquid fuel FL, and is provided on the upper surface 11t of the evaporation chamber. The injectors 41 are provided on the first evaporation chamber 11A, the second evaporation chamber 11B, and the third evaporation chamber 11C, respectively. Specifically, three injectors $41A_1$, $41A_2$, and $41A_3$ are provided on the first evaporation chamber 11A, one injector 41B is provided on the second evaporation chamber 11B, and one injector 41C is provided on the third evaporation chamber 11C. In order to effectively utilize the thermal value possessed by the high temperature combustion gas HG, the raw liquid fuel FL is mainly injected to the direction along the plurality of the thermal medium tubes 12A, 12B, and 12C provided within the evaporation chamber 11 (in each of the evaporation chambers, the direction toward the supporting plate 12Aa or 12Ba of the thermal medium tubes 12A, 12B, or 12C).

The raw liquid fuel FL injected from the injector $41A_1$ is directionally injected so as to mainly evaporate the raw liquid fuel FL at the left side of the first evaporation chamber 11A, the raw liquid fuel FL injected from the injector $41A_2$ is directionally injected so as to mainly evaporate the raw liquid fuel FL at the center of the first evaporation chamber 11, and the raw liquid fuel FL injected from the injector $41A_3$ is directionally injected so as to mainly evaporate the raw liquid fuel FL at the right side of the first evaporation chamber 11A (see FIG. 3). Specifically, the portion where no raw liquid fuel FL is injected is in the state of so-called empty heating.

(5) Thermo Sensor/Controller for Injecting Raw Liquid Fuel

By referring to FIGS. 2 to 6, a thermo sensor, which measure the temperature within the fuel evaporator and a controller for injecting the raw liquid fuel, which actuates, upon receiving the temperature signals from the thermo sensor, etc., will now be described.

A thermo sensor $Tg_{in}$ is provided at the outlet 21 of the catalytic combustor; a thermo sensor $Tg_1$ is provided at the outlet portion of the thermal medium tube 12A at the front of the first evaporation chamber (the initiation portion of the first combustion gas passage 13a); a thermo sensor $Tg_2$ is provided at the outlet portion of the thermal medium tube 12B at the front of the second evaporation chamber (the initiation portion of the second combustion gas passage 13b); and a thermo sensor $Tg_0$ is provided at the shell inlet $32_{in}$ of the temperature control chamber 30, and these thermo sensors detect the temperatures of the combustion gas HG at the portions where they are provided. The detected temperature signals are transferred to a controller FIC for injecting the raw liquid fuel.

A thermo sensor $Tv_1$ is provided within the first evaporation chamber 11A near the second evaporation chamber 11B; a thermo sensor $Tv_2$ is provided within the second evaporation chamber 11B near the third evaporation chamber 11C; a thermo sensor $Tv_2$ is provided at the outlet of the evaporation chamber 11 (the tube inlet $31_{in}$ of the temperature control chamber 30); and a thermo sensor $Tv_4$ is provided at the tube outlet $31_{out}$ of the temperature control chamber 30, and these thermo sensors detect the temperatures of the combustion gas HG at the portions where they are provided. The detected temperature signals are transferred to the controller FIC for injecting the raw liquid fuel.

The controller FIC for injecting the raw liquid fuel has an injection amount controller which controls the amount of raw liquid fuel FL injected from the raw liquid fuel injection apparatus 40 and a selector which selects at least one injector to be used (actuated) among the five injectors $41A_1$, $41A_2$, $41A_2$, 41B, and 41C, each upon receiving the temperature signals etc.

(Operation of Fuel Evaporator)

Next, the operation and functions of the fuel evaporator 1 according to the first embodiment will be described.

(1) Heating of Lower Surface of Fuel Evaporator

Into the catalytic combustor 20, the off gas OG from the fuel cell 5 is supplied, which is catalytically combusted to produce the combustion gas HG. Once the catalytic combustion is initiated, the temperature of the catalytic combustor 20 itself is also increased, and the external surface of the catalytic combustor 20 becomes high (about 300° C.). Here, the fuel evaporator 1 has the lower surface 11b of the first evaporation chamber 11A coming into closely contact with the upper surface 20t of the catalytic combustor. Consequently, the lower surface 11b of the first evaporation chamber 11A (bed surface of the evaporation chamber 11) is heated to a high temperature by means of the catalytic combustor 20. As described above, by effectively utilizing the heat generated from the catalytic combustor 20, the generation of the liquid residence can be prevented, and the liquid residence, even if it occurs, can be rapidly evaporated. The lower surfaces of the second evaporation chamber 11B and the third evaporation chamber 11C are slanted in such a manner that they go downwardly toward the lower surface $11b$ of the first evaporation chamber 11A. Accordingly, even if there occurs any liquid residence in the second evaporation chamber 11B or the third evaporation chamber 11C, the liquid residence is collected onto the lower surface $11b$ of the first evaporation chamber 11A, at which the liquid residence is finally evaporated. It should be noted that the liquid residence during the course of the collection is being evaporated.

(2) Flow of Combustion Gas

The symbols (P1) to (P12), utilized herein, indicate the flows of the combustion gas HG according to the symbols P1 to P12 described in FIGS. 2 to 5.

First, the combustion gas HG (P1) having a high temperature at from 650 to 700° C., produced by catalytically combusting the off gas by means of the catalytic combustor 20 enters from the tube inlet $12A_{in}$ into the thermal medium tube 12A, heats the first evaporation chamber 11A, and exits the thermal medium tube 12A from the tube outlet $12A_{out}$ (P2). At this time, the combustion gas HG transmits the heat to the raw liquid fuel FL coming into contact with the tube 12A, and evaporates the raw liquid fuel FL. The temperature of the combustion gas HG at the tube outlet $12A_{out}$ is approximately 350° C.

Next, the combustion gas HG enters in the first combustion passage 13a, is passed through the front surface (P3) of the first evaporation chamber 11A, the side surface (P4) of the first evaporation chamber 11a including the side surface 20s of the catalytic combustor, the rear surface (P5) of the first evaporation chamber 11B, and reaches the upper portions of the rear surfaces (P6) of the second evaporation chamber 11B and the third evaporation chamber 12C. During this course, the combustion gas HG mainly serves as keeping the temperature of the first evaporation chamber 11A warm. As described previously, the positional relations such as front surface and the side surface are based on the fuel evaporator 1.

Subsequently, the combustion gas HG is diverged into two ways, i.e., to enter into the thermal medium tubes 12B and 12C from the tube inlets $12B_{in}$ and $12C_{in}$, respectively. The diverged combustion gases HG heat the second evaporation chamber 12B and the third evaporation chamber 12C, and exit the thermal medium tubes 12B and 12C from the tube outlets $12B_{out}$ and $12C_{out}$, respectively. The temperature of the combustion gas at the outlets $12B_{out}$ and $12C_{out}$ is approximately 315° C.

Next, diverged combustion gases HG enter in the second combustion passage 13b, at which they are joined. The joined combustion gas HG is passed through the upper portions (P9) of the rear surfaces of the second evaporation chamber 11B and the third evaporation chamber 11C, the lower portions (P10) of the second evaporation chamber 11B and the third evaporation chamber 11C and the front surfaces (P11) of the second evaporation chamber 11B and the third evaporation chamber 11C, and reaches the shell inlet $32_{in}$ of the temperature control chamber 30 (P12). During this course, the combustion gas HG keeps the temperatures of the second evaporation chamber 11B and the third evaporation chamber 11C and the side surface of the catalytic combustor 20 warm. The temperature of the combustion gas HG at the inlet of the temperature control chamber 30 (shell inlet $32_{in}$) is approximately 300° C.

Then, the combustion gas HG is passed through the shell 32 of the temperature control chamber 30, and then discharged from an exhaust duct (P13). During this course, the combustion gas HG controls the temperature of the raw fuel gas FG.

As described above, by passing the combustion gas HG through the interior of the fuel evaporator 1, the evaporation of the raw liquid fuel FL is further accelerated, which allows for the fuel evaporator excelling in good response. This also allows for rapid warming up.

(3) Flows of Fuel Liquid and Raw Fuel Gas:

The raw liquid fuel FL stored in a raw liquid fuel tank T (storage tank for water/methanol mixture) is pumped and injected into the evaporation chamber 11 by means of the injectors 41 of the raw liquid fuel injection apparatus 40. In the first embodiment, there is provided injectors 41 of raw liquid fuel injection apparatus 40 each on three evaporation chambers 11A, 11B, and 11C, so that the raw liquid fuel FL can be injected from a desired injector 41x to the target evaporation chamber 11. By using a specific injector(s) 41 selected among these injectors, the temperature of the raw fuel gas FG can be controlled. The details will be described later on in the column of "Specific control of the raw liquid fuel injector".

The raw liquid fuel FL, injected from the injector(s) 41 of the raw liquid fuel injection apparatus 40 into the evaporation chamber 40, is rapidly evaporated to be the raw fuel gas FG. In the case where the raw liquid fuel FL is injected sharply in a large amount, with regard to the raw liquid fuel FL remaining un-evaporated, (1) due to heat-exchange with the evaporated raw fuel gas FG, the temperature of the remaining raw liquid fuel FL is increased during the course of being dropped to the lower portion of the evaporation chamber 11 (part of the remaining raw liquid fuel FL is evaporated); (2) if the remaining raw liquid fuel FL is dropped on the thermal medium tube 12 residing at the lower portion, it is evaporated due to the heat on the surface of the thermal medium tube 12; and (3) the raw liquid fuel finally remaining un-evaporated, which reaches the lower surface $11b$ of the evaporation chamber, is evaporated without bringing about the liquid residence, because the lower surface $11b$ of the evaporation chamber is heated by the catalytic combustor 20 or such to a high temperature.

Also, (4) since the body 10 of the fuel evaporator (evaporation chamber 11) is heated and kept warm by the combustion gas passages 13 (13a and 13b), the evaporation of the raw liquid fuel FL is further accelerated, making it difficult to bring about the liquid residence.

Specifically, in such a type of the conventional fuel evaporator, respective surfaces of the evaporation chamber are only heated by the evaporated raw fuel gas and/or the heat conducted or transferred from thermal medium tubes. Consequently, in the conventional fuel evaporator, the raw liquid fuel adhered on the side surface is difficult to be evaporated and has a tendency to be condensed (i.e., tendency to generate the liquid residence.)

In contrast, according to the fuel evaporator 1 of this embodiment, which has a configuration that a plurality of the surfaces of the evaporation chamber 11 are heated and kept warm by means of the combustion gas HG and the catalytic combustor 20, the generation of the liquid residence can be rapidly prevented (i.e., the fuel evaporator 1 of this embodiment has good response).

Also, since the thermal medium tubes 12A, 12B and 12C are placed so that nearer the injectors 41A, 41B and 41C are sparser the distances between respective thermal medium tubes 12A, 12B and 12C, the fuel evaporator 1 according to this embodiment can evaporate the raw liquid fuel FL in a good manner. At the same time, according to the fuel evaporator of this embodiment, it is difficult to bring about the film boiling, which has a possibility to inhibit the flowing of the raw liquid fuel FL and the fuel gad FG, at any portions near the injectors 41A, 41B, and 41C and, thus, the fuel evaporator 1 can effectively evaporate the raw liquid fuel FL in a good manner.

The raw fuel gas FG evaporated at the evaporation chamber 11 is passed through the ventilation means 14 such as perforation plate having many small pores, enters in the temperature control chamber 30, is passed through a vapor tube 31 to control the temperature thereof, and then is introduced into the reformer 2 as shown in FIG. 1. By passing the raw fuel gas FG through the temperature control chamber 30 as just mentioned, the uneven temperature of the raw fuel gas FG can be solved.

[Specific Control of the Raw Liquid Fuel Injector]

Next, specific descriptions will be described for the control of the fuel evaporator according to the first embodiment, particularly for the control of the temperature of the raw liquid fuel at the outlet of the evaporation chamber (the outlet of the fuel evaporator) by switching the position where the raw liquid fuel is injected. The fuel evaporator described herein is accommodated within the fuel cell system and is carried on a vehicle (an electric vehicle carrying a fuel cell).

Figure 7:
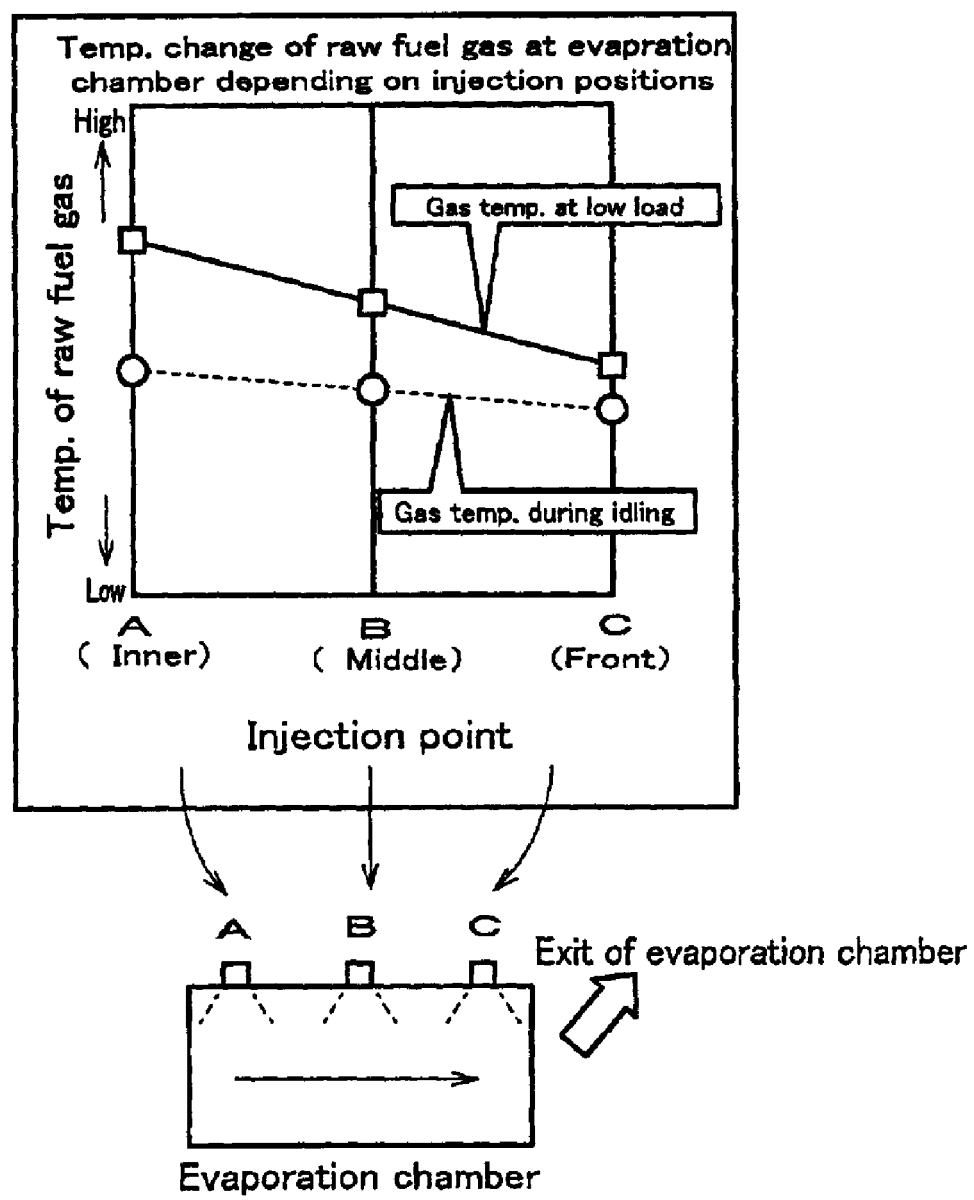
FIG. 7 is a drawing showing the relation between the position of injecting the raw liquid fuel in an evaporation chamber and the temperature of the raw fuel gas at the outlet of the evaporation chamber.
Figure 9:
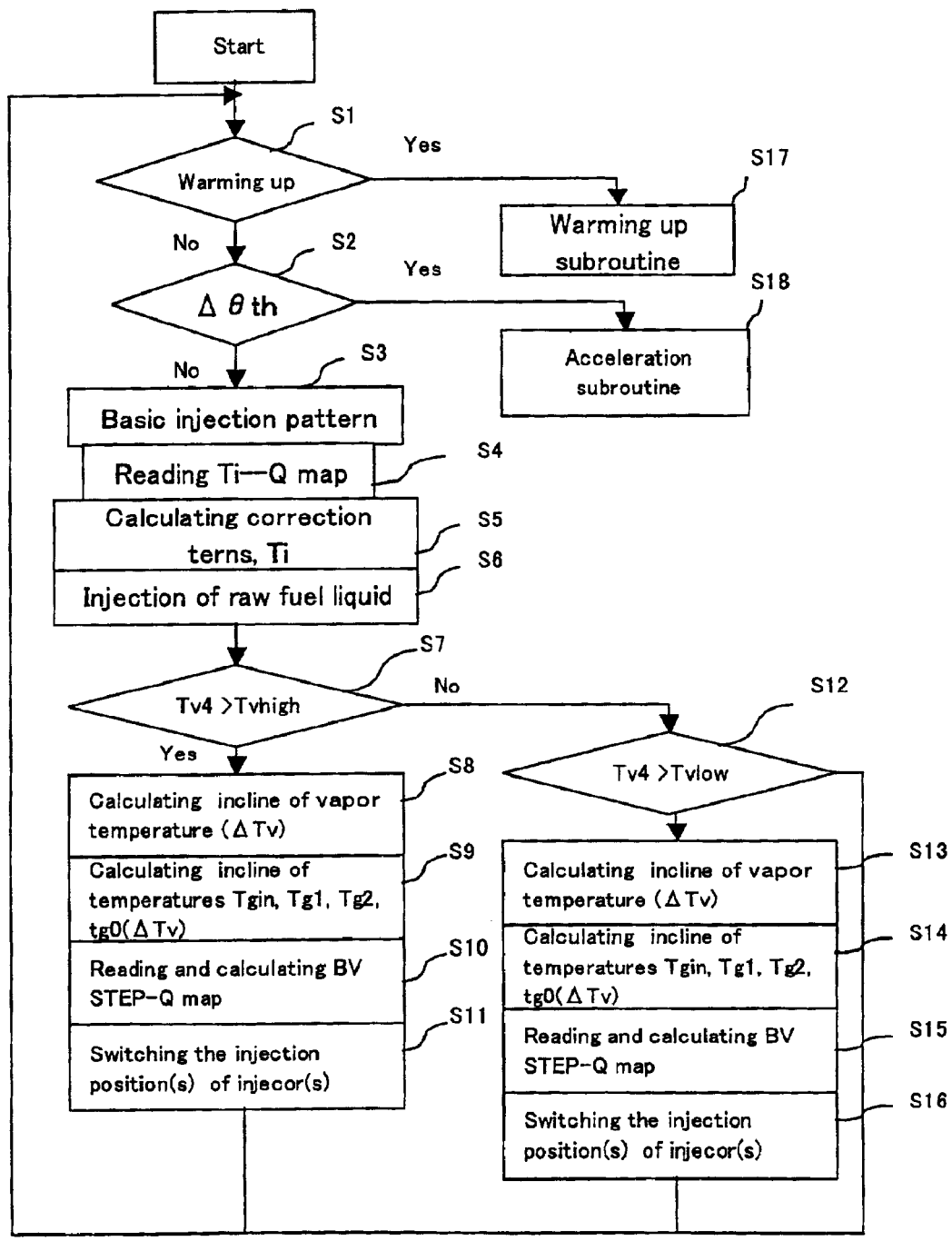
FIG. 9 is a flowchart showing the control of the fuel evaporator according to the first embodiment of the present invention at a stationary state.
Figure 10:
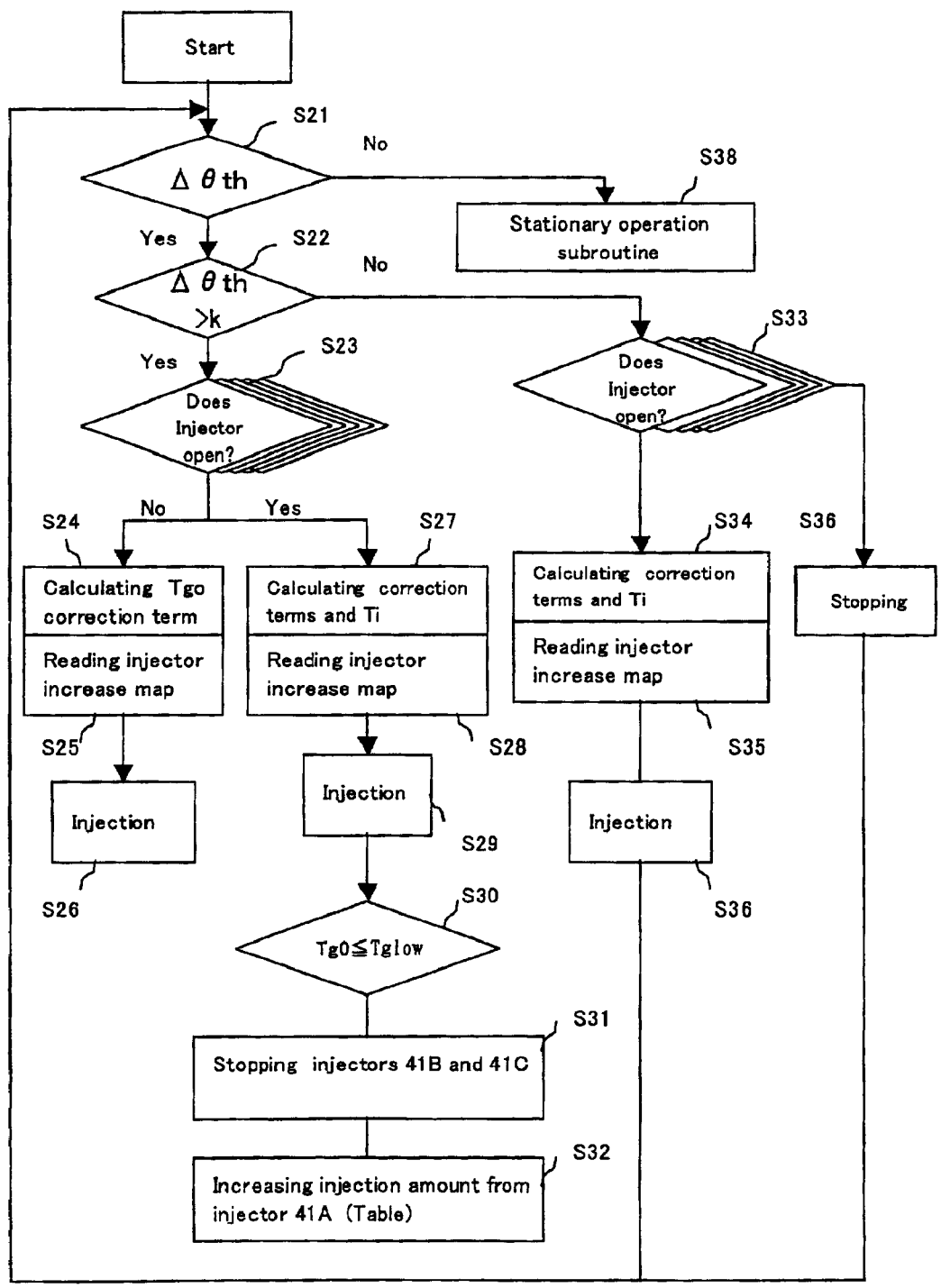
FIG. 10 is a flowchart showing the control of the fuel evaporator according to the first embodiment of the present invention at an accelerated state.
Figure 11:
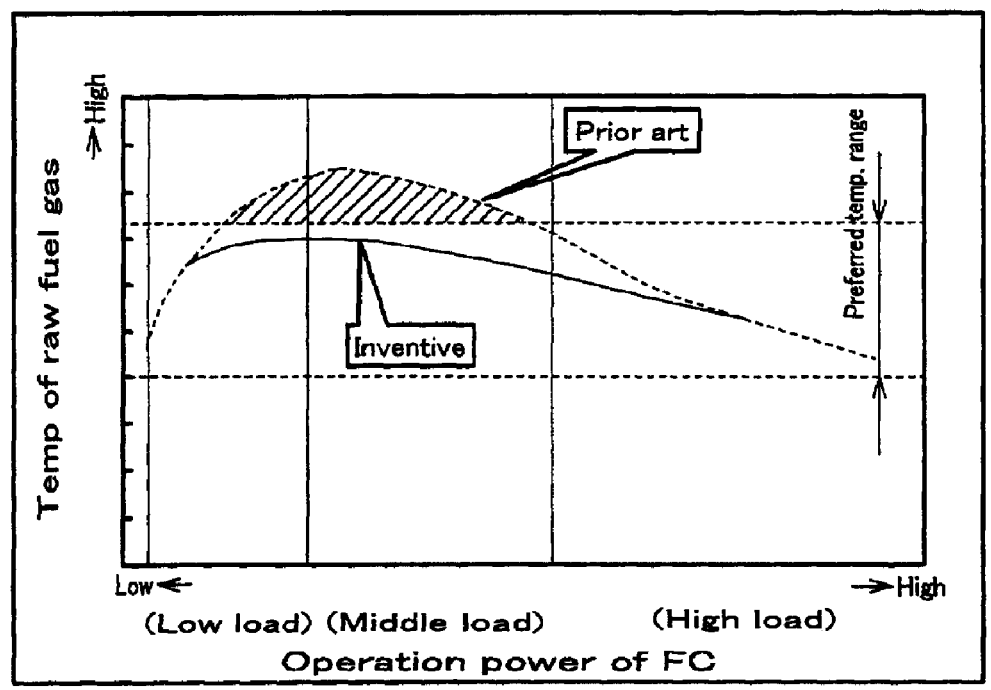
FIG. 11 is a drawing showing the relation between the operation power and the temperature of the raw fuel gas in the fuel cell system using the fuel evaporator according to the first embodiment of the present invention.

FIG. 7 is a drawing showing the relation between the position of injecting the raw liquid fuel in an evaporation chamber and the temperature of the raw fuel gas at the outlet of the evaporation chamber. FIG. 8(a) is a drawing, which explains an aimed temperature range and a tolerance temperature range of the raw fuel gas, and FIG. 8(b) shows a basic injection pattern at a stationary state. FIG. 9 is a flowchart showing the control of the fuel evaporator according to the first embodiment of the present invention at a stationary state. FIG. 10 is a flowchart showing the control of the fuel evaporator according to the first embodiment of the present invention at an accelerated state. FIG. 11 is a drawing showing the relation between the operation power and the temperature of the raw fuel gas in the fuel cell system using the fuel evaporator according to the first embodiment of the present invention.

(1) Relation Between the Position of the Raw Liquid Fuel Injector and the Temperature of the Raw Fuel Gas:

We have separately made a test for how to inject the raw liquid fuel in order to obtain a raw fuel gas having a temperature within the preferable range. Specifically, utilizing an evaporation chamber (like the first evaporation chamber 11A) having three injectors, which are means for injecting the raw liquid fuel, each differing in the distance from the outlet of the evaporation chamber, the temperature of the raw fuel gas was measured for each injector, when the same amount of the raw liquid fuel was injected. This made the relation between the injection position of the raw liquid fuel and the temperature of the raw fuel gas at the outlet of the evaporation chamber clear.

The results are shown in FIG. 7. As shown in the figure, the temperature of the raw fuel gas became the highest when the raw fuel gas was injected from the injector A, positioned at the innermost of the evaporation chamber both at the time of idling and under a low load. Also, the temperature of the raw fuel gas became the lowest when the raw fuel gas was injected from the injector C, positioned at the portion nearest the evaporation chamber both at the time of idling and under a low load (the same injection amount). Furthermore, the temperature of the raw fuel gas was between the temperatures of the raw fuel gas injected from the injectors A and C, when the raw fuel gas was injected from the injector B, positioned at the center of the evaporation chamber both at the time of idling and under a low load (the same injection amount).

From these results, it can be understood that in the case where the evaporation chambers are connected in a ventilation manner, and each evaporation chamber has means for injecting the raw liquid fuel (i.e., in the case of the fuel evaporator 1 according to the first embodiment), the temperature of the raw fuel gas at the outlet of the evaporation chamber can be increased by selecting the positions of the injector for injecting the raw fuel gas to inject the raw fuel gas from the injector positioned at the innermost of the evaporation chamber. On the other hand, it is also proven that the temperature of the raw fuel gas at the outlet of the evaporation chamber can be decreased by injecting the raw fuel gas from the injector positioned at the portion nearest the evaporation chamber. By dealing with the change in the amount of the heat value applied to the raw liquid fuel or the raw fuel gas according to the change of the position to be injected, the following temperature control is carried out in this embodiment.

(2) Temperature Control of Raw Fuel Gas Depending Upon Position where Raw Fuel Gas is Injected (Stationary State):

First, the temperature control of raw fuel gas at the outlet of the evaporation chamber depending upon position where raw fuel gas is injected will be described by referring to FIGS. 8 and 9.

FIG. 8(a) is a drawing, which explains an operation power of the fuel cell and an aimed temperature range of the raw fuel gas. In this figure, $Tv_{max}$ is the upper limit of the tolerance temperature range and $Tv_{min}$ is the lower limit of the tolerance temperature range. Also, in this figure, $Tv_{high}$ is the upper limit of the aimed temperature range, and $Tv_{low}$ is the lower limit of the aimed temperature range. By keeping the temperature of the raw fuel gas FG within this aimed temperature range, FCS can be driven under good conditions.

FIG. 8(b) shows a basic injection pattern of the injector. This basic injection pattern shows the injection pattern of the raw fuel gas at a stationary state.

Specifically, (1) at the time of idling (idle) where the operation power of the fuel cell is the lowest, only a small amount of the raw fuel gas FG is required. Consequently, the raw liquid fuel FL is injected from the injector $41A_3$, positioned at the side near the outlet of the evaporation chamber 11A of the evaporation chamber 11.

(2) In the situation where the operation power of the fuel cell 5 is somewhat higher than that at the time of idling, the amount of the raw fuel gas FG is required to be somewhat increased to increase a heat value. Consequently, in this case, the raw liquid fuel FL is also injected from the injector $41A_2$, positioned at the middle of the first evaporation chamber 11A.

(3) In the situation where the operation power of the fuel cell 5 is further higher, the amount of the raw fuel gas FG is further increased to apply a larger heat value. Consequently, the injection of the raw liquid fuel FL from the injector $41A_2$ is stopped, and alternatively the raw liquid fuel FL is injected from injector $41A_1$, which can generate the raw fuel gas FG at the highest temperature and which is posited at the innermost of the first evaporation chamber 11A. In this case, although the number of the injectors 41 which inject the raw liquid fuel is the same as that in the case of situation (2), i.e., two injectors, the injection amount of the raw liquid fuel FL in the case of (3) is larger than that in the case of (2), by setting a pulse control signal which controls the period of opening and closing the injectors 41.

(4) In the situation of wide-opening the throttle (WOT), the operation power of the fuel cell 5 becomes highest. In this case, the raw liquid fuel FL is injected from all of three injectors $41A_1$, $41A_2$, and $41A_3$ of the first evaporation chamber 11A.

By injecting the raw liquid fuel FL into the evaporation chamber 11 in the manner as described above, the raw fuel gas FG can be generated at the optimal temperature in an adequate amount in any situations from at the time of idling through at the time of wide-opening the throttle (stationary state). It is noted that the injectors 41B and 41C are basically used for dealing with the requirement for increase in the amount of the raw fuel gas FG at the time, for example, of the acceleration and supplementing the temperature control of the raw fuel gas FG by the injector 41A (the first evaporation chamber 11A), as described fully later on.

By referring to the flowchart shown in FIG. 9, the temperature control of the raw fuel gas depending upon the position of injecting the raw liquid fuel will now be described (stationary state). This flowchart assumes the case of carrying the fuel cell system FCS on a vehicle.

The symbols $Tv_1$, $Tv_2$, $Tv_3$ and $Tv_4$ used in the following description do not mean the temperature sensors for the raw fuel gas but mean the temperatures of the raw fuel gas detected by the temperature sensors. Similarly, the symbols $Tg_{in}$, $Tg_1$, $Tg_2$, and $Tg_0$ also do not mean the temperature sensors but means the temperatures of the raw fuel gas detected by the temperature sensors.

First, the controller judges whether or not the fuel evaporator is warming up (S1). If the fuel evaporator is warming up, warming up is carried out through a warming up subroutine (S17). Subsequently, the controller judges whether or not there is a change in the opening degree of the throttle ($\Delta\theta$th). If the change in the opening degree of the throttle ($\Delta\theta$th) exists, the acceleration is carried out by acceleration subroutine (S18). The acceleration subroutine carries out the injection of raw liquid fuel FL during the course of the acceleration (during the transition).

If the controller judges that no change in opening degree of the throttle ($\Delta\theta$th) exists, injectors 41 are selected based on the basic injection pattern (see FIG. 8(b)), by referring to the speed of the vehicle, the opening degree of the throttle ($\theta$th) and the like (S3). A Ti-Q map is read, and the injection time Ti of raw liquid fuel FL (injection amount Q of the raw liquid fuel) is temporarily assumed (S4). Then, the correction based on various correction terms such as charge into the battery, actuations of accessories, etc., and the injection time Ti of the raw liquid fuel is determined by calculation (S5). Based on the basic injection pattern selected in Step S3 and the injection time Ti determined in Step S5, the fuel is injected from the injectors 41 (S6).

For example, in the case where the throttle ($\theta$th) is somewhat opened, the injector $41A_3$ and the injector $41A_2$ are selected (S3), the injection time Ti is then calculated (S4 and S5), and the injector $41A_3$ and the injector $41A_2$ are controlled to actuate for the calculated period (S6).

Subsequently, the temperature $Tv_4$ of the raw fuel gas at the tube outlet $31_{out}$ of the temperature control chamber 30 is compared with the upper limit $Tv_{high}$ of the aimed temperature range shown in FIG. 8(a) (S7). If the temperature $Tv_4$ of the raw fuel gas is higher, the temperature of the raw fuel gas FL is treated to be decreased. Specifically, the temperature inclines of the temperatures $Tv_1$, $Tv_2$, and $Tv_3$ of the raw fuel gas (temperature inclines between $Tv_1$ and $Tv_2$; $Tv_2$ and $Tv_3$) at the respective measuring points are calculated (S8). Also, the temperature inclines of the temperatures $Tg_{in}$, $Tg_1$, $Tg_2$, and $Tg_0$ of the combustion gas (temperature inclines between $Tg_{in}$ and $Tg_1$; $Tg_1$ and $Tg_2$; $Tg_2$ and $Tg_0$) at the respective measuring points are calculated (S9). Based on these temperature inclines, prescribed $\Delta$Tv-injection pattern table is read (S10). Subsequently, the positions of the injectors 41 are switched on the basis of the $\Delta$Tv-injection pattern table.

Specifically, for example, in the case where the raw liquid fuel FL is injected from the injectors $41A_1$, $41A_2$, and $41A_3$, if $Tv_4$ becomes higher than $Tv_{high}$ ($Tv_4 > Tv_{high}$), the $\Delta$Tv-injection pattern table is given so as to switch the injection from injector $41A_1$ to the injection from the injector $41c$.

With series of treatments, the temperature ($Tv_4$) of the raw fuel gas is decreased to fall within the aimed temperature range.

On the other hand, if Step S7 judges that the temperature ($Tv_4$) of the raw fuel gas is lower than the upper limit $Tv_{high}$ of the aimed temperature range, the temperature ($Tv_4$) of the raw fuel gas is compared with the lower limit $Tv_{min}$ of the aimed temperature range (S12). If the temperature ($Tv_4$) of the raw fuel gas is higher than the lower limit $Tv_{min}$ of the aimed temperature range, the temperature ($Tv_4$) of the raw fuel gas is within the optimal range, being returned to the initial step. Conversely, if the temperature ($Tv_4$) of the raw fuel gas is lower than the lower limit $Tv_{min}$ of the aimed temperature range, the temperature ($Tv_4$) of the raw fuel gas should be increased. Specifically, the temperature inclines of the temperatures $Tv_1$, $Tv_2$, and $Tv_3$ of the raw fuel gas (temperature inclines between $Tv_1$ and $Tv_2$; $Tv_2$ and $Tv_3$) at the respective measuring points are calculated (S13). Also, the temperature inclines of the temperatures $Tg_{in}$, $Tg_1$, $Tg_2$, and $Tg_0$ of the combustion gas (temperature inclines between $Tg_{in}$ and $Tg_1$; $Tg_1$ and $Tg_2$; $Tg_2$ and $Tg_0$) at the respective measuring points are calculated (S14). Based on these temperature inclines, prescribed $\Delta$Tv-injection pattern table is read (S15). Subsequently, the positions of the injectors 41 are switched on the basis of the $\Delta$Tv-injection pattern table.

Specifically, for example, in the case where the raw liquid fuel FL is injected from the injectors $41A_2$, if $Tv_4$ becomes lower than $Tv_{low}$ ($Tv_4 < Tv_{low}$), the $\Delta$Tv-injection pattern table is given so as to switch the injection from the injector $41A_2$ to the injection from the injector $41A_1$.

With series of treatments, the temperature ($Tv_4$) of the raw fuel gas is increased to fall within the aimed temperature range.

With these treatments, the temperature of the raw fuel gas FG, particularly under the stationary states, can fall within the adequate temperature range, irrelevant to the amount of generating the raw fuel gas FG (operation power of the fuel cell 5).

(3) Securing of the Amount of Generating Raw Fuel Gas at the Time of Acceleration:

By referring to the flowchart shown in FIG. 10, the control for securing the amount of generating raw fuel gas at the time of acceleration (during the transition) will now be described. This flowchart also assumes the case in which the fuel cell system FCS is carried on the vehicle.

First, the controller judges whether or not there is a change in the opening degree of the throttle ($\Delta\theta$th) (S21). If the controller judges that no change in opening degree of the throttle ($\Delta\theta$th) exists, the stationary drive routine is carried out (S38, see FIG. 9). If the change in the opening degree of the throttle ($\Delta\theta$th) exists, the controller judges whether or not the amount of the change in the opening degree of the throttle ($\Delta\theta$th) is larger than the predetermined amount (S22). In the case where amount of the change in the opening degree of the throttle ($\Delta\theta$th) is larger than the predetermined amount ($\Delta\theta$th>k), i.e., at the time of acceleration by middle-opening the throttle or wide-opening the throttle, the controller judges whether or not respective injectors 41 are stopped (s23).

With regard to the injector 41 or the injectors 41, which is/are actuated, the injection time Ti of the raw liquid fuel FL is calculated from the respective correction terms (S24), an injector increase map 2 is read to determine the injection amount (injection time) (S25), and the injection amount from the corresponding injector 41 is increased.

On the other hand, with regard to the injector 41 or the injectors 41, which is/are stopped, the injection time Ti of the raw liquid fuel FL is calculated from the respective correction terms (S27), an injector increase map 3 is read to determine the injection amount (injection time) (S28), the injector 41 or the injectors 41, which is/are not actuated, is/are actuated to inject the raw liquid fuel FL.

This makes it possible to deal with the requirement for increasing the amount of the raw fuel gas FG at the transition time of acceleration by middle-opening the throttle or wide opening the throttle.

Subsequently, the controller judges whether or not the temperature of combustion gas $Tg_0$ at the shell outlet $32_{out}$ of the temperature control chamber 30 is lower than the predetermined temperature ($Tg_{low}$) (S30).

In the case where the temperature of combustion gas $Tg_0$ is lower, it can be assumed that the performances of the second evaporation chamber 11B and the third evaporation chamber 11C for evaporating the raw liquid fuel FL are lowered. Consequently, in the case where the temperature of combustion gas $Tg_0$ is lower than the predetermined temperature ($Tg_{low}$), the injector 41B of the second evaporation chamber 11B and/or the injector 41C of the third evaporation chamber 11C is/are stopped (S31). Then, total amount of the injection from three injectors $41A_1$, $41A_2$, and $41A_3$ is increased. This makes it possible to secure the amount of generating the raw fuel gas FG (and also to maintain the temperature of the raw fuel gas) even if the temperature of the combustion gas HG is decreased.

On the other hand, in the case where the temperature of combustion gas $Tg_0$ is higher than the predetermined temperature ($Tg_{low}$), the procedure is returned to Step S27.

In Step S22, in the case where the change in the opening degree of the throttle (Δθth) is not more than the predetermined level (Δθth<=k), i.e., when the requirement of the vehicle for the acceleration is weak, the controller judges whether or not the injector(s) 41 is/are actuated (make(s) an injection) (S33). An injector 41 which is not injecting the raw liquid fuel FL remains stopping, and an injector 41, which is now injecting the raw liquid fuel FL is used to meet the requirement. Specifically, the injector 41 which is not injecting the raw liquid fuel FL remains stopping (S37).

With regard to the actuating injector(s) 41, the injection time Ti is calculated on the basis of the respective correction terms (S34), the liquid FL is injected on the basis of a map 1 for increasing the injection amount from the injector (S35), to deal with the requirement increasing the raw fuel gas FG for the slight acceleration.

As described above, by starting the actuation of the stopped injector 41, and increasing the amount of the raw liquid fuel FL injected from the actuating injector(s), the requirement for increasing the amount of the raw fuel gas FG in the slight acceleration can be dealt. Specifically, at the time of the acceleration, the heat value to meet the injection amount of the raw liquid fuel is not immediately supplied to the evaporation chamber in the conventional manner, but the time-lag occurs in the supply of the heat value as a rule, resulting in the situation where the conventional fuel evaporator cannot be dealt with the requirement for increasing the amount of the raw fuel gas. In contrast, as in the case of this embodiment, by injecting the raw liquid fuel FL to the portions which does not directly contribute to the evaporation of the raw liquid fuel FL (so-called empty heated evaporation chamber 11 [such as the thermal medium tube $12A_1$ and thermal medium tube 12B]), due to the heat value (thermal mass) possessed by such portions like the thermal medium tube $12A_1$ and thermal medium tube 12B, the requirement increasing the value of the raw fuel gas can be readily reposed.

By connecting such types of three evaporation chambers, and by differing the heat capacities in these evaporation chambers, evaporation performances in each evaporation chamber and each injector can be differed. Consequently, the temperature control of the raw fuel gas and the control of the amount of generating the raw fuel gas can be carried out easily and accurately. Accordingly, the fuel evaporator according to this embodiment has good response and can suitably be used as the fuel evaporator for the fuel cell system utilized under the conditions where load variation is extremely large.

Specifically, when the evaporation chamber is divided into several evaporation chambers and when the raw liquid fuel is individually injected to each of the evaporation chambers according to the evaporation performance of respective evaporation chamber, any dead space during the course of the injection and uneven injection of the raw liquid fuel into the thermal medium tubes which are heat-conductive tubes and, thus the heat efficiency per unit volume of the evaporation chamber is increased. When the unused evaporation chamber (part of the evaporation chamber), which does not inject any raw liquid fuel, is provided and when the unused evaporator is used in the case of increasing the amount of the raw fuel gas, the heat deposited portion (i.e., empty burned portion) of the evaporation chamber can be used in such a case. As a result, evaporation can be instantly carried out, which makes it possible to quickly supply a required amount of the raw fuel gas when it is required.

FIG. 11 shows the relation between the temperature of the raw fuel gas generated during the evaporation of the raw liquid fuel and the operation power.

The conventional fuel evaporator has been designated so that the temperature of the raw fuel gas (the temperature of the raw fuel gas at the outlet of the apparatus) falls within the suitable range when the operation power of the fuel cell is largely loaded. Consequently, in the case where a relatively low load is applied, which is at a low operation power, or where a middle load is applied, which is a middle operation power, there is a problem in that the temperature of the raw fuel gas (the temperature of the raw fuel gas at the outlet of the apparatus) becomes higher than the upper limit of the suitable temperature range.

However, according to the first embodiment of the present invention, by suitably selecting the injector(s), which will inject the raw liquid fuel to meet the situation, a significant effect can be exhibited that the temperature of the raw fuel gas (the temperature of the raw fuel gas at the outlet of the apparatus) can fall within the suitable range over the entire load level of the operation power from a low load to a high load.

<<Second Embodiment>>

Next, the fuel evaporator according to the second embodiment of the present invention will now be described. The fuel evaporator according to the second embodiment allows for economic temperature control of the raw fuel gas by mixing with the combustion gas which is introduced into the chamber for controlling the gas temperature, air (diluted air) as a thermal medium having a temperature lower than this combustion gas.

With regard to the same members and elements as in those utilized in the first embodiment, descriptions will be made by referring to the drawings utilized in the first embodiments, or are omitted.

Figure 12:
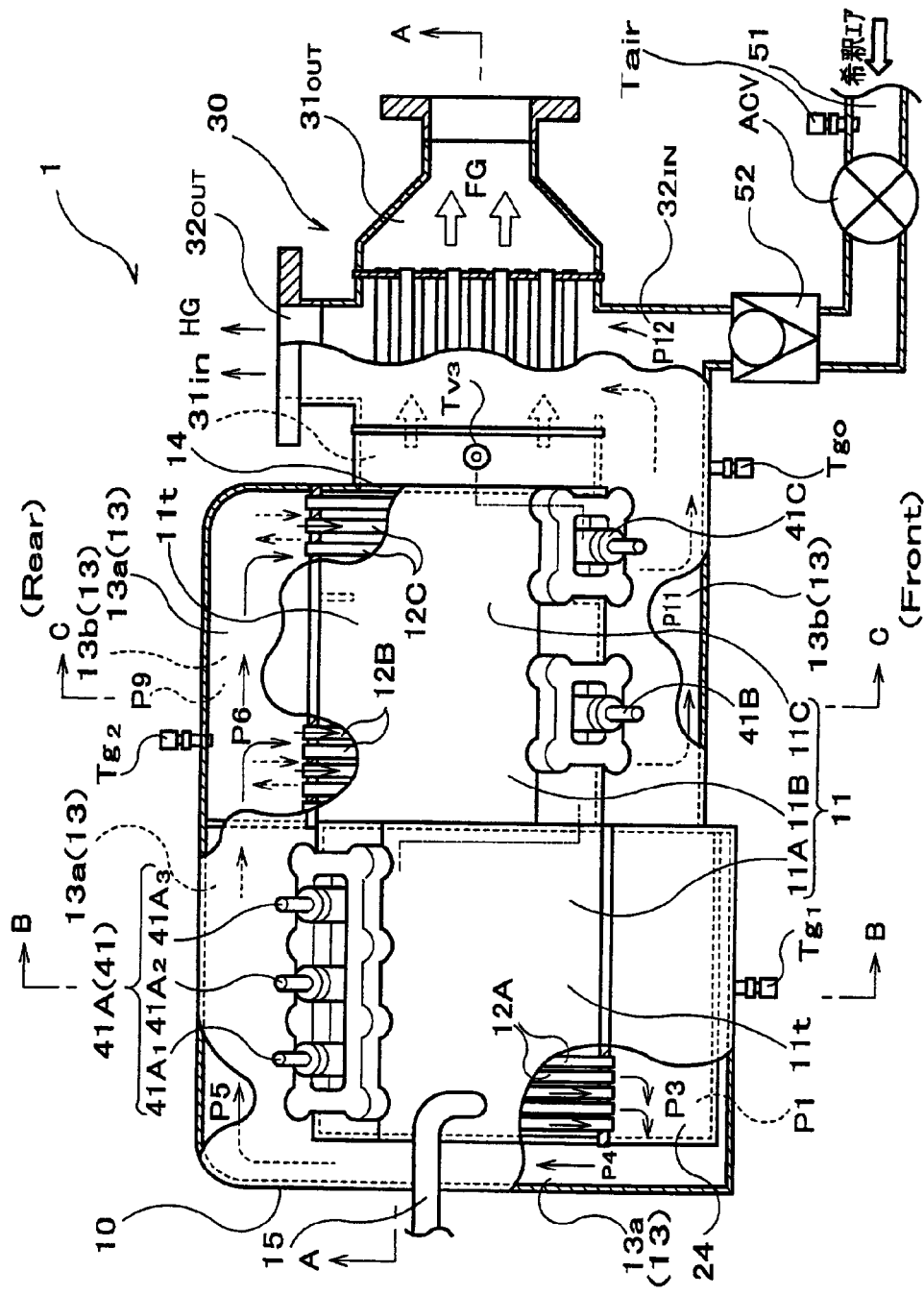
FIG. 12 is a partial cutaway plane view of the fuel evaporator according to the second embodiment of the present invention.
Figure 13:
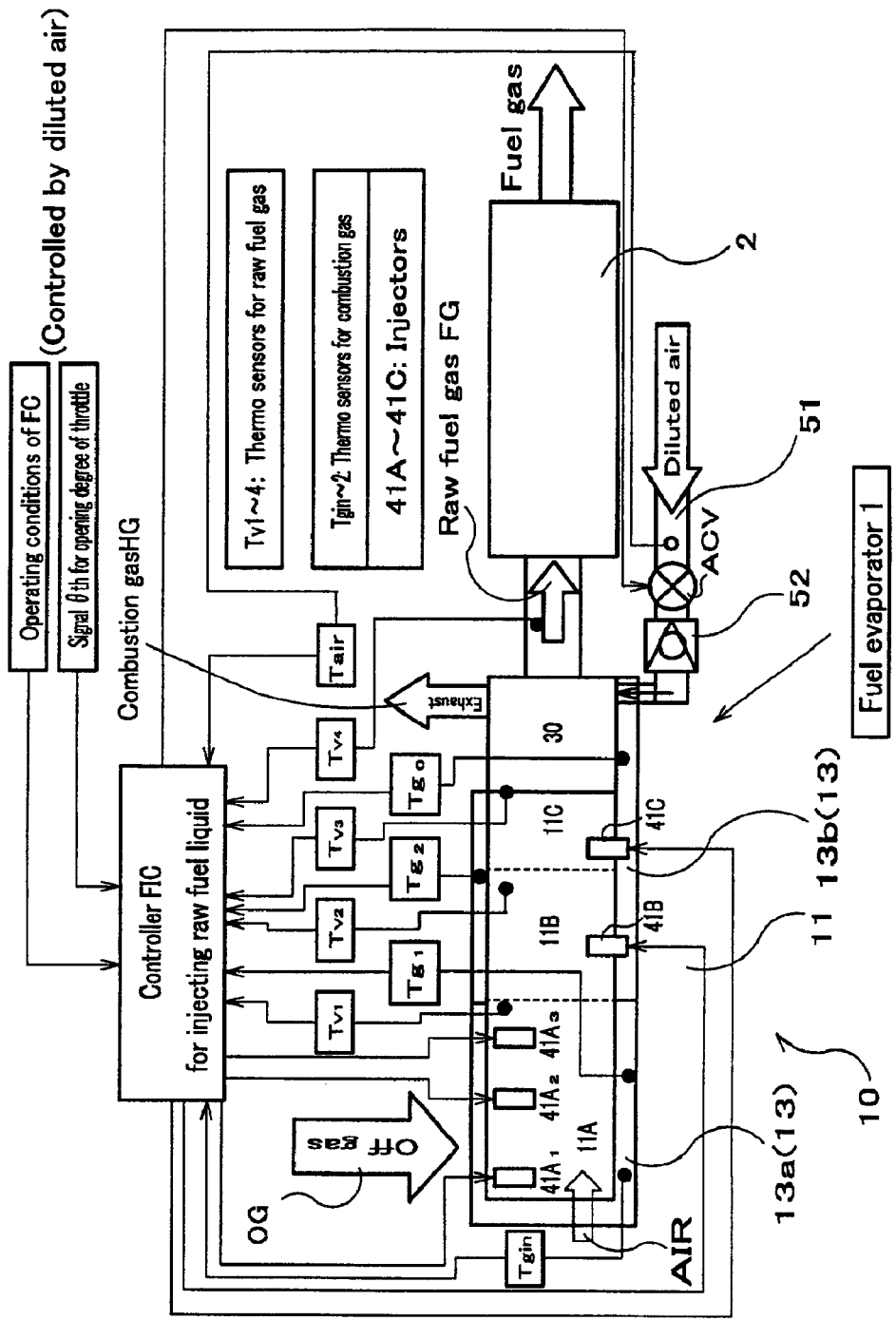
FIG. 13 is a block diagram showing the control system of the fuel evaporator according to the second embodiment of the present invention.

FIG. 12 is a partial cutaway plane view of the fuel evaporator according to the second embodiment of the present invention. FIG. 13 is a block diagram showing the control system of the fuel evaporator according to the second embodiment of the present invention.

[Fuel Cell System]

The fuel cell system according to the second embodiment is the same as that according to the first embodiment, and the description thereof will be omitted.

[Fuel Evaporator]

The fuel evaporator according to the second embodiment has all of the configurations possessed by the fuel evaporator according to the first embodiment. In addition, the fuel evaporator according to the second embodiment possesses an inlet for diluted air (inlet for low temperature thermal medium), which mixes diluted air (low temperature thermal medium) with the combustion, a diluted air supply passage (low temperature thermal medium supply passage), a valve for supplying the diluted air (valve for supplying the low temperature thermal medium), and a controller for the valve for supplying the diluted air (controller for the valve for supplying the low temperature thermal medium), which controls the opening degree of the valve for supplying the diluted air.

The air compressor 4 shown in FIG. 1 serves as the inlet for the diluted air. More specifically, the diluted air is the air supplied from the compressor 4. A diluted air supply passage 51 is a piping, which connects the air compressor 4 with the shell inlet $32_{in}$ of the temperature control chamber 30, and a raw liquid fuel injection apparatus 40. The temperature of the diluted air is approximately from 10 to 70° C.

A diluted air supply valve ACV according to the second embodiment is a butterfly valve actuated by a stepping motor. The controller FIC for injecting the raw liquid fuel serves as a controller for the valve for supplying the diluted air to control the diluted air supply valve ACV. In FIG. 12, the symbol 5 stands for a check valve, and the symbol $T_{air}$ represents a thermo sensor which detects the temperature of the diluted air.

Utilizing such a configuration as described above, the temperature of the combustion gas HG supplied into the chamber 30 is varied whereby the temperature of the raw fuel gas FG is controlled.

(General Actuation of the Fuel Evaporator)

Among general control processes of the fuel evaporator 1 according to the second embodiment, the temperature of the raw fuel gas FG (at stationary state) controlled by mixing the diluted air with the combustion gas HG inherent to this embodiment will now be described. In the following description, the symbol $T_{air}$ does not represent a thermo sensor which detects the temperature of the diluted air, but represents the temperature of the diluted air detected by this thermo sensor.

Figure 14:
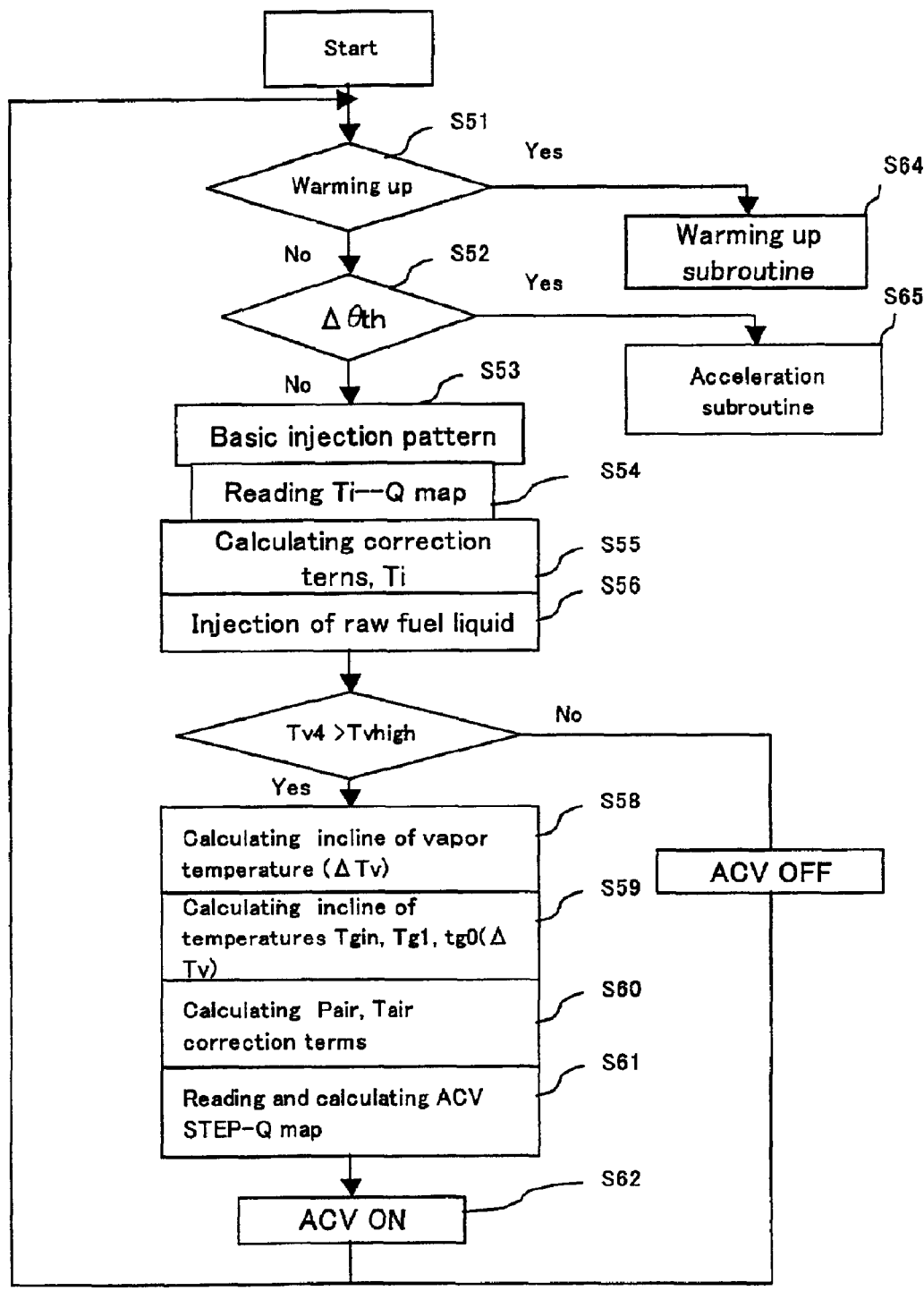
FIG. 14 is a flowchart showing the control where the temperature of the raw fuel gas is controlled by mixing a diluted air with the combustion gas of the fuel evaporator according to the second embodiment of the present invention.

FIG. 14 is a flowchart showing the control where the temperature of the raw fuel gas is controlled by mixing a diluted air with the combustion gas of the fuel evaporator according to the second embodiment of the present invention. This flowchart assumes the case in which the fuel cell system FCS is carried on the vehicle.

First, the controller judges whether or not the fuel evaporator is warming up (S51). If the fuel evaporator is warming up, warming up is carried out through a warming up subroutine (S64). Subsequently, the controller judges whether or not there is a change in the opening degree of the throttle (Δθth) (S52). If the change in the opening degree of the throttle (Δθth) exists, the acceleration is carried out by acceleration subroutine (S65). The acceleration subroutine carries out the injection of the raw liquid fuel FL during the course of the acceleration (during the transition).

If the controller judges in Step 52 that no change in opening degree of the throttle (Δθth) exists, injectors 41 are selected based on the basic injection pattern (see FIG. 8(*b*)), by referring to the speed of the vehicle, the opening degree of the throttle (θth) and the like (S53). A Ti-Q map is read, and the injection time Ti of raw liquid fuel FL (injection amount Q of the raw liquid fuel) is temporarily assumed (S54). Then, the correction based on various correction terms such as charge into the battery, actuations of accessories, etc., and the injection time Ti of the raw liquid fuel is determined by calculation (S55). Based on the basic injection pattern selected in Step S53 and the injection time Ti determined in Step S55, the fuel is injected from the injectors 41 (S56).

For example, in the case where the throttle (θth) is somewhat opened, the injector $41A_3$ and the injector $41A_2$ are selected (S53), the injection time Ti is then calculated (S54 and S55), the injector $41A_3$ and the injector $41A_2$ are controlled to actuate for the calculated period (S56).

Subsequently, the temperature $Tv_4$ of the raw fuel gas at the tube outlet $31_{out}$ of the temperature control chamber 30 is compared with the upper limit $Tv_{high}$ of the aimed temperature range shown in FIG. 8(*a*) (S57). If the temperature $Tv_4$ of the raw fuel gas is higher, the temperature of the raw fuel gas FL is decreased. Specifically, the temperature inclines of the temperatures $Tv_1$, $Tv_2$, and $Tv_3$ of the raw fuel gas (temperature inclines between $Tv_1$ and $Tv_2$; $Tv_2$ and $Tv_3$) at the respective measuring points are calculated (S58). Also, the temperature inclines of the temperatures $Tg_{in}$, $Tg_1$, $Tg_2$, and $Tg_0$ of the combustion gas (temperature inclines between $Tg_{in}$ and $Tg_1$; $Tg_1$ and $Tg_2$; $Tg_2$ and $Tg_0$) at the respective measuring points are calculated (S59). Furthermore, the controller detects the pressure $P_{air}$ of the diluted air and the temperature $T_{air}$ of the diluted air and, carries out the calculation of the correction terms (S60). Based on the calculation, STEP-Q map of the diluted air supply valve ACV is read and calculated to determine the opening degree (STEP) of the diluted air supply valve ACV (S61). Then, based on the determined opening degree, the diluted air supply valve ACV is turned on (S62). By the series of the operations, an adequate amount of the diluted air is supplied to the shell side 32 of the temperature control chamber 30 (to mix the combustion gas HG with the diluted air), whereby the temperature ($Tv_4$) of the raw fuel gas FG flowing in the side of the shell 32 is decreased to be within the aimed temperature range.

On the other hand, in Step 57, if the temperature ($Tv_4$) of the raw fuel gas FG is judged to be lower than the upper limit $Tv_{high}$ of the aimed temperature range, the diluted air supply valve ACV is turned off to wide-open the valve (S63). This treatment suppresses the heat loss.

As described above, when the diluted air is mixed with the combustion gas to be supplied into the temperature control chamber 30, the temperature of the raw fuel gas can be controlled in a more suitable manner than that of the first embodiment.

<<Third Embodiment>>

Next, the fuel evaporator according to the third embodiment of the present invention will now be described. With regard to the same members and elements as in those utilized in the first embodiment, descriptions will be made by referring to the drawings utilized in the first embodiments, or are omitted.

Figure 15:
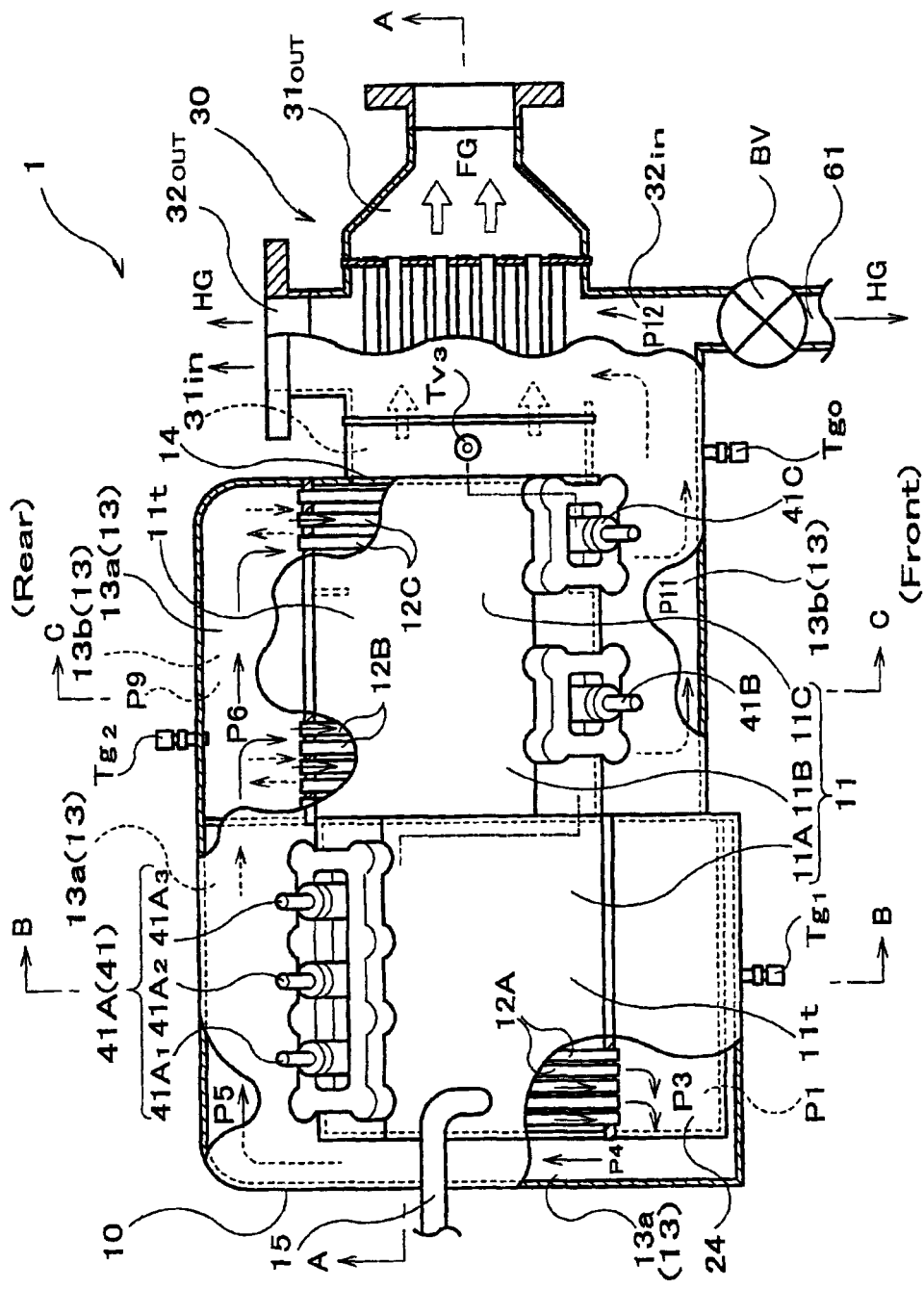
FIG. 15 is a partial cutaway plane view of the fuel evaporator according to the third embodiment of the present invention.
Figure 16:
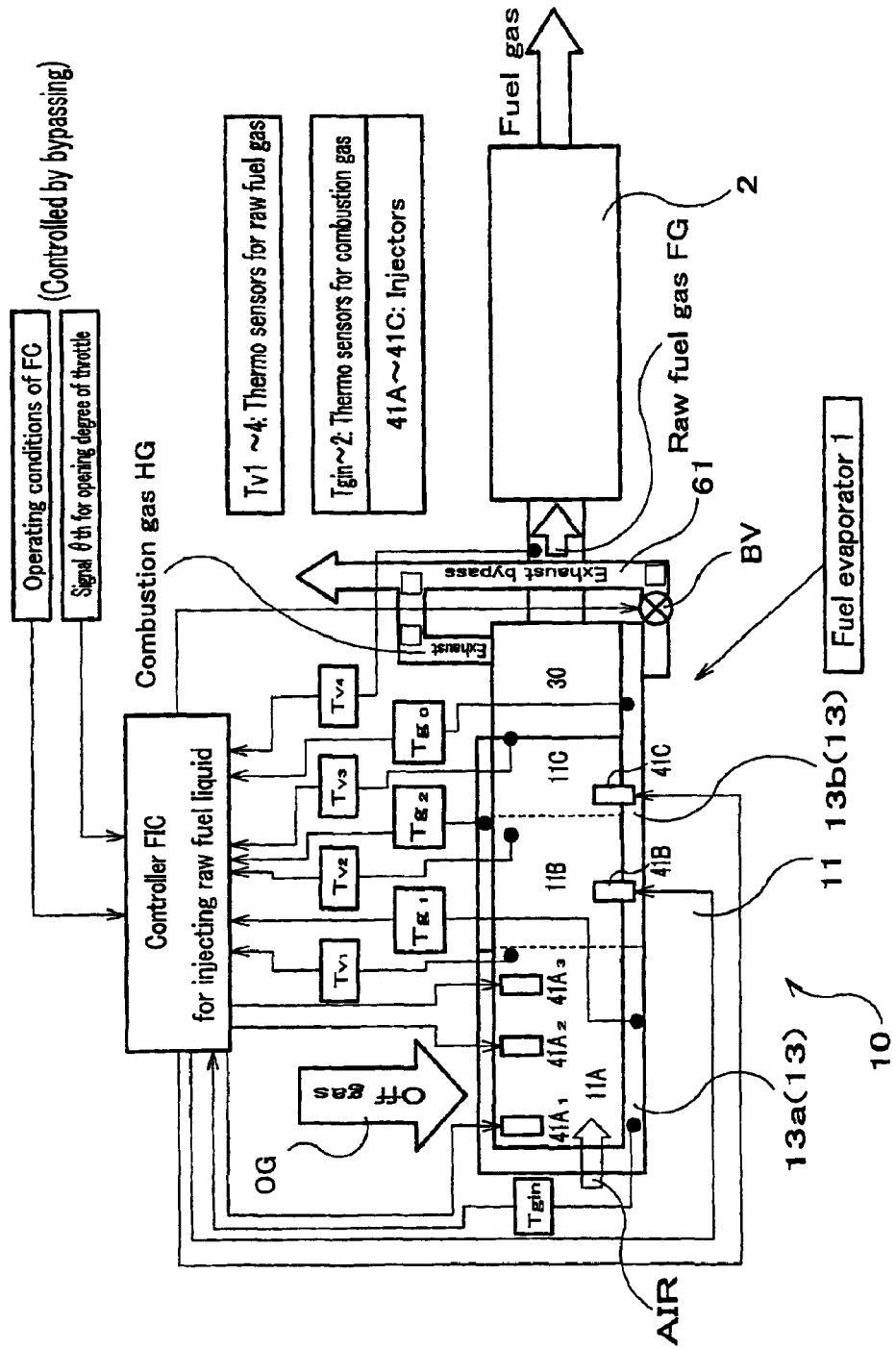
FIG. 16 is a block diagram showing the control system of the fuel evaporator according to the third embodiment of the present invention.

FIG. 15 is a partial cutaway plane view of the fuel evaporator according to the third embodiment of the present invention. FIG. 16 is a block diagram showing the control system of the fuel evaporator according to the third embodiment of the present invention.

[Fuel Cell System]

The fuel cell system according to the third embodiment is the same as that according to the first embodiment, and the description thereof will be omitted.

[Fuel Evaporator]

The fuel evaporator according to the third embodiment has all of the configurations possessed by the fuel evaporator according to the first embodiment. In addition, the fuel evaporator according to the third embodiment possesses a bypass channel, which draws the combustion gas (high temperature gas) to be introduced into the chamber for controlling the temperature of the gas and bypasses the chamber for controlling the temperature of the gas, a bypass control valve, and a bypass valve controller, which control the opening degree of the bypass valve.

The bypass channel 61 is a bypass channel for the combustion gas, which branched off from the shell inlet $32_{in}$ of the temperature control chamber 30, bypasses the shell 31, and is joined to the shell outlet $32_{out}$. The bypass valve BV in the third embodiment is a butterfly valve actuated by a stepping motor. The controller FIC for injecting the raw liquid fuel serves as the bypass controller, and controls the situation of the bypass valve BV.

According to this configuration, the amount of the combustion gas HG supplied into the temperature control chamber 30 is varied to thereby control the temperature of the raw fuel gas FG.

[General Actuation of the Fuel Evaporator]

The fuel evaporator 1 according to the third embodiment has the same operations and functions as those of the fuel evaporator according to the first embodiment, except that the flow of the combustion gas HG is withdrawn in order to vary the amount of the combustion gas HG.

[Typical Control of Fuel Evaporator]

Among general control processes of the fuel evaporator 1 according to the third embodiment, the temperature of the raw fuel gas FG (at stationary state) controlled by bypassing the combustion gas HG inherent to this embodiment will now be described.

Figure 17:
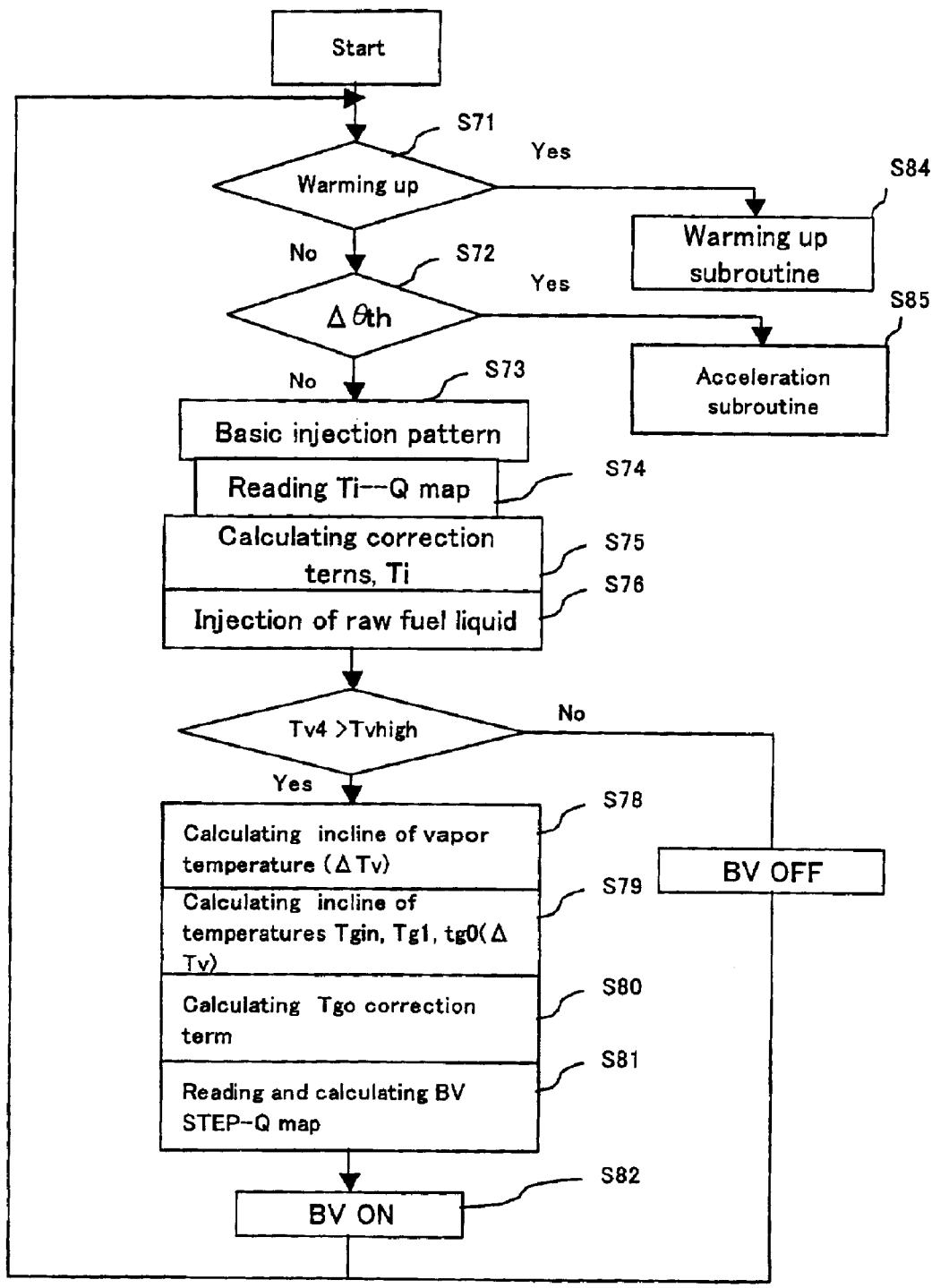
FIG. 17 is a flowchart showing the control where the temperature of the raw fuel gas is controlled by bypassing the combustion gas of the fuel evaporator according to the third embodiment of the present invention.

FIG. 17 is a flowchart showing the control where the temperature of the raw fuel gas is controlled by bypassing the combustion gas HG according to the third embodiment of the present invention. This flowchart assumes the case in which the fuel cell system FCS is carried on the vehicle.

First, the controller judges whether or not the fuel evaporator is warming up (S71). If the fuel evaporator is warming up, warming up is carried out through a warming up subroutine (S84). Subsequently, the controller judges whether or not there is a change in the opening degree of the throttle (Δθth) (S72). If the change in the opening degree of the throttle (Δθth) exists, the acceleration is carried out by acceleration subroutine (S85). The acceleration subroutine carries out the injection of raw liquid fuel FL during the course of the acceleration (during the transition).

If the controller judges in Step 72 that no change in opening degree of the throttle (Δθth) exists, injectors 41 are selected based on the basic injection pattern (see FIG. 8(*b*)), by referring to the speed of the vehicle, the opening degree of the throttle (θth) and the like (S73). A Ti-Q map is read, and the injection time Ti of raw liquid fuel FL (injection amount Q of the raw liquid fuel) is temporarily assumed (S74). Then, the correction based on various correction terms such as charge into the battery, actuations of accessories, etc., and the injection time Ti of the raw liquid fuel is determined by calculation (S75). Based on the basic injection pattern selected in Step S73 and the injection time Ti determined in Step S75, the fuel is injected from the injectors 41 (S76).

For example, in the case where the throttle (θth) is somewhat opened, the injector $41A_3$ and the injector $41A_2$ are selected (S73), the injection time Ti is then calculated (S74 and S75), the injector $41A_3$ and the injector $41A_2$ are controlled to actuate for the calculated period (S76).

Subsequently, the temperature $Tv_4$ of the raw fuel gas at the tube outlet $31_{out}$ of the temperature control chamber 30 is compared with the upper limit $Tv_{high}$ of the aimed temperature range shown in FIG. 8(*a*) (S77). If the temperature $Tv_4$ of the raw fuel gas is higher, the temperature of the raw fuel gas FL is decreased. Specifically, the temperature inclines of the temperatures $Tv_1$, $Tv_2$, and $Tv_3$ of the raw fuel gas (temperature inclines between $Tv_1$ and $Tv_2$; $Tv_2$ and $Tv_3$) at the respective measuring points are calculated (S78). Also, the temperature inclines of the temperatures $Tg_{in}$, $Tg_1$, $Tg_2$, and $Tg_0$ of the combustion gas (temperature inclines between $Tg_{in}$ and $Tg_1$; $Tg_1$ and $Tg_2$; $Tg_2$ and $Tg_0$) at the respective measuring points are calculated (S79). Furthermore, the controller detects the temperature $Tg_0$ of the combustion gas and, carries out the calculation of the correction terms (S80). Based on the calculation, STEP-Q map of the bypass valve BV is read and calculated to determine the opening degree (STEP) of the bypass valve (S81). Then, based on the determined opening degree, the bypass valve BV is turned on (S82). By the series of the operations, the amount of the combustion gas HG flowing to the shell side 32 of the chamber 30 for controlling is suppressed to thereby decrease the heat value imparted to the raw fuel gas FG, whereby the temperature ($Tv_4$) of the raw fuel gas FG is decreased (minimizing the difference between the temperatures of $Tv_4$ and $Tv_2$) to be within the aimed temperature range.

On the other hand, in Step 87, if the temperature ($Tv_4$) of the raw fuel gas FG is judged to be lower than the upper limit $Tv_{high}$ of the aimed temperature range, the bypass valve BV is turned off to wide-open the bypass valve (S83). This treatment suppresses the heat loss.

As described above, when the combustion gas, which is a heat source, is withdrawn and is bypassed, the temperature of the raw fuel gas can be in a more suitable manner than that of the first embodiment.

<<Forth Embodiment>>

Next, the fuel evaporator according to the fourth embodiment of the present invention will now be described. Different from the fuel evaporators according to the first to third embodiments of the present invention, the fuel evaporator according to the fourth embodiment has a configuration having no chamber for controlling the gas temperature.

With regard to the same members and elements as in those utilized in the first embodiment, descriptions will be made by referring to the drawings utilized in the first embodiments, or are omitted.

Figure 18:
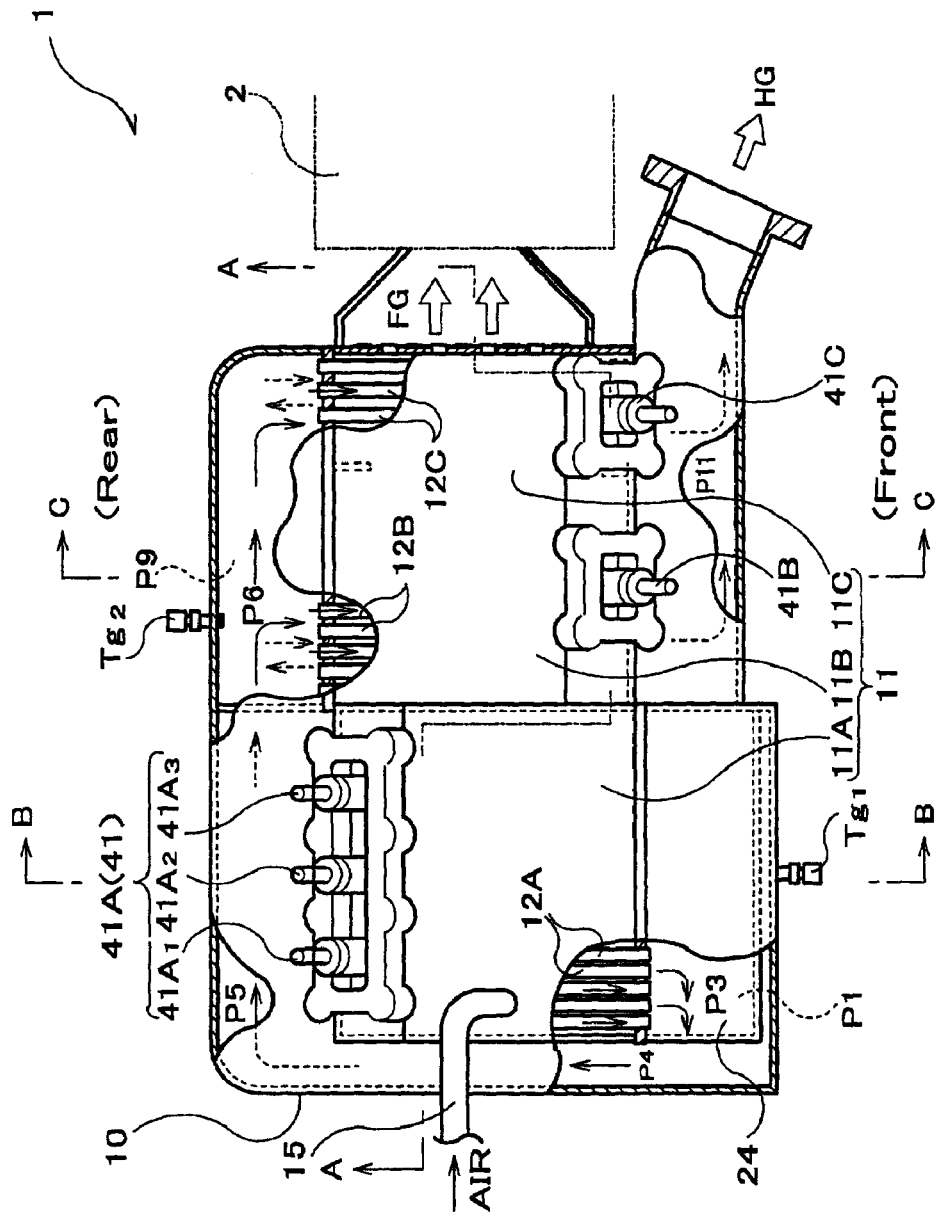
FIG. 18 is a partial cutaway plane view of the fuel evaporator according to the fourth embodiment of the present invention.
Figure 19:
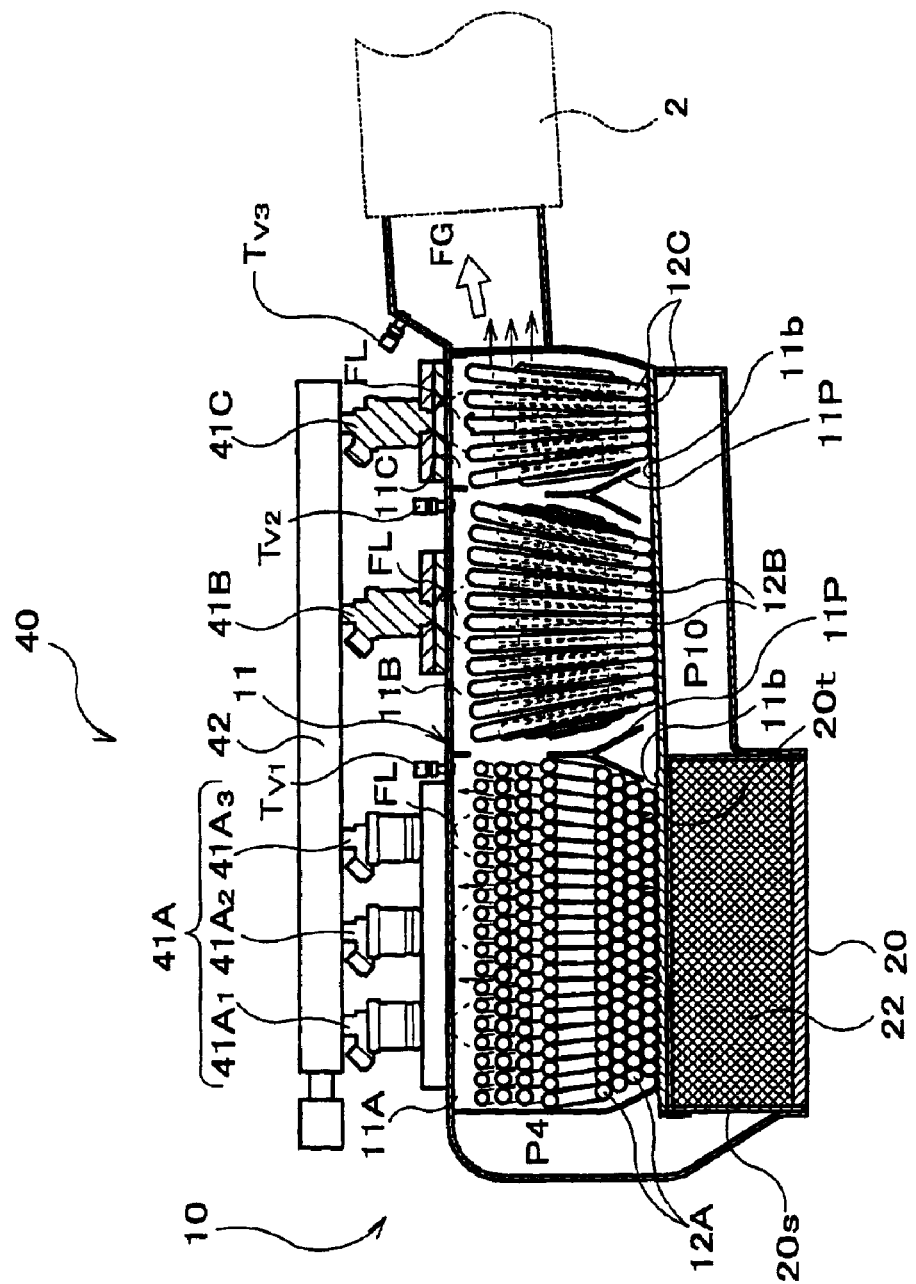
FIG. 19 is a cross-sectional view taken along the line A—A of FIG. 18.
Figure 20:
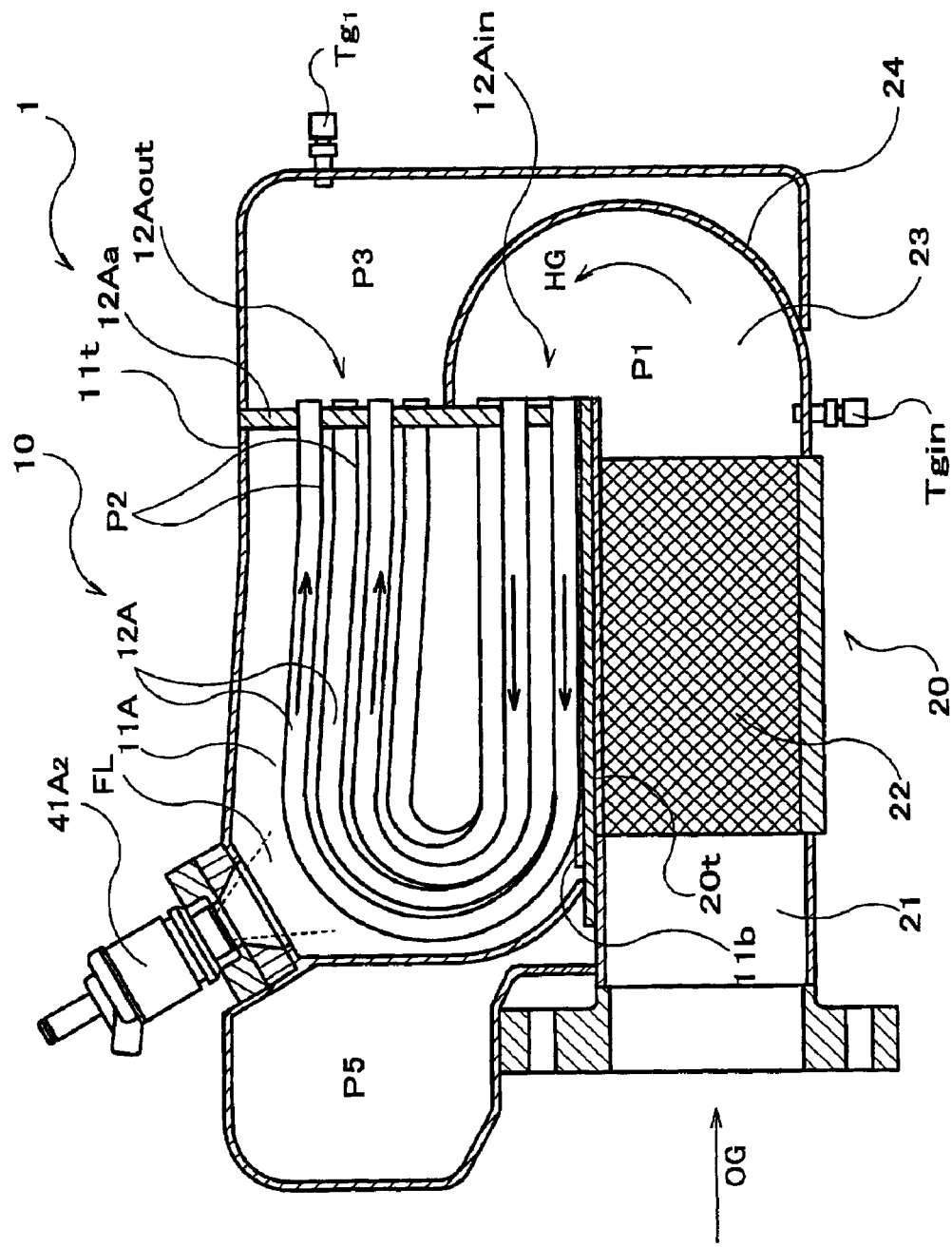
FIG. 20 is a cross-sectional view taken along the line B—B of FIG. 18.
Figure 21:
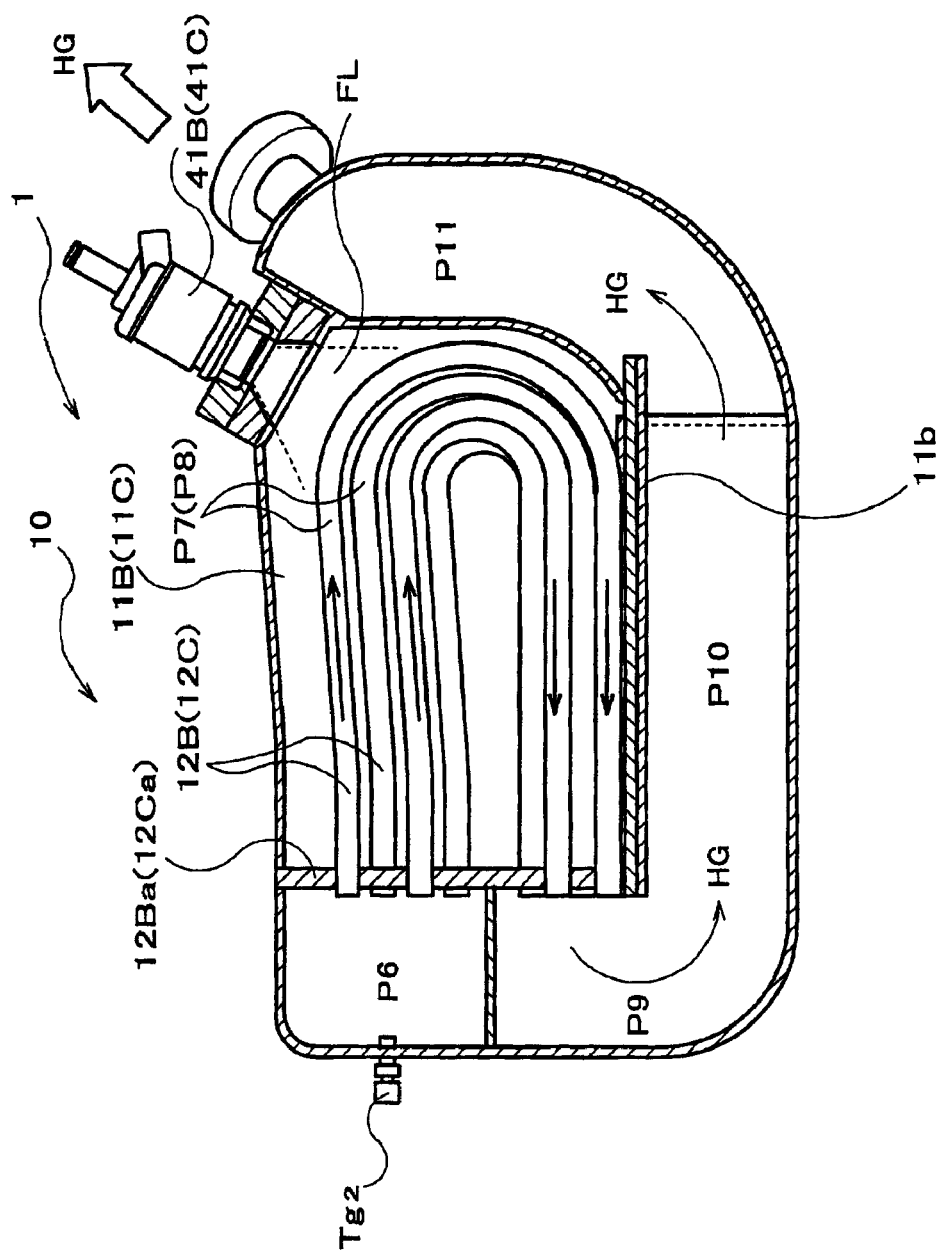
FIG. 21 is a cross-sectional view taken along the line C—C of FIG. 18.
Figure 22:
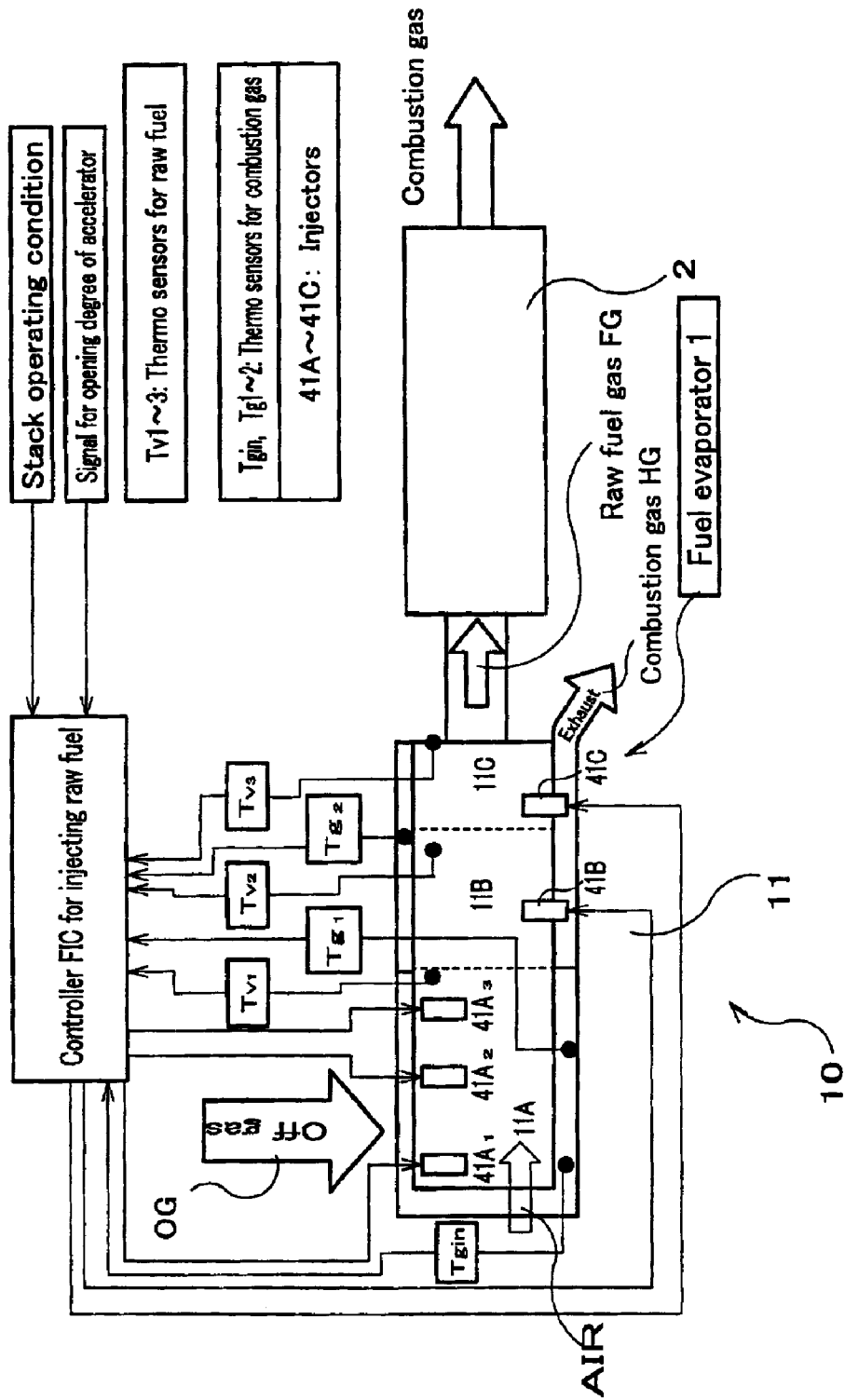
FIG. 22 is a block diagram showing the control system of the fuel evaporator according to the fourth embodiment of the present invention.

FIG. 18 is a partial cutaway plane view of the fuel evaporator according to the fourth embodiment of the present invention. FIG. 19 is a cross-sectional view taken along the line A—A of FIG. 18. FIG. 20 is a cross-sectional view taken along the line B—B of FIG. 18. FIG. 21 is a cross-sectional view taken along the line C—C of FIG. 18. FIG. 22 is a block diagram showing the control system of the fuel evaporator according to the fourth embodiment of the present invention.

[Fuel Cell System]

The fuel cell system according to the fourth embodiment is the same as that according to the first embodiment, and the description thereof will be omitted.

[Fuel Evaporator]

As shown in FIG. 18, the fuel evaporator according to the fourth embodiment has a configuration of not possessing any chamber for controlling the gas temperature unlike the fuel evaporators according to the first to third embodiments.

Characteristic configurations of the fuel evaporator 1 of the fourth embodiment will now be described by referring to the drawings.

As shown in FIGS. 18 to 21, the fuel evaporator according to the fourth embodiment mainly comprises:

a body 10 of the fuel evaporator composed of a evaporation chamber 11 having evaporation chambers 11A, 11B, and 11C, each having tubes 12A, 12B, or 12C for thermal medium and a tube supporter 12Aa, 12Ba, or 12Ca for holding the respective thermal medium tube provided thereon to serially connect these evaporation chamber with each other in a ventilation manner, and gas passages P1 to P11 surrounding around of the evaporation chamber 11;

a raw liquid fuel injection apparatus 40 formed from a tube 42 for supplying the raw liquid fuel FL and injectors 41A, 41B, and 41C, which are means for injecting the raw liquid fuel, each provided on the lower portion of the tube 42 for supplying the raw liquid fuel;

a catalytic combustor 40, which is a means for providing a heat source provided on the lower portion of the evaporation chamber 11A and which generates a combustion gas HG serving as the high temperature thermal medium; and a controller 100 for the injection of the raw liquid fuel, which receives a signal required for the raw fuel gas to select any of injector or injectors 41A, 41B, and 41C, so that the a predetermined amount of the raw liquid fuel FL is injected from the selected injector(s).

The body 10 of the fuel evaporator is composed of the evaporation chamber 11 and gas passages P1 to P11 surrounding around of the evaporation chamber 11.

As shown in FIG. 19, the evaporation chamber 11 is composed of three evaporation chambers, i.e., a first evaporation chamber 11A having the highest evaporation performance (having the largest number of the thermal medium tubes 12A), a second evaporation chamber 11B having the next highest evaporation performance (having the next largest number of the thermal medium tubes 12B), and a third evaporation chamber 11C (having the smallest number of the thermal medium tubes 12C), and is a boxy chamber having these three chambers serially connected with each other in a ventilation manner.

The order where each of the chambers is connected is not specifically restricted. For example, the first evaporation chamber 11A may reside between the second evaporation chamber 11B and the third evaporation chamber 11C.

Within the evaporation chamber 11, a predetermined amount of the raw liquid fuel FL is injected onto the external surfaces of the thermal medium tubes from selected injector (s) whose injection amount of the raw liquid fuel FL is determined by the controller 100 depending upon the evaporation performance. With regard to the direction of injecting the raw liquid fuel FL by each of the injectors 41A, 41B, and 41C, the raw liquid fuel FL is injected toward the inlet side of the thermal medium tubes 12A, 12B, or 12C each provided on the evaporation chamber 11A, 11B, or 11C (the entrance side of the combustion gas HG).

As described above, in comparison with the evaporation chamber composed of only one evaporation chamber, when the evaporation chamber having the same capacity as in that of the evaporation chamber composed of only one evaporation chamber is divided into several chambers, and raw liquid fuel FL is separately injected according to the evaporation performance of each evaporation chamber, the uneven injection to dead space during the injection or tubes for thermal medium which is thermal transmitting tubes can be decreased and, thus, the heat efficiency per unit volume of the evaporation chamber is increased. As a result, the evaporation is instantly brought about. This makes it possible to quickly supply the required amount of the raw fuel gas at the time of the requirement.

These functions are the same as those of the first embodiment.

The raw fuel gas injection apparatus 40 is provided on the upper portion of the fuel evaporator 11, and as shown in FIG. 19, it is composed of the tube 42 for supplying the raw liquid fuel which is a manifold tube for supplying the raw liquid fuel FL to the injectors 41A, 41B, and 41C, and injectors 41A, 41B, and 41C each of which is provided on the upper portion of the evaporator 11A, 11B, or 11C and injects a controlled amount of the raw liquid fuel FL.

The injectors 41A, 41B, and 41C each is a single fluid nozzle, and the flow amount is controlled by means of a nozzle backpressure. As shown in FIGS. 18 and 19, three injectors ($41A_1$, $41A_2$, and $41A_3$) are provided on the upper portions of the first evaporation chamber 11A having the highest evaporation performance (having the largest number of the thermal medium tubes 12A), and one injector (41B or 41C) is provided on each of the second evaporation chamber 11B having the next highest evaporation performance (having the next largest number of the thermal medium tubes 12B), and the third evaporation chamber 11C (having the smallest number of the thermal medium tubes 12C).

As described above, by injecting a large amount of the raw liquid fuel from a plurality of the injectors over a wide area of the evaporation chamber having significantly high evaporation performance at the same time, a large amount of raw fuel gas can be quickly supplied (at the time of acceleration) Consequently, the fuel evaporator according to this embodiment is of sufficiently responsibility to a sharp and large load requirement.

The thermal medium tubes 12A, 12B, and 12C are provided within the evaporation chambers 11A, 11B, and 11C, allow for the flow of a combustion gas HG, which is a high temperature thermal medium, and evaporates the raw liquid fuel FL in contact with the outer surface of the thermal medium tubes.

Thermal medium tubes 12A, 12B, and 12C each has a U-shape in which at least part of the upper piping is slanted downwardly to the tube supporter 12Aa, 12Ba, or 12Ca. Also, the tube supporters 12Aa, 12Ba, and 12Ca are provided, which support both ends of the thermal medium tubes 12A, 12B, and 12C. By such a formation, the droplets of the raw liquid fuel FL adhered on the upper portions of the tube can be evaporated in a suitable manner by transferring the droplets toward the tube supporters 12Aa, 12Ba, and 12Ca having been heated due to thermal conduction from the catalytic combustor 20. Also, providing the tube supporters 12Aa, 12Ba, and 12Ca as wall portions prevents, the mixing of the combustion gas HG with the raw fuel gas FG within the evaporation chambers 11A, 11B, and 11C.

The piping of the thermal medium tubes 12A, 12B and 12C within the respective evaporation chambers 11A, 11B, and 11C is arranged so that the upper portion is sparser and the lower portion is denser. Such a formation makes it difficult to bring about the liquid residence due to increased heat mass on the bottom.

With regard to the pipe diameters of respective thermal medium tubes 12A, 12B, and 12C, all of the thermal medium tubes used have the same diameter.

As shown in FIG. 19, a diaphragm is provided between the first evaporation chamber 11A and the second evaporation chamber 11B. An upper inlet having a height same as the thickness of the thermal medium tubes on the upper portion of the diaphragm 11P, and a lower open is provided between a bottom plate 11b serving as a heat receiver and the diaphragm 11p. Part or whole of the conjunction portion of the lower open is opened. The diaphragm 11p has a cross-sectional shape so that the portion upper than the upper open is in a rectangle form and the portion lower than the upper open is in a reversed Y form. It is noted that similar diaphragm 11P is provided between the second evaporation chamber 11B and the third evaporation chamber 11C.

In addition to three injectors $41A_1$, $41A_2$, and $41A_3$ for injecting the raw liquid fuel FL, the upper portion of the first evaporation chamber 11A having the highest evaporation performance due to the possession of much more thermal medium tubes 12A and its bottom residing near the catalytic combustor 20, an air inlet 15 for supply of the air, which supplies the air required for the reformation caused in the later reformer 2, mixed with the raw liquid fuel FL is provided as shown in FIG. 18. Preference is to the provision of the evaporation chamber having the highest heat value and highest evaporation performance.

In such a formation, since the raw fuel gas FG collides with the respective thermal medium tubes 12A, 12B, and 12C provided within the respective evaporation chamber 11A, 11B, and 11C, and since the diaphragm 11P is perfectly mixed with the air, the raw fuel gas FL having a uniform composition can be introduced into the latter reactor, i.e., the reformer 2.

As shown in FIGS. 19 and 20, the bottom plate 11b severing as the heat receiver is provided on the first evaporation chamber 11A near or in contact with a ceiling 20t of the catalytic combustor 20, which is the heat source. The bottom plate 11b near or in contact with the ceiling 20t makes it possible to securely transmit the heat from the catalytic combustor 20 to the evaporation chamber 11A. Also, by increasing the amount of the combustion gas in the catalytic combustor 20, the heat value required in the evaporation chamber 11A can always be supplied.

It is noted that the catalytic combustor 20 maybe provided on any other evaporation chamber.

As described above, when one evaporation chamber is configured to have a thermal conductive area (possession of much more thermal medium tubes) wider than other evaporation chamber(s) and to provide the bottom plate severing as the heat receiver, the raw fuel gas can instantly provide from such a evaporation chamber having the wider thermal conductive area by imparting a larger heat value.

The bottom plate 11b of the second evaporation chamber 11b and the third evaporation chamber 11C is made of one plate communicated with the bottom plate 11b, and as shown in FIG. 19, a slope is formed toward the first evaporation chamber 1A.

By proving the catalytic combustor 20, which is the heat source, near or in contact with any of the bottom of the evaporation chambers, providing the bottom plate, which serves as the heat receiver, on the evaporation chamber near or in contact with the catalytic combustor 20, and providing the slope downward to the heat receiver side of the evaporation chamber, the remaining raw liquid fuel FL, which is not evaporated in the evaporation chamber, moves along the slope to be collected on the heat receiver rapidly heated, at which the remaining raw liquid fuel FL is evaporated. Consequently, the predetermined amount of the raw fuel gas can be obtained with good response.

As shown in FIGS. 19 and 20, the catalytic combustor 20 has a rectangular cross-sectional shape, and is provided near or in contact with the bottom of the evaporation chamber 11A.

The catalytic combustor 20 is composed of an inlet 21 which introduce the off gas OG of the hydrogen pole of the fuel cell 5, which is a substance to be combusted, a catalytic layer 22 which catalyzes the off gas OG due to the combustion reaction, and an outlet 23 having a diaphragm 24 configured so that the flow direction of the combustion gas HG, which is the high temperature thermal medium can be turned 180°. The diaphragm 24 also plays a role in preventing the combustion gas at the outlet side of the evaporation chamber 11A from being mixed with the combustion gas HG at the outlet 24 of the catalytic combustor 20.

Around the respective evaporation chamber 11A, 11B, and 11C, combustion gas passages P1 to P11 is formed, which allows for the combustion gas exiting the respective evaporation chamber 11A, 11B, and 11C for flowing. The formation of the combustion gas passages P1 to P11 can preserve the temperature within the evaporation chamber and heat the interior of the evaporation chamber and, thus, the raw liquid fuel FL can more suitably evaporated.

These are the same functions as those of the first embodiment.

Subsequently, the functions of the fuel evaporator 1 according to the fourth aspect will now be described by referring to FIGS. 18 to 21.

As shown in FIG. 20, the off gas OG from the hydrogen pole of the fuel cell 5, which is a gas to be combusted, is passed through the inlet 21 of the fuel evaporator, and flows toward the catalytic layer 22 of the catalytic combustor 20 as is at which the combustion reaction of the off gas is brought about to produce the combustion gas HG, after which the resulting combustion gas HG is discharged to the combustion gas passage P1, which is the base end. The produced combustion gas having a high temperature flows within the U-shaped thermal medium tubes 12A within the evaporation chamber 11A from the downside to the upside. During the passage through the U-shaped thermal medium tubes, the combustion gas HG evaporates the raw liquid fuel, which is injected from the injector(s) 41A to the outer surface of the thermal medium tubes 12A, to form the raw fuel gas FG.

Subsequently, the combustion gas HG, after evaporating the raw liquid fuel FL, is discharged from the outlet $12A_{out}$ of the thermal medium tube 12A to the combustion gas passage P3, then as shown in FIG. 18, passed through the combustion gas passage P3 (at the center front side of the evaporation chamber 11A), the combustion gas passage P4 (left front side of the evaporation chamber 11A), the combustion gas passage P5 (rear side of the evaporation chamber 11A), and enters into the combustion gas passage P6, these passages being provided so as to surround the evaporation chamber 11A. As shown in FIG. 21, the combustion gas HG having a high temperature is branched into two ways from the combustion gas passage P6, flows within the tubes 12B and 12C, respectively (combustion gas passages P7 and P8) from the downside to the upside, and is passed through the combustion gas passage P9 residing at rear surface (side) viewing from the front side, through the combustion gas passages P10 provided on the bottoms of the evaporation chambers 11B and 11C and through the combustion gas passage P11 making up the terminals of the sides of the evaporation chambers 11B and 11C, and then discharged out. The functions described herein are those in the case where the injection of the standard injection pattern by the injectors 41A within the evaporation chamber 11A by means of the controller 100 for the raw liquid fuel injection, which will be described later on.

On the other hand, as shown in FIG. 19, the raw fuel gas FL evaporated at the first evaporation chamber 11A is passed through the open of the diaphragm 11P, serially through the second evaporation chamber 11B and the third evaporation chamber 11C and then introduced into the reformer 2, which is the later reactor.

The controller 100 for the raw liquid fuel injection, which controls the injection amount of the raw liquid fuel FL and the injection position(s) of the injectors 41A, 42B, and 42C, will now be described. In the following description, the controller 100 for the raw liquid fuel injection in the case of carrying the fuel cell system FCS on a vehicle will be assumed.

The term "idling (idle)" to be used herein means the situation where a small amount of the raw fuel gas is generated for maintaining the operation of accessories (e.g., compressor, heater, air conditioner, etc.) even if any amount of the raw fuel gas FG is required by the fuel cell 5.

Also, the term "low load" used herein means a certain pushing of the accelerator to lowly open the throttle, in which case the required amount of the raw fuel gas is higher than the case of idling.

The term wide opening the throttle (WOT) used herein is in the state where the opening degree of the throttle is the maximum, in which case the required amount of the raw fuel gas is the highest.

The positions of the thermo sensors equipped with the fuel evaporator 1 will be described.

As shown in FIGS. 19 and 21, three thermo sensors for detecting the temperature of the combustion gas HG are equipped, and three thermo sensors for detecting the temperature of the raw fuel gas are equipped.

$Tg_{in}$: The temperature of the combustion gas at the outlet of the catalytic combustor (the gas temperature at the inlet of the first evaporator 11A).
wherein the symbols of the thermo sensors detects the following temperatures:

$Tg_1$: The temperature of the combustion gas at the outlet of the first evaporation chamber 11A.

$Tg_2$: The temperature of the combustion gas at the outlets of the second evaporation chamber 11B and the third evaporation chamber 11C.

$Tv_1$: The temperature of the raw fuel gas at the outlet of the first evaporation chamber 11A.

$Tv_2$: The temperature of the raw fuel gas at the outlet of the second evaporation chamber 11B.

$Tv_3$: The temperature of the raw fuel gas at the outlet of the third evaporation chamber 11C.

The controller 100 for the raw liquid fuel injector is a controller which controls the selection of the injector or injectors to be injected and the respective injection amounts based on the detected temperature data, signals for the operation conditions of the stack required from the body of the fuel cell, and the signal of the opening degree of the throttle.

Similar to the first embodiment, in the case of the fourth embodiment, the positions of the injectors, which inject the raw liquid fuel, are switched as shown in FIG. 7. By injecting the raw liquid fuel from the inner part of the evaporation chamber, the temperature of the raw fuel gas at the outlet of the evaporation chamber can be heightened. On the other hand, by injecting the raw liquid fuel from the nearest portion of the outlet of the evaporation chamber, the temperature of the raw fuel gas at the outlet of the evaporation chamber can be lowered.

Utilizing the test results of the temperature of the raw fuel gas depending upon the positions, the fourth embodiment makes a temperature control resembling the first embodiment.

Specifically, similar to the case of the first embodiment, the basic injection pattern uses the injector $41A_2$ in the case where the fuel cell 5 is idling. In the case of the low loading where the required output is higher, the raw liquid fuel is injected from the two injectors $41A_2$ and $41A_3$. Also, in the case where the required amount is further increased, the combination of the two injectors $41A_2$ and $41A_3$ is switched to the combination of the two injectors $41A_1$ and $41A_w$, which can inject larger amount of the raw liquid fuel. In the case where the maximum output is required as in the case of wide opening the throttle (WOT), the raw liquid fuel is injected from the three injectors $41A_1$ and $41A_3$, and $41A_3$. On the other hand, the injectors 41B and 41 are always turned off. By such a configuration the later evaporation chambers 11B and 11C are always in the empty burned and, thus, the temperature of the raw fuel gas FG can be suitably controlled by switching the injectors.

As described above, when the controller 100 for injecting the raw liquid fuel where the signal required from the is received, and any of the injector or injectors are selected for injecting the raw liquid fuel, and the raw liquid fuel is injected from the selected injectors is provided, it is possible to judge which and how many evaporation chambers are used for injecting the raw liquid fuel. Also, when the raw liquid fuel is injected to severally divided evaporation chamber rather than one chamber, it is possible to make a dead space during the course of the injection and reduce any uneven injection to the thermal medium tubes, increasing the heat efficiency per unit volume. As a result, the raw liquid fuel can be instantly evaporated, which makes it possible to quickly supply the required amount of the raw fuel gas. Accordingly, the fuel evaporation of this embodiment can deal with the sharp requirement of the load.

Figure 23:
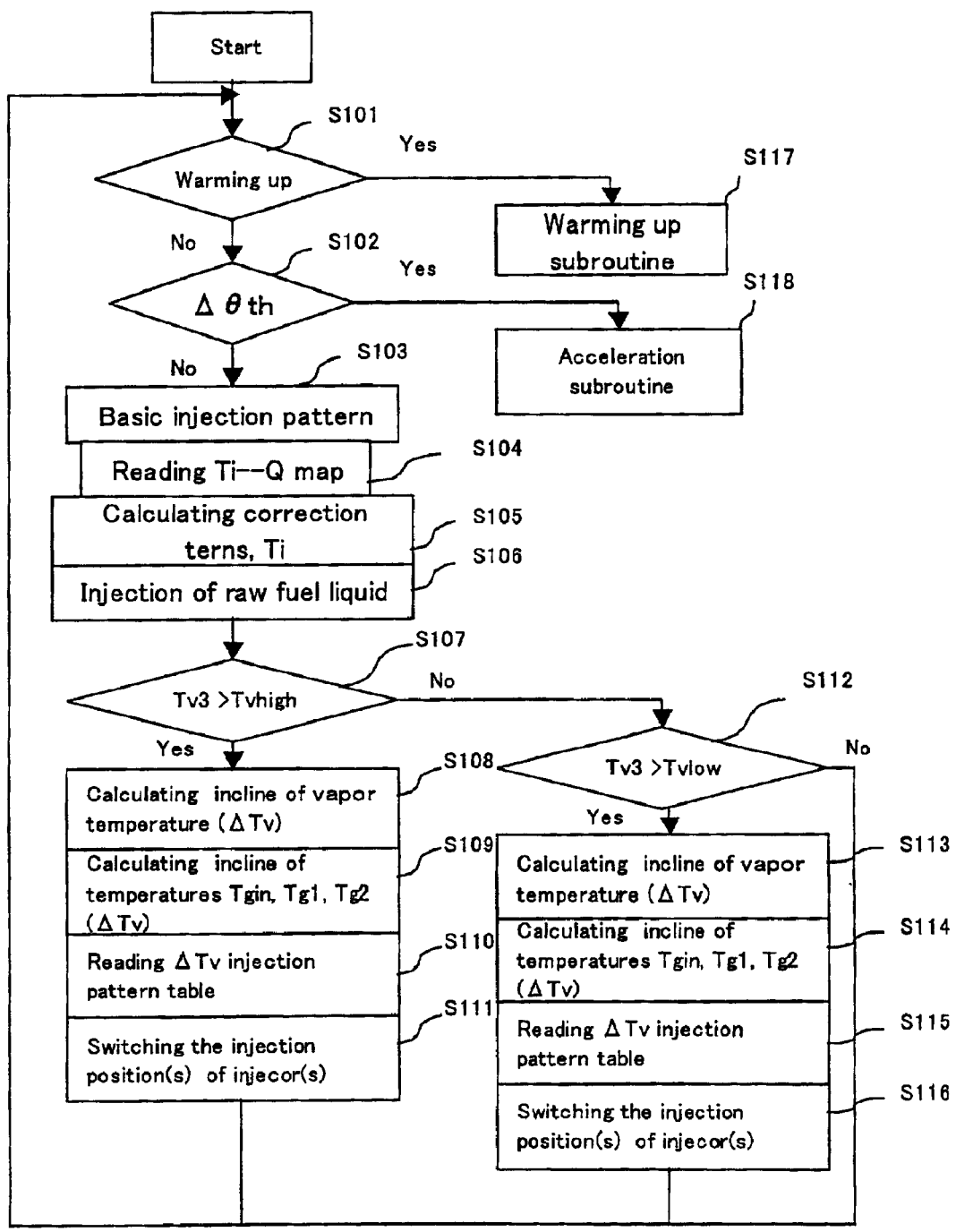
FIG. 23 is a flowchart showing the control of the fuel evaporator according to the fourth embodiment of the present invention at a stationary state.

By referring to FIG. 23, the control flow of the controller 100 for the raw liquid fuel injection will be described in the case where the temperature is controlled by selecting the positions of the injectors 41A ($41A_1$, $41A_2$, and $41A_3$) within the first evaporation chamber 11A, and the injectors 41B and 41C.

1. The controller judges whether or not the fuel evaporator is warming up (S101). If the fuel evaporator is warming up, warming up is carried out through a warming up subroutine (S117) to maintain the warming up.

2. If the fuel evaporator is not warming up, the controller confirms whether or not there is an increase in the opening degree of the throttle ($\Delta\theta th$) (S102).

If the increase in the opening degree of the throttle ($\Delta\theta th$) exists, the acceleration is carried out by acceleration subroutine (S118) to maintain the acceleration state.

3. In the case of the stationary operation where no increase in opening degree of the throttle ($\Delta\theta th$) exists, the basic injection pattern shown in FIG. 8(b) is read, i.e., the injectors 41 are selected. A map showing the relation between the injection times, Ti, of the injector and the injection amount of the raw liquid fuel is read (S104). From various correction terms (correction terms such as battery voltage), an actually required injection time, Ti, is calculated (S105) The raw liquid fuel FL is intermittently injected from the selected injectors 41A in a pulse-controlled manner (S106).

4. The controller compares the temperature $Tv_2$ at the outlet of the third evaporation chamber after the injection with the threshold temperature $Tv_{high}$ at the higher side (S107)

5. If the temperature $Tv_2$ at the outlet of the third evaporation chamber after the injection exceeds the threshold temperature $Tv_{high}$ at the higher side, the controller operates the following procedures:

(a) The temperature incline, $\Delta Tv$, at the side of the raw fuel gas FG is calculated from the detected raw fuel gas temperatures $Tv_1$, $Tv_2$, and $Tv_3$ (S108).

(b) The temperature incline, $\Delta Tv$, at the side of the combustion gas HG is calculated from the detected raw fuel gas temperatures $Tg_{in}$, $Tg_1$, and $Tg_2$ (S109).

(c) A table for $\Delta Tv$-injection pattern is read (S110).

(d) On the basis of the $\Delta Tv$-injection pattern, the injection positions of the injectors 41A are switched (S111).

As a specific example, the table for the $\Delta Tv$-injection pattern is provided so that in the case where the raw liquid fuel FL is injected from $41A_1$, $41A_2$, and $41A_3$, when $Tv_2$ is larger than $Tv_{high}$ ($v_2 > Tv_{high}$), the injection position is switched from $41A_1$ to 41C. By this series treatment, the temperature $Tv_2$ can be decreased to fall within the aimed temperature range.

Thereafter, the step is returned to S101.

6. If the temperature $Tv_2$ at the outlet of the third evaporation chamber 11C after the injection is lower than the threshold temperature $Tv_{high}$ at the higher side, the temperature $Tv_2$ is judged to be the threshold temperature $Tv_{low}$ at the lower side (S112). If the temperature $Tv_2$ of the raw fuel gas is lower than the threshold temperature $Tv_{low}$ at the lower side, Step is returned to S101. If the temperature $Tv_2$ of the raw fuel gas exceeds the threshold temperature $Tv_{low}$ at the lower side, the controller operates the following procedures:

(e) The temperature incline, $\Delta Tv$, at the side of the raw fuel gas FG is calculated from the detected raw fuel gas temperatures $Tv_1$, $Tv_2$, and $Tv_3$ (S113).

(f) The temperature incline, $\Delta Tv$, at the side of the combustion gas HG is calculated from the detected raw fuel gas temperatures $Tg_{in}$, $Tg_1$, and $Tg_2$ (S114).

(g) A table for $\Delta Tv$-injection pattern is read (S115).

(h) On the basis of the $\Delta Tv$-injection pattern, the injection positions of the injectors 41A are switched (S116).

As a specific example, the table for the $\Delta Tv$-injection pattern is provided so that in the case where the raw liquid fuel FL is injected from $41A_2$, when $Tv_2$ is lower than $Tv_{low}$ ($v_2 < Tv_{low}$), the injection position is switched from $41A_2$ to $41A_1$. By this series treatment, the temperature $Tv_2$ can be increased to fall within the aimed temperature range.

Thereafter, the step is returned to S101.

As described above, in order that the temperature at the outlet of the third evaporation chamber 11C at the time of injecting the raw liquid fuel FL by means of the injectors fall within the aimed temperature range based upon the basic injection pattern, the temperature incline, $\Delta Tv$, of the detected raw fuel gas temperatures $Tv_1$, $Tv_2$, and $Tv_3$, and that of the detected raw fuel gas temperatures $Tg_{in}$, $Tg_1$, and $Tg_2$ $Tg_{in}$, are calculated and they are compared with the value described in the table for the $\Delta Tv$-injection pattern. This can select newly injector or injectors to be injected again. As a result, an adequate amount of the raw fuel gas required can be quickly supplied with good response to the later reactor, reformer 2. Moreover, because of improved control of the temperature of the raw fuel gas FG, the heating portion, which has hitherto be provided at the outlet side of the fuel evaporator, is not required.

Figure 24:
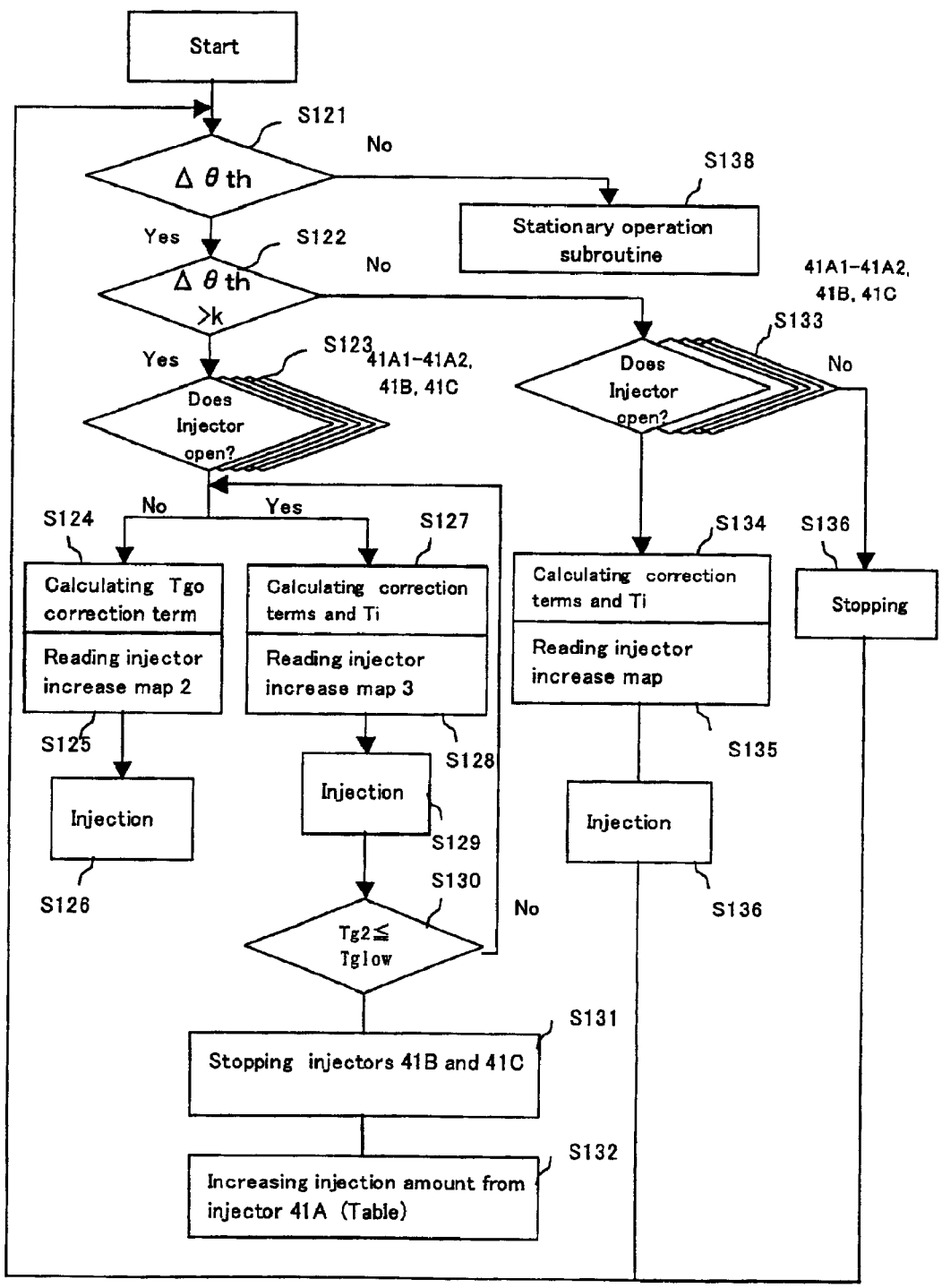
FIG. 24 is a flowchart showing the control of the fuel evaporator according to the fourth embodiment of the present invention at an accelerated state.

Next, the control flow of the controller 100 for the raw liquid fuel injection will now be described by referring to FIG. 24, in order to secure the amount of evaporating the raw liquid fuel at the time of accelerating the vehicle.

7. The controller determines an increase in the opening of the throttle ($\Delta\theta$th), and confirms whether or not there is an increase in the opening of the throttle ($\Delta\theta$th) (S121).

If the increase in the opening degree of the throttle ($\Delta\theta$th) does not exist, the controller enters in the stationary operation routine (S138) to maintain the present operation situation.

8. If the increase in the opening degree of the throttle ($\Delta\theta$th) exists, the controller compares the increase in the opening degree of the throttle ($\Delta\theta$th) with the threshold k of the acceleration degree to judge whether the increase in the opening degree of the throttle ($\Delta\theta$th) is middle acceleration or full acceleration (WOT) (S122).

9. If the increase in the opening degree of the throttle ($\Delta\theta$th) exceeds the threshold k of the acceleration degree, i.e., the vehicle is in middle acceleration or full acceleration (WOT), the controller judges the situation of actuating the injectors 41A ($41A_1$, $41A_2$, and $41A_3$), 41B and 41C, i.e., whether or not each of the injectors is turned off (S123).

(A) In order to actuate the injectors 41A, which are stopped, the injection amount of the raw liquid fuel is calculated as an actually required injection time, Ti, from the various correction terms (correction terms such as battery voltage, etc.) (S127). Next, a map 3 for increasing the injection amount of the injector is read (S128). Next, the injector(s) 41A having not been actuated are actuated to inject the raw liquid fuel FL. The raw liquid fuel FL is intermittently injected while pulse-controlling the injection time Ti (S129).

As described above, by injecting the raw liquid fuel from the injectors facing to the thermal transmission surfaces to which no raw liquid fuel FL is injected, the generation of the raw fuel gas as the amount for the acceleration can be effectively compensated with good response.

(B) With regard to the injectors 41A under operating, the amount of the raw fuel gas as the increase is calculated as an actually required injection time (additional time) from the various correction terms (the correction terms such as battery voltage, etc.) (S124). Next, a map 2 for increasing the injection amount of the injector is read (S125). The raw liquid fuel FL is intermittently injected while pulse-controlling the injection time Ti (S126).

(C) If the temperature $Tg_2$ of the combustion gas at the inlets of the second evaporation chamber 11B and the third evaporation chamber 11C exceeds the threshold temperature $Tg_{low}$ of the combustion gas at the lower side as a result of injecting the raw liquid fuel FL in S126 and S129, the step is returned to S27.

(D) When the temperature $Tg_2$ of the combustion gas at the inlets of the second evaporation chamber 11B and the third evaporation chamber 11C is lower than the threshold temperature $Tg_{low}$ of the combustion gas at the lower side, the injectors 41B and 41C are turned off (S131), and the injection amounts of the raw liquid fuel from the injectors $41A_1$, $41A_2$, and $41A_3$ are increased (S132).

This makes it possible to secure the amount of generating the raw fuel gas FG even if the temperature of the combustion gas HG is decreased, and to keep the temperature of the raw fuel gas. Thereafter, the step is returned to S121.

10. In the case where the increase in the open degree of the throttle ($\Delta\theta$th) is lower than the threshold k of the acceleration, i.e., in the case where the requirement for the acceleration is not so strong, the controller judges whether or not the injectors $41A_1$, $41A_2$, and $41A_3$ are operated (S133).

The injectors 41A which are not operated, should maintain the stopping state (S137). Thereafter, the step is returned to S121.

With regard to the injectors 41A under the operation, the injection amount of the raw liquid fuel is calculated as an actually required injection time, Ti, from the various correction terms (correction terms such as battery voltage, etc.). Next, an injector increase map 1 is read (S135). Based upon the calculated values and the injector increase map 1, the raw liquid fuel FL is intermittently injected while pulse controlling the injection time Ti (S136). By such a treatment, the requirement of increasing the raw fuel gas FL for a slight acceleration of the vehicle can be dealt. Then, the step is returned to S121.

As described above, the controller can judge whether the vehicle is under acceleration from the increasing of the open degree of the throttle, and controls the injection amounts and the injection position of the raw liquid fuel FL, certainly securing the required amount of the raw fuel gas FG at the time of the acceleration even if the temperature of the raw fuel gas FG is not controlled.

Similar to the first embodiment, the fuel evaporator according to the fourth embodiment can also provide a raw fuel gas having a suitable temperature range.

The fuel evaporator according to the fourth embodiment is not restricted to the above embodiment, and various modifications can be made.

For example, while the evaporation chamber in this embodiment is divided into three serially connected evaporation chambers, the number of the divided evaporation chambers may be two or four or more. Also, the combustion gas passages which are passages for the high temperature thermal medium may be provided on the upper surface of the evaporation chamber. By such a configuration, the escape of the heat from the upper surface of the evaporation chamber can be prevented. The catalytic combustor may be replaced by a combustion burner or an electric heater. As the high temperature thermal medium, the combustion gas whose heat is exchanged with air or a liquid, an air or a liquid heated by an electric heater may also be used.

For example, in the case where the heat value of the combustion gas is excess, part of the combustion gas is bypassed at the outlet of the catalytic combustor to be discharged. Conversely, in the case where the heat value of the combustion gas is lacking, auxiliary fuel such as methanol is electrically heated to be evaporated, and the evaporated auxiliary fuel is combusted in the catalytic combustor to increase the heat value of the combustion gas. The fuel cell is not restricted to a macromolecular type and may be a phosphoric acid type fuel cell (PAFC). Also, this embodiment may be performed irrelevant to the shape of the evaporation chamber. Moreover, various embodiments may be combined.

(Second Aspect)

The fuel evaporator according to the second aspect (fifth and sixth embodiments) of the present invention will now be described by referring to the drawings.

The second aspect of the present invention concerns the fuel evaporator having a single evaporation chamber different from the fuel evaporator according to the first aspect of the present invention. The fuel evaporator according to the present invention will now be described, which can be divided into two embodiments, i.e., the fifth embodiment where the high temperature thermal medium introduced into the chamber for controlling the gas temperature is bypassed and the sixth embodiment where a low temperature thermal medium is mixed with the high temperature thermal medium introduced into the chamber for controlling the gas temperature. With regard to the same members and elements of the fuel evaporator according to the second aspect of the present invention as in those utilized in the first aspect of the present invention, the drawings utilized therein are used and the same numbers or symbols are used in the following description.

<<Fifth embodiment>>

The fuel evaporator according to the fifth embodiment will now be described.

Figure 25:
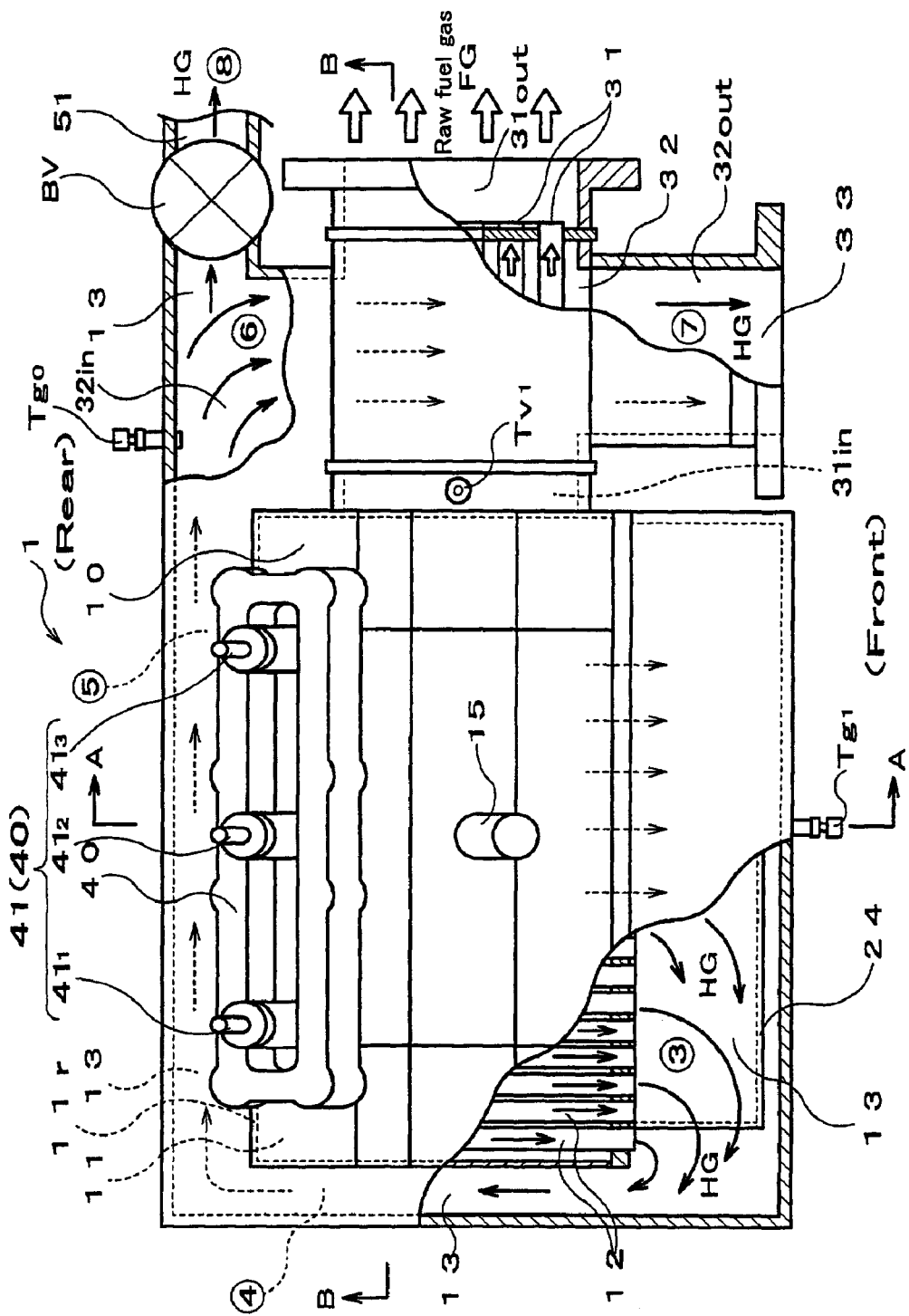
FIG. 25 is a partial cutaway plane view of the fuel evaporator according to the fifth embodiment of the present invention.
Figure 26:
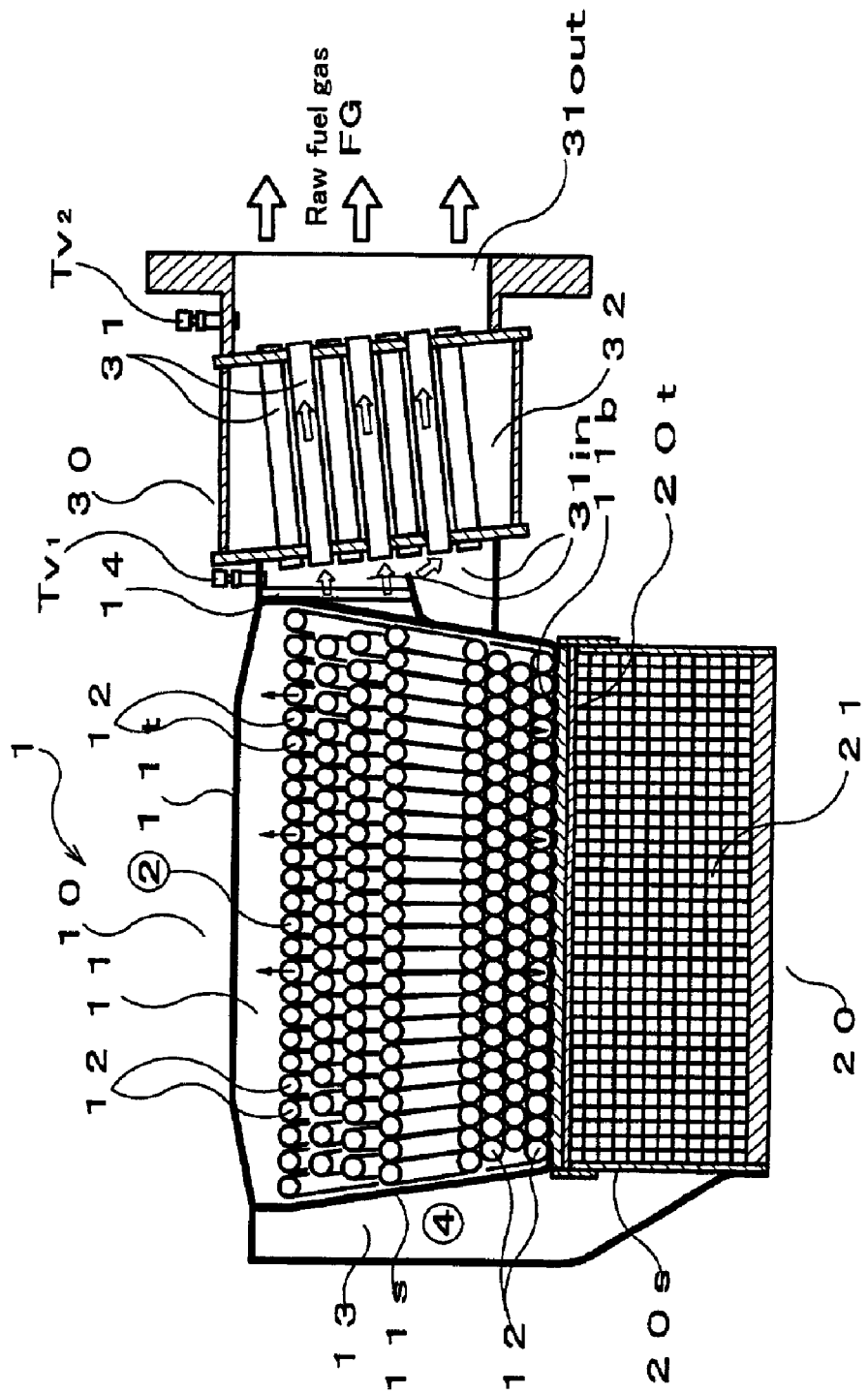
FIG. 26 is a cross-sectional view taken along the line A—A of FIG. 25
Figure 27:
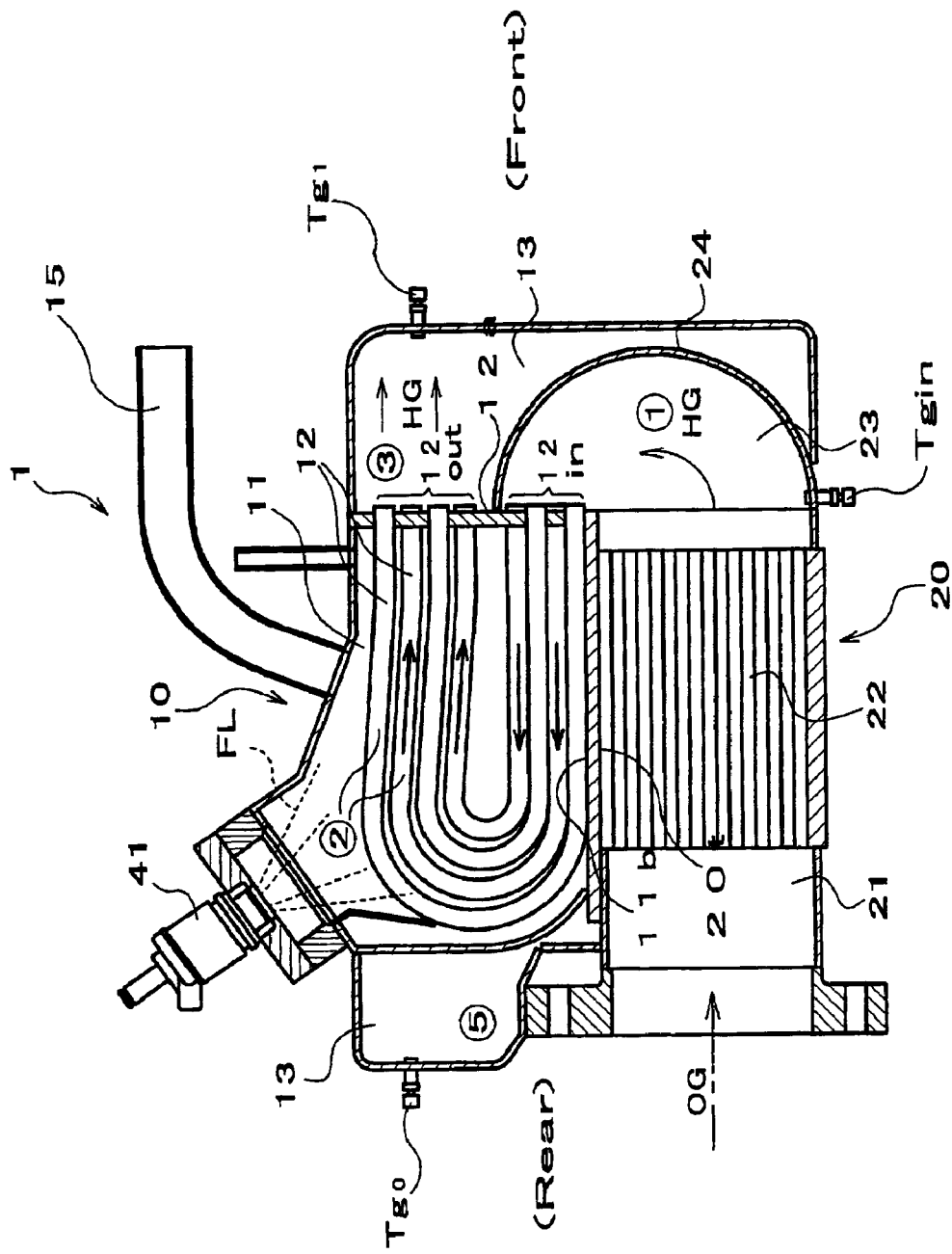
FIG. 27 is a cross-sectional view taken along the line B—B of FIG. 25.
Figure 28:
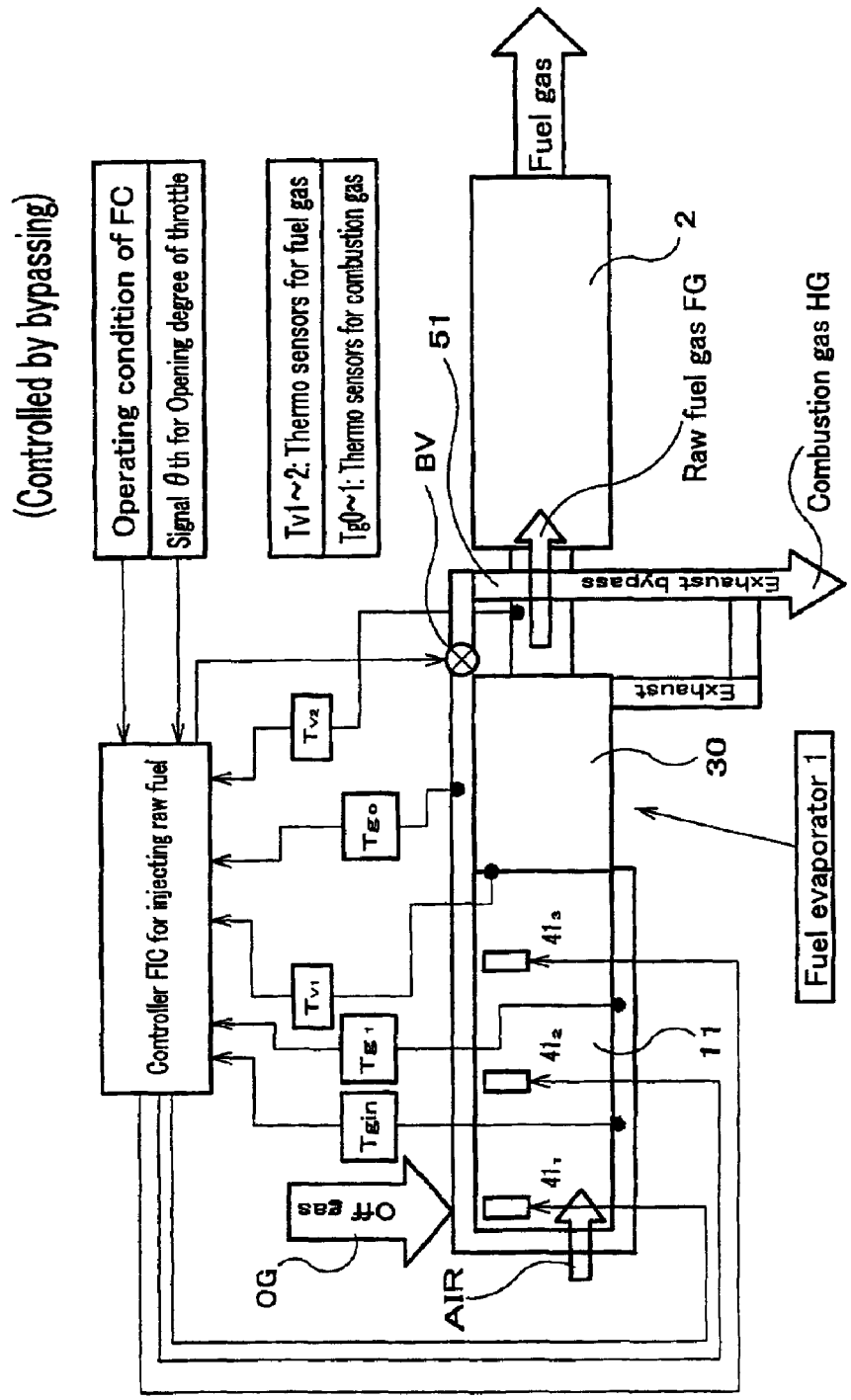
FIG. 28 is a block diagram showing the control system of the fuel evaporator according to the fifth embodiment of the present invention.

FIG. 25 is a partial cutaway plane view of the fuel evaporator according to the fifth embodiment of the present invention. FIG. 26 is a cross-sectional view taken along the line A—A of FIG. 25. FIG. 27 is a cross-sectional view taken along the line B—B of FIG. 25. FIG. 28 is a block diagram showing the control system of the fuel evaporator according to the fifth embodiment of the present invention.

[Fuel Cell System]

The fuel cell system according to the second embodiment is the same as that according to the first embodiment, and the description thereof will be omitted.

[Fuel Evaporator]

The fuel evaporator 1 according to this embodiment will now be described [see FIGS. 25–27]. The fuel evaporator 1 according to the fifth embodiment comprises a body 10 of the fuel evaporator which evaporates a raw liquid fuel FL to generate a raw fuel gas FG, a catalytic combustor 20 which generates a combustion gas HG serving as a high temperature thermal medium, a chamber 30 for controlling the temperature of the raw fuel gas, and a raw fuel gas injection apparatus 40 which injects the raw liquid fuel FL.

With regard to the schematic positions of them, the body 10 of the fuel evaporator is placed on the upper portion of the catalytic combustor 20, the temperature control chamber 30 is placed on one side of the body 10 of the fuel evaporator, and the raw liquid fuel injection apparatus 40 is placed on the upper portion of the body 10 of the fuel evaporator.

The fuel evaporator 1 according to the fifth embodiment possesses a bypass channel 51, which withdraws the combustion gas (high temperature thermal medium) introduced into the temperature control chamber 30 and bypasses it without passing through the temperature control chamber 30, a bypass valve BV, and a controller FIC for controlling the opening degree of the bypass valve V.

(1) Body of Fuel Evaporator

As shown in FIG. 26 or such, the body 10 of the fuel evaporator possesses a boxy evaporation chamber 11 having a plurality of U-shaped tubes 12 for thermal medium. The evaporation chamber 11 evaporates the raw liquid fuel FL injected from the raw liquid fuel injection apparatus 40 by means of the combustion gas HG, which serves as the high temperature thermal medium, to bring about the raw fuel gas FG.

As shown in FIG. 26, the thermal medium tubes 12 in the evaporation chamber 11 are placed so that the distances between the respective thermal medium tubes 12 become wider toward the upper direction and they become narrower toward the lower direction (i.e., the thermal medium tubes become denser as they are further from the injector 41), in order to widespread the raw liquid fuel FL injected from the injector 41 among every portions of the evaporation chamber 11 including the portion far from the injector 41. Also, by such a configuration, the generation of big film boiling such as the film boiling spread between the thermal medium tubes 12 can be reduced (i.e., the distances between the thermal medium tubes 12 at the portion near the injector 41 are widened to prevent greatly grow in the portions where the film boiling occurs), to thereby secure the passages of the raw liquid fuel FL and the raw fuel gas FG. By placing the thermal medium tubes 12 at the lower portion of the evaporation chamber 11 in a dense manner, and by strongly heating the lower portion of the evaporation chamber 11, the liquid residence on the lower portion of the first evaporator chamber 11 can also be prevented (the generation of the liquid residence on the lower portion of the evaporation chamber 11 is also prevented by increasing the heat mass at the lower portion of the evaporation chamber 11).

As shown in FIG. 26, the cross-section of the lower surface 11 of the evaporation chamber 11 is configured into a wave form to meet the shape (placements) of the thermal medium tubes 12 residing at the lower portion amongst them, so as to minimize the space between the thermal medium tubes 12 and the lower portion of the evaporation chamber as low as possible not so as to generate any large liquid residence. However, there are some gaps between the lower surface 11b of the evaporation chamber 11 and the thermal medium tubes 12 for residing at the lower portion not so as to come in contact with each other due to the vibration etc.

As shown in FIG. 27, the front side of the evaporation chamber 11 (on the basis of the fuel evaporator 1) is blocked with a supporting plate 12a to hold the thermal medium tubes 12 not so as to mix the combustion gas HG with the raw fuel gas FG. Both ends of the thermal medium tube 12 are opened, and the combustion gas HG enters into the thermal medium tube 12 from the lower end of the thermal medium tube 12 (inlet $12_{in}$ of the thermal medium tube), while existing from the upper end of the thermal medium tube 12 (outlet $12_{out}$ of the thermal medium tube). From the outlet $12_{out}$ of the thermal medium tube, a combustion gas passage 13, which will be described later on, is started. Here, with regard to the positions such as front, side, and rear sides, they are based on the fuel evaporator 1 (and so forth).

The upper side of the thermal medium tube 12 is slanted as described above so as to descend towards the end thereof. The reason why the thermal medium tube 12 has a slant is that in the case where the raw liquid fuel FL is adhered on the upper side of the thermal medium tube 12A in the form of droplets, the droplets thus adhered allow for moving towards the supporting plate 12a to thereby evaporate the droplets due to the heat possessed by the supporting plate 12a.

The upper side of the thermal medium tube 12 is slanted so as to descend towards the end thereof. The reason why the thermal medium tube 12 has a slant is that in the case where the raw liquid fuel FL is adhered on the upper side of the thermal medium tube 12 in the form of droplets, the droplets thus adhered allows for moving towards the supporting plate 12a to thereby evaporate the droplets due to the heat possessed by the supporting plate 12a.

While the body 10 of the fuel evaporator evaporates the raw liquid fuel FL within the evaporation chamber 11 to generate the raw fuel gas FG, the generated raw fuel gas FG is passed through a ventilation means 14 possessed by the outlet of the evaporation chamber 11 to be introduced into the temperature control chamber 30 (see FIG. 26). The ventilation means 14 is composed of a punched plate having many small pores etc. so that the droplets of the raw liquid fuel FL such as fly droplets do not directly enter in the temperature control chamber 30.

The fuel evaporator 1 according to the fifth embodiment possesses a combustion gas passage 13 also severing as keeping the evaporation chamber 11 warm. The combustion gas passage 13 is started at the tube outlet $12_{out}$ of the evaporation chamber 11 and the front surface, the side surfaces and the rear surface of the evaporation chamber to reach the temperature control chamber 30 (shell inlet $32_{in}$. The combustion gas passage 13 has a configuration where t totally covers a diaphragm 24 of the catalytic combustor 20 and a side surface 20s of the catalytic combustor 20.

The member represented by the symbol 15 in FIG. 25 is an air inlet, which introduces air (oxygen) required for the reformation (partial oxidation) into the reformer 2 at the stage of generating the raw fuel gas FG in the fuel evaporator 1 in order to mix the air with the raw fuel gas FG. By mixing the air with the raw fuel gas FG, the reaction in the reformer 2 takes place smoothly. This function is the same as that of the first embodiment.

(2) Catalytic Combustor

The catalytic combustor 20 according to the fifth embodiment of the present invention is in a box form similar to the case of the evaporation chamber 11, and has a catalytic layer 22 comprising a catalyst in the shape of a honeycomb accommodated therewith. The catalytic combustor 20 combusts the off gas OG from the fuel cell 5, which is the gas to be combusted, i.e., a mixed gas comprising hydrogen and oxygen. The combusted gas HG generated due to the catalytic combustion of the off gas OG is used as a high temperature thermal medium in the evaporation of the raw liquid fuel FL in the evaporation chamber, keeping the temperature of the evaporation chamber 11 warm, and controlling the temperature of the temperature control chamber 30.

Due to catalytic combustion in the interior thereof, the catalytic combustor 20 itself is kept at a high temperature. In this embodiment, since the catalytic combustor 20 itself makes a use of the heat generated, the catalytic combustor 20 is placed so that the upper surface thereof (the upper surface 20t of the catalytic combustor) is in contact with the lower surface 11b of the evaporation chamber 11. By such a contact, the heat generated in the catalytic combustor 20 is transmitted to the lower surface 11b of the evaporation chamber in a thermal conductive manner, making it possible to effectively use the heat generated in the catalytic combustor 20.

The lower surface 11b of the evaporation chamber is a place in which the liquid residence is generated. Accordingly, strong heating of the lower surface 11b of the evaporation chamber by manes of the catalytic combustor 20 can prevent the generation of the liquid residence and can be intended to rapidly evaporate the liquid residence, if it occurs. Such a configuration can be intended to effectively utilize the exhaust heat. It may be configured that the upper surface 20t of the catalytic combustor also severs as the lower surface 11b of the evaporation chamber 11; that an electric heater is intervened between the upper surface 20t of the catalytic combustor and the lower surface 11b of the evaporation chamber 11; or that the upper surface 20t of the catalytic combustor and the lower surface 11b of the evaporation chamber 11 are placed at a several distance so that the heat generated in the catalytic combustor 20 is transmitted to the evaporation chamber 11 due to the radiation and the convection of the generated heat.

With the catalytic combustor 20 is equipped a diaphragm 24 having a semicircular cross-section, which introduce the raw fuel gas HG from the exit 23 of the catalytic combustor into the tube inlet $12_{in}$ in the evaporation chamber 11. This diaphragm 23 forbids the combustion gas HF at the exist 23 of the catalytic combustor (tube inlet $12_{in}$) and the combustion gas HG at the tube outlet $12_{out}$ to be mixed with each other. With regard to the materials for the catalytic combustor 20 and the catalytic layer (honeycomb material), stainless steel (e.g., SUS316), which withstands a high temperature and which has corrosion resistance, is suitable.

(3) Temperature Control Chamber

The temperature control chamber 30 is placed at the downstream of the exit of the evaporation chamber 11, projecting from one side of the body 10 of the fuel evaporator. As shown in FIG. 26, the temperature control chamber 30 is a shell and tube type heat exchanger. The raw fuel gas flows in at the side of the thermal medium tubes of the temperature control chamber 30 (the raw fuel gas FG is introduced into the tube 31 from a tube inlet $31_{in}$, and discharged from a tube outlet $31_{out}$). The combustion gas HG flows in at the side of the shell 32 (the combustion gas HG is introduced in the shell 32 from the shell inlet $32_{in}$ and discharged from the shell outlet $32_{out}$). The temperature control chamber 30 dissociates the temperature unevenness of the raw fuel gas FG generated in the evaporation chamber 11. At the same time, the temperature control chamber 30 also plays a role in superheating the raw fuel gas FG, which will be condensed, to dry vapor, preventing the raw fuel gas FG from being condensed. In this embodiment, the combustion gas HG, which has heated the evaporation chamber 11, is introduced into the temperature control chamber 30. The temperature control camber 30 according to the fifth embodiment also has a similar configuration as that of the temperature control chamber 30 in the fuel evaporation 1 according to the first embodiment.

(4) Bypass

The bypass channel 51 is a bypass channel for the combustion gas HG, which is breached at the shell inlet $32_{in}$ of the temperature control chamber 30, bypasses the shell 32, and is jointed to the shell outlet $32_{out}$ (See FIGS. 25 and 28). The bypass valve BV in the fifth embodiment is a butterfly valve actuated by a stepping motor. A controller FIC for controlling the injection of the raw liquid fuel, which will be described later on, serves as the bypass controller, and controls the opening degree of the bypass valve BV.

By such a configuration, the amount of the combustion gas HG supplied to the temperature control chamber 30 is varied to thereby control the temperature of the raw fuel gas FG.

After the flow direction of the combustion gas is turned 90° (after the flow of the combustion gas HG becomes parallel to the flow of the combustion gas HG flowing through the thermal medium tube 12), the combustion gas HG straightly enters in the shell inlet $32_{in}$ and flows within the shell 32. The bypass channel 51 is connected to the combustion gas passage in such a manner that the combustion gas HG passing through the combustion gas passage 13 flows straightly.

(5) Raw Fuel Gas Injector

The raw fuel gas injection apparatus 40 is an injection apparatus having a single fluid nozzle and injects the raw fuel gas FG into the evaporation chamber 11. The raw fuel gas injection apparatus 40 comprises injectors 41 for injecting the raw fuel gas FL and a tube 42 for supplying the raw liquid fuel FL, and is provided on the upper surface 11t of the evaporation chamber. In this embodiment, three injectors 41 ($41_1$, $41_2$, and $41_3$) are provided on the evaporation chamber 11. In order to effectively utilize the thermal capacity possessed by the high temperature combustion gas HG, the raw liquid fuel FL is mainly injected to the direction along the plurality of the thermal medium tubes 12 provided within the evaporation chamber 11 (the direction toward the supporting plate 12a of the thermal medium tubes 12).

The raw liquid fuel FL injected from the injector $41_1$ is directionally injected so as to mainly evaporate the raw liquid fuel FL at the left side of the evaporation chamber 11, the raw liquid fuel FL injected from the injector $41_2$ is directionally injected so as to mainly evaporate the raw liquid fuel FL at the center of the evaporation chamber 11, and the raw liquid fuel FL injected from the injector $41_3$ is directionally injected so as to mainly evaporate the raw liquid fuel FL at the right side of the evaporation chamber 11 (see FIG. 25). Specifically, the portion where no raw liquid fuel FL is injected is in so-called empty heating.

(6) Thermo Sensor/Controller for Injecting Raw Liquid Fuel

By referring to FIGS. 25 to 28, a thermo sensor, which measures the temperature within the fuel evaporator and a controller for injecting the raw liquid fuel, which actuates receiving the temperature signals from the thermo sensor, etc., will now be described.

A thermo sensor $Tg_{in}$ is provided at the outlet 21 of the catalytic combustor; a thermo sensor $Tg_1$ is provided at the outlet portion of the thermal medium tube 12A at the front of the evaporation chamber 11 (the initiation portion of the combustion gas channel 3); and a thermo sensor $Tg_0$ is provided at the shell inlet $32_{in}$ of the temperature control chamber 30, and these thermo sensors detect the temperatures of the combustion gas HG at the portions where they are provided. The detected temperature signals are transferred to a controller FIC for injecting the raw liquid fuel.

A thermo sensor $Tv_1$ is provided at the outlet of the evaporation chamber 11 (the tube inlet $31_{in}$ of the temperature control chamber 30); and a thermo sensor $Tv_2$ is provided at the tube outlet $31_{out}$ of the temperature control chamber 30, and these thermo sensors detect the temperatures of the combustion gas HG at the portions where they are provided. The detected temperature signals are transferred to the controller FIC for injecting the raw liquid fuel.

The controller FIC for injecting the raw liquid fuel, which receives the temperature signals etc., has an injection amount controller which controls the amount of raw liquid fuel FL injected from the raw liquid fuel injection apparatus 40 and a selector which selects at least one injector to be used (actuated) among the three injectors $41_1$, $41_2$, and $41_2$.

(General Operation of Fuel Evaporator)

Next, the operation and functions of the fuel evaporator 1 according to the fifth embodiment will be described.

(1) Heating of Lower Surface of Fuel Evaporator

Into the catalytic combustor 20, the off gas OG from the fuel cell 5 is supplied, which is catalytically combusted to produce the combustion gas HG. Once the catalytic combustion is initiated, the temperature of the catalytic combustor 20 itself is also increased, and the external surface of the catalytic combustor 20 becomes high (about 300° C.). Here, the fuel evaporator 1 has the lower surface 11b of the fuel evaporation chamber 11 coming into contact with the upper surface 20t of the catalytic combustor. Consequently, the lower surface 11b of the evaporation chamber 11 (bed surface of the evaporation chamber 11) is heated to a high temperature by means of the catalytic combustor 20. As described above, by effectively utilizing the heat generated from the catalytic combustor 20, the generation of the liquid residence can be prevented, and the liquid residence, even if it occurs, can be rapidly evaporated.

(2) Flow of Combustion Gas

The symbols (P1) to (P7), utilized herein, indicate the flows of the combustion gas HG according to the symbols P1 to P7 described in FIGS. 25 to 27.

First, the combustion gas HG (P1) having a high temperature at from 650 to 700° C., produced by catalytically combusting the off gas by means of the catalytic combustor 20 enters from the tube inlet $12_{in}$ into the thermal medium tube 12, heats the evaporation chamber 11, and exits the thermal medium tube 12 from the tube outlet $12A_{out}$ (P2). At this time, the combustion gas HG transmits and evaporates the heat to the raw liquid fuel FL coming into contact with the thermal medium tube 12. The temperature of the combustion gas HG at the tube outlet $12A_{out}$ is approximately 350° C.

Next, the combustion gas HG enters in the first combustion passage 13, is passed through the front surface (P3) of the evaporation chamber 11, the side surface (P4) of the evaporation chamber 11 including the side surface 20s of the catalytic combustor, the rear surface (P5) of the evaporation chamber 11, and reaches the shell inlet $32_{in}$ (P6) of the temperature control chamber 30. During this course, the combustion gas HG mainly serves as keeping the temperature of the evaporation chamber 11 warm. The temperature of the combustion gas HG at the shell inlet $32_{in}$ (P6) of the temperature control chamber 30 is approximately 300° C.

The combustion gas HG after being passed through the shell 32 of the temperature control chamber 30 is discharged from an exhaust duct (P7). During this course, the combustion gas HG controls the temperature of the raw fuel gas FG.

In the case where part of the combustion gas HG is bypassed through the temperature control chamber, the part of the combustion gas HG is branched from the combustion gas passage 13 by means of the bypass valve BV to enter in the bypass channel (P8). The combustion gas HG entering in the bypass channel is then jointed to the combustion gas HG having being passed through the shell 32 of the temperature control chamber 30 at the downstream of the temperature control chamber 30 (See FIG. 28).

As described above, by passing the combustion gas HG through the interior of the fuel evaporator 1, the evaporation of the raw liquid fuel FL is further accelerated, which allows for the fuel evaporator excelling in good response. This also allows for raid warming up. Furthermore, the amount of the combustion gas bypassed is adjusted to control the heat value imparted to the raw fuel gas HG, whereby the temperature of the raw fuel gas FG is positively controlled.

(3) Flows of Fuel Liquid and Raw Fuel Gas

The raw liquid fuel FL stored in a raw liquid fuel tank T (storage tank for water/methanol mixture) is pumped and injected into the evaporation chamber 11 by means of the injectors 41 ($41_1$, $41_2$, and $41_3$) of the raw liquid fuel injection apparatus 40. In the fifth embodiment, there provided three injectors 41 of raw liquid fuel injection apparatus 40 on the evaporation chamber 11, so that the raw liquid fuel can be injected from a desired injector 41x to the target evaporation chamber 11. By using a specific injector(s) 41 selected among the injectors, the temperature of the raw fuel gas FG can be controlled. The details will be described later on in the column of "Specific control of the raw liquid fuel injector".

The raw liquid fuel, injected from the injector(s) 40 of the raw liquid fuel injection apparatus 40 into the evaporation chamber 40, is rapidly evaporated to be the raw fuel gas FG. In the case where the raw liquid fuel FL is injected sharply in a large amount, with regard to the raw liquid fuel FG remaining un-evaporated, (1) due to heat-exchange with the evaporated raw fuel gas, the temperature of the remaining raw liquid fuel FG is increased during the course of being dropped to the lower portion of the evaporation chamber 11 (part of the remaining raw liquid fuel is evaporated); (2) if the remaining raw liquid fuel FL is dropped on the thermal medium tube 12 residing at the lower portion, it is evaporated due to the heat on the surface of the thermal medium tube 12; and (3) the raw liquid fuel finally remaining unevaporated, which reaches the lower surface 11b of the evaporation chamber, is evaporated without bringing about the liquid residence, because the lower surface 11b of the evaporation chamber is heated by the catalytic combustor 20 or such to a high temperature.

Also, (4) since the body 10 of the fuel evaporator (evaporation chamber 11) is heated and kept warm by the combustion gas passage 13, the evaporation of the raw liquid fuel FL is further accelerated, making it difficult to bring about the liquid residence.

Specifically, in such a type of the conventional fuel evaporator, respective surfaces of the evaporation chamber are only heated by the evaporated raw fuel gas and/or the heat conducted or transferred from thermal medium tubes. Consequently, in the conventional fuel evaporator, the raw liquid fuel FL adhered on the side surface is difficult to be evaporated and has a tendency to be condensed (i.e., tendency to generate the liquid residence.)

In contrast, according to the fuel evaporator 1 of this embodiment, which has a configuration that a plurality of the surfaces of the evaporation chamber 11 are heated and kept warm by means of the combustion gas HG and the catalytic combustor 20, the generation of the liquid residence can be rapidly prevented (i.e., the fuel evaporator 1 of this embodiment has good response).

Also, since the thermal medium tubes 12 are placed so that sparser the distances between respective thermal medium tubes 12 are nearer the injectors $41_1$, $41_2$ and $41_3$, the fuel evaporator 1 according to this embodiment can evaporate the raw liquid fuel FL in a good manner. At the same time, according to the fuel evaporator of this embodiment, it is difficult to bring about the film boiling, which has a possibility to inhibit the flowing of the raw liquid fuel FL and the fuel gad FG, at any portions near the injectors $41_1$, $41_2$ and $41_3$ and, thus, the fuel evaporator 1 can effectively evaporate the raw liquid fuel FL in a good manner.

The raw fuel gas FG evaporated at the evaporation chamber 11 is passed through the ventilation means 14 such as perforation plate having many small pores, enters in the temperature control chamber 30, is passed through a vapor tube 31 to control the temperature thereof, and then is introduced into the reformer 2 as shown in FIG. 1. Bypassing the raw fuel gas FG through the temperature control chamber 30 as just mentioned, the uneven temperature of the raw fuel gas FG can be solved.

[Specific Control of the Raw Liquid Fuel Injector]

Next, specific descriptions will be described for the control of the fuel evaporator according to the fifth embodiment, particularly for the control of the temperature of the raw liquid fuel at the outlet of the evaporation chamber (the outlet of the fuel evaporator) by switching the position where the raw liquid fuel is injected. The fuel evaporator described herein is accommodated within the fuel cell system and is carried on a vehicle (an electric vehicle carrying a fuel cell).

Figure 29:
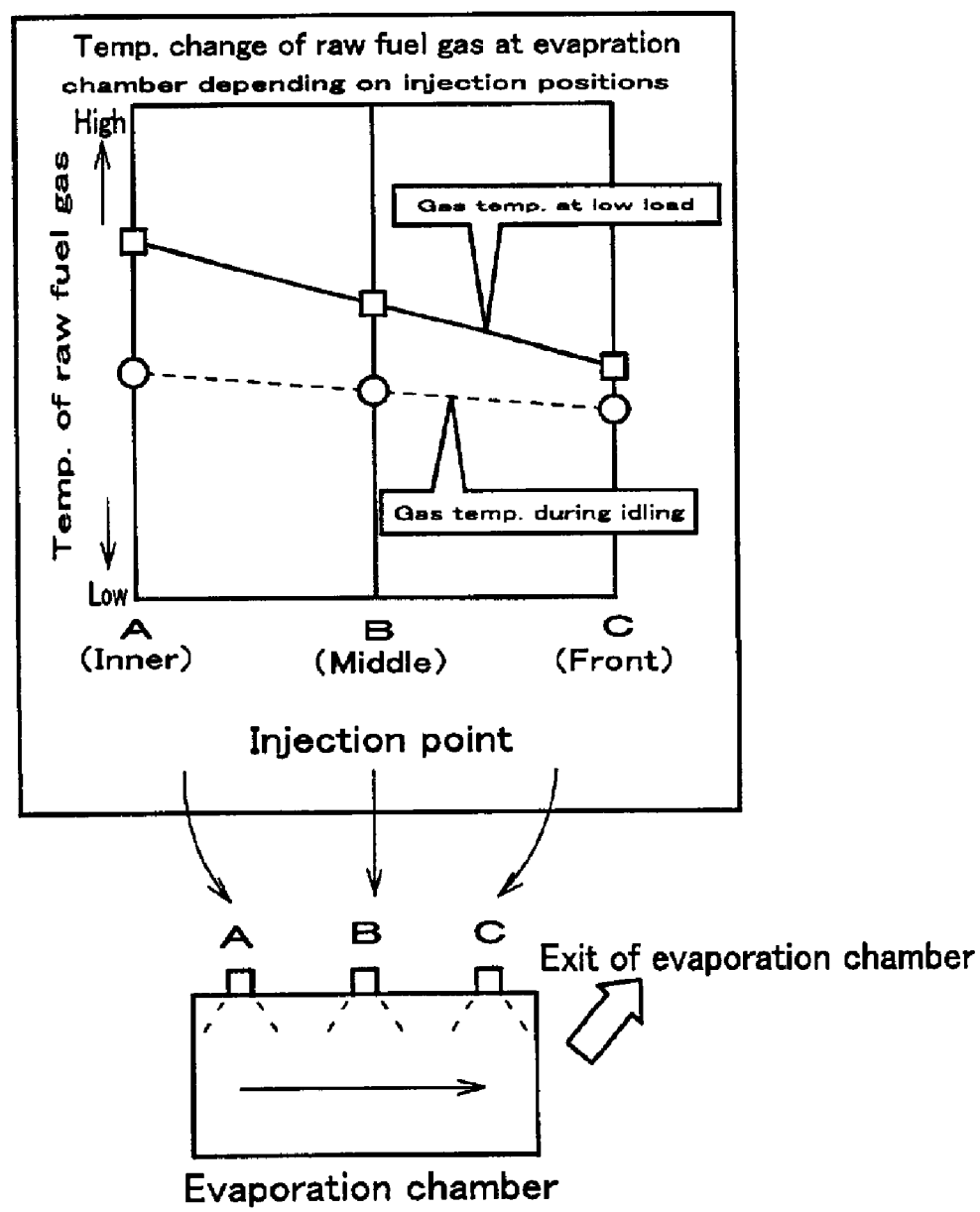
FIG. 29 is a drawing showing the relation between the position of injection of the raw liquid fuel in an evaporation chamber and the temperature of the raw fuel gas at the outlet of the evaporation chamber.
Figure 31:
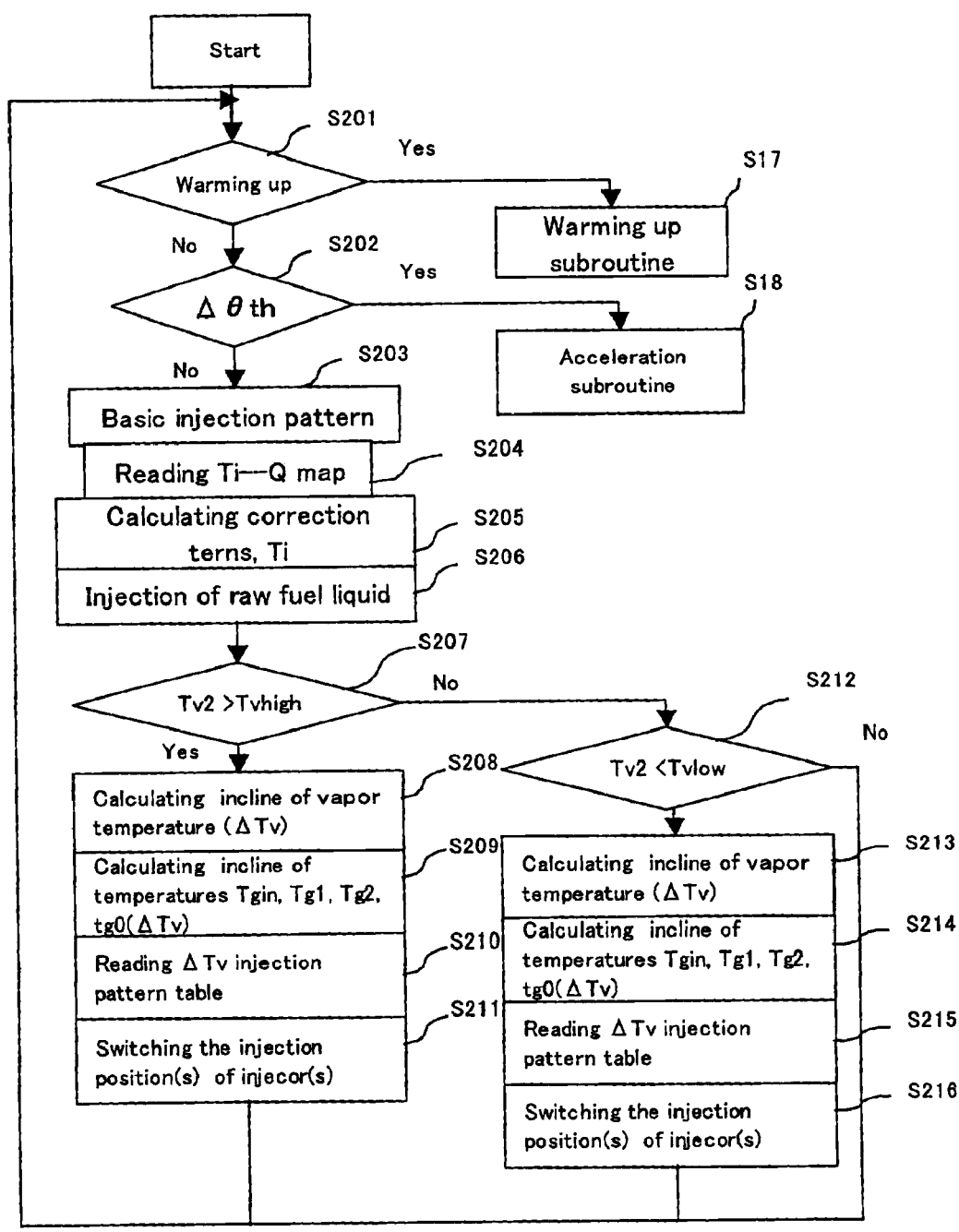
FIG. 31 is a flowchart showing the control of the fuel evaporator according to the fifth embodiment of the present invention at a stationary state.
Figure 32:
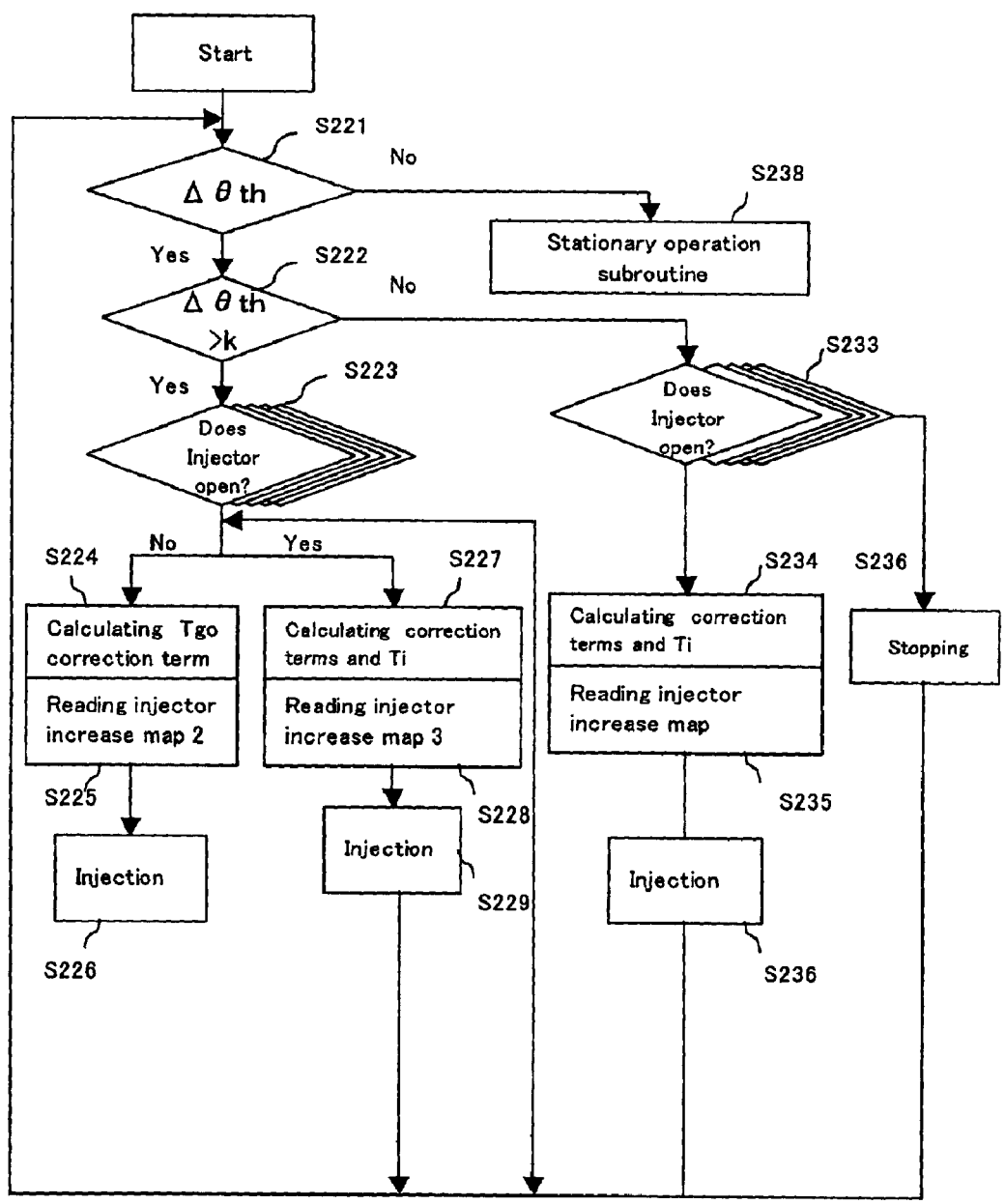
FIG. 32 is a flowchart showing the control of the fuel evaporator according to the fifth embodiment of the present invention at an accelerated state.
Figure 33:
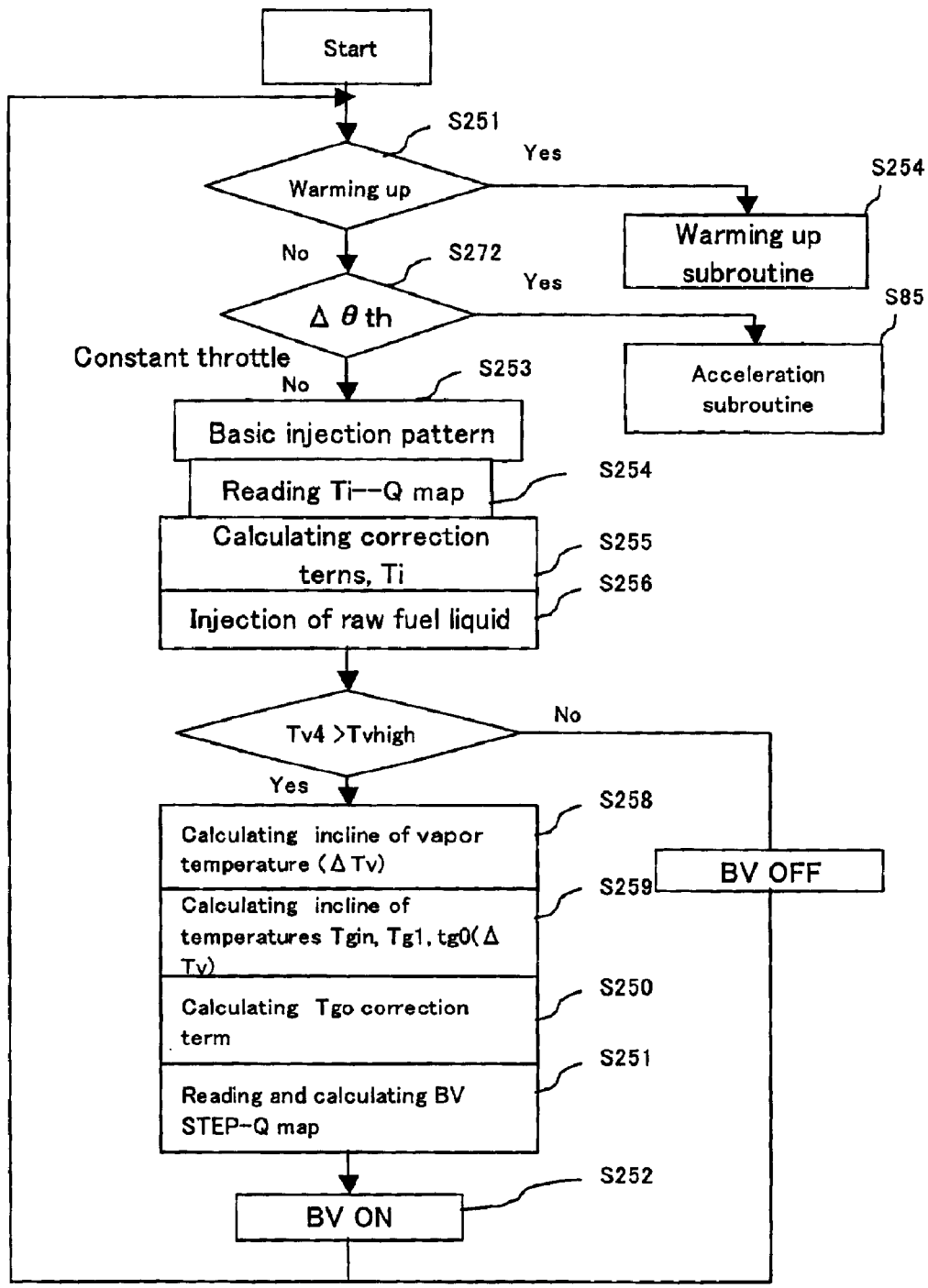
FIG. 33 is a flowchart showing the control where the temperature of the raw fuel gas is controlled by bypassing the combustion gas of the fuel evaporator according to the fifth embodiment of the present invention.

FIG. 29 is a drawing showing the relation between the position of injecting the raw liquid fuel in an evaporation chamber and the gas temperature at the outlet of the evaporation chamber. FIG. 30(a) is a drawing which explains an aimed temperature range and a tolerance temperature range of the raw fuel gas, and FIG. 30(b) shows a basic injection pattern at a stationary state. FIG. 31 is a flowchart showing the control of the fuel evaporator according to the fifth embodiment of the present invention at a stationary state. FIG. 32 is a flowchart showing the control of the fuel evaporator according to the fifth embodiment of the present invention at an accelerated state. FIG. 33 is a drawing showing the relation between the operation power and the temperature of the raw fuel gas in the fuel cell system using the fuel evaporator according to the fifth embodiment of the present invention.

(1) Relation Between the Position of the Raw Liquid Fuel Injector and the Temperature of the Raw Fuel Gas As shown in FIG. 29, the temperature of the raw fuel gas became the highest when the raw fuel gas was injected from the injector A, positioned at the innermost of the evaporation chamber both at the time of idling and under a low load. Also, the temperature of the raw fuel gas became the lowest when the raw fuel gas was injected from the injector C, positioned at the portion nearest the evaporation chamber both at the time of idling and under a low load (the same injection amount). Furthermore, the temperature of the raw fuel gas was between the temperatures of the raw fuel gas injected from the injectors A and C, when the raw fuel gas was injected from the injector B, positioned at the center of the evaporation chamber both at the time of idling and under a low load (the same injection amount).

From these results, similar to the case of the first embodiment, it can be understood that in the fuel evaporator 1 according to fifth embodiment, the temperature of the raw fuel gas at the outlet of the evaporation chamber can be increased by selecting the positions of the injector for injecting the raw fuel gas to inject the raw fuel gas from the injector positioned at the innermost of the evaporation chamber. On the other hand, it is also proven that the temperature of the raw fuel gas at the outlet of the evaporation chamber can be decreased by injecting the raw fuel gas from the injector positioned at the portion nearest the evaporation chamber. By dealing with the change in the amount of the heat value applied to the raw liquid fuel or the raw fuel gas according to the change of the position to be injected, the following temperature control is carried out in this embodiment.

(2) Temperature Control of Raw Fuel Gas Depending Upon Position where Raw Fuel Gas is Injected (Stationary State)

First, the temperature control of raw fuel gas at the outlet of the evaporation chamber depending upon position where raw fuel gas is injected will be described by referring to FIGS. 30 and 31.

FIG. 30(a) is a drawing which explains an operation power of the fuel cell and an aimed temperature range of the raw fuel gas. In this figure, $Tv_{max}$ is the upper limit of the tolerance temperature range and $Tv_{min}$ is the lower limit of the tolerance temperature range. Also, in this figure, $Tv_{high}$ is the upper limit of the aimed temperature range, and $Tv_{low}$ is the lower limit of the aimed temperature range. By keeping the temperature of the raw fuel gas FG within this aimed temperature range, FCS can be driven under good conditions.

FIG. 30(b) shows a basic injection pattern of the injector. This basic injection pattern shows the injection pattern of the raw fuel gas at a stationary state (different from the first embodiment, the number of the injector is three in this embodiment).

Specifically, (1) at the time of idling (idle) where the operation power of the fuel cell is the lowest, only a small amount of the raw fuel gas FG is required. Consequently, the raw liquid fuel FL is injected from the injector $41_2$, positioned at the side near the outlet of the evaporation chamber 11.

(2) In the situation where the operation power of the fuel cell 5 is somewhat higher than that at the time of idling, the amount of the raw fuel gas FG is required to be somewhat increased to increase a heat value. Consequently, in this case, the raw liquid fuel FL is also injected from the injector $41_2$, positioned at the middle of the evaporation chamber 11.

(3) In the situation where the operation power of the fuel cell 5 is further higher, the amount of the raw fuel gas FG is further increased to apply a larger heat value. Consequently, the injection of the raw liquid fuel FL from the injector $41_2$ is stopped, and alternatively the raw liquid fuel FL is injected from injector $41_1$, which can generate the raw fuel gas FG at the highest temperature and which is posited at the innermost of the evaporation chamber 11. In this case, although the number of the injectors 41 which inject the raw liquid fuel is the same as that in the case of situation (2), i.e., two injectors, the injection amount of the raw liquid fuel FL in the case of (3) is larger than that in the case of (2), by setting a pulse control signal which controls the period of opening and closing the injectors 41.

(4) In the situation of wide-opening the throttle (WOT), the operation power of the fuel cell 5 becomes highest. In this case, the raw liquid fuel FL is injected from all of three injectors $41_1$, $41_2$, and $41_3$ of the evaporation chamber 11.

By injecting the raw liquid fuel FL into the evaporation chamber 11 in the manner as described above, the raw fuel gas FG can be generated at the optimal temperature in an adequate amount in any situations from at the time of idling through at the time of wide-opening the throttle (stationary state).

By referring to the flowchart shown in FIG. 31, the temperature control of the raw fuel gas depending upon the position of injecting the raw liquid fuel will now be described (stationary state). This flowchart assumes the case of carrying the fuel cell system FCS on a vehicle.

The symbols $Tv_1$ and $Tv_2$ used in the following description do not mean the temperature sensors for the raw fuel gas but mean the temperatures of the raw fuel gas detected by the temperature sensors. Similarly, the symbols $Tg_{in}$, $Tg_1$, and $Tg_0$ also do not mean the temperature sensors but means the temperatures of the raw fuel gas detected by the temperature sensors.

First, the controller judges whether or not the fuel evaporator is warming up (S201). If the fuel evaporator is warming up, warming up is carried out through a warming up subroutine (S217). Subsequently, the controller judges whether or not there is a change in the opening degree of the throttle (Δθth) (S202). If the change in the opening degree of the throttle (Δθth) exists, the acceleration is carried out by acceleration subroutine (S218). The acceleration subroutine carries out the injection of raw liquid fuel FL during the course of the acceleration (during the transition).

If the controller judges that no change in opening degree of the throttle (Δθth) exists in S202, injectors 41 are selected based on the basic injection pattern (see FIG. 30(b)), by referring to the speed of the vehicle, the opening degree of the throttle (θth) and the like (S203). A Ti-Q map is read, and the injection time Ti of raw liquid fuel FL (injection amount Q of the raw liquid fuel) is temporarily assumed (S204). Then, the correction based on various correction terms such as charge into the battery, actuations of accessories, etc., and the injection time Ti of the raw liquid fuel is determined by calculation (S205). Based on the basic injection pattern selected in Step S203 and the injection time Ti determined in Step S205, the fuel is injected from the injectors 41 (S206).

For example, in the case where the throttle (θth) is somewhat opened, the injector $41_3$ and the injector $41_2$ are selected (S203), the injection time Ti is then calculated (S204 and S205) and the like, the injector $41_3$ and the injector $41_2$ are controlled to actuate for the calculated period (S206).

Subsequently, the temperature $Tv_2$ of the raw fuel gas at the tube outlet $31_{out}$ of the temperature control chamber 30 is compared with the upper limit $Tv_{high}$ of the aimed temperature range shown in FIG. 8(a) (S207). If the temperature $Tv_2$ of the raw fuel gas is higher, the temperature of the raw fuel gas FL is treated to be decreased. Specifically, the temperature inclines of the temperatures $Tv_1$ and $Tv_2$ of the raw fuel gas at the measuring points are calculated (S208). Also, the temperature inclines of the temperatures $Tg_{in}$, $Tg_1$, and $Tg_0$ of the combustion gas (temperature inclines between $Tg_{in}$ and $Tg_1$; $Tg_1$ and $Tg_0$) at the respective measuring points are calculated (S209). Based on these temperature inclines, prescribed $\Delta Tv$-injection pattern table is read (S210). Subsequently, the positions of the injectors 41 are switched on the basis of the $\Delta Tv$-injection pattern table.

Specifically, for example, in the case where the raw liquid fuel FL is injected from the injectors $41A_1$, $41A_2$, and $41A_3$, if $Tv_2$ becomes higher than $Tv_{high}$ ($Tv_2 > Tv_{high}$), the $\Delta Tv$-injection pattern table is given so as to switch the injection from the injector $41A_1$ to the injection from the injector $41_3$.

With series of treatments, the temperature ($Tv_2$) of the raw fuel gas is decreased to fall within the aimed temperature range.

On the other hand, if Step S207 judges that the temperature ($Tv_2$) of the raw fuel gas is lower than the upper limit $Tv_{high}$ of the aimed temperature range, the temperature ($Tv_2$) of the raw fuel gas is compared with the lower limit $Tv_{min}$ of the aimed temperature range (S212). If the temperature ($Tv_2$) of the raw fuel gas is higher than the lower limit $Tv_{min}$ of the aimed temperature range, the temperature ($Tv_2$) of the raw fuel gas is within the optimal range, being returned to the initial step. Conversely, if the temperature ($Tv_2$) of the raw fuel gas is lower than the lower limit $Tv_{min}$ of the aimed temperature range, the temperature ($Tv_2$) of the raw fuel gas should be increased. Specifically, the temperature incline of the temperatures $Tv_1$, and $Tv_2$ of the raw fuel gas at the respective measuring points is calculated (S213). Also, the temperature inclines of the temperatures $Tg_{in}$, $Tg_1$, , and $Tg_0$ of the combustion gas (temperature inclines between $Tg_{in}$ and $Tg_1$; $Tg_1$ and $Tg_0$) at the measuring points are calculated (S214). Based on these temperature inclines, prescribed $\Delta Tv$-injection pattern table is read (S215). Subsequently, the positions of the injectors 41 are switched on the basis of the $\Delta Tv$-injection pattern table.

Specifically, for example, in the case where the raw liquid fuel FL is injected from the injectors $41_3$, if $Tv_2$ becomes lower than $Tv_{low}$ ($Tv_2 < Tv_{low}$), the $\Delta Tv$-injection pattern table is given so as to switch the injection from the injector $41_3$ to the injection from the injector $41_1$.

With series of treatments, the temperature ($Tv_2$) of the raw fuel gas is increased to fall within the aimed temperature range.

With these treatments, the temperature of the raw fuel gas FG, particularly under the stationary states, can fall within the adequate temperature range, irrelevant to the amount of generating the raw fuel gas FG (operation power of the fuel cell 5).

(3) Securing of the Amount of Generating Raw Fuel Gas at the Time of Acceleration By referring to the flowchart shown in FIG. 32, the control for securing the amount of generating raw fuel gas at the time of acceleration (during the transition) will now be described. This flowchart also assumes the case in which the fuel cell system FCS is carried on the vehicle.

First, the controller judges whether or not there is a change in the opening degree of the throttle ($\Delta \theta th$) (S221). If the controller judges that no change in opening degree of the throttle ($\Delta \theta th$) exists, the stationary drive routine is carried out (S238, see FIG. 31). If the change in the opening degree of the throttle ($\Delta \theta th$) exists, the controller judges whether or not the amount of the change in the opening degree of the throttle ($\Delta \theta th$) is larger than the predetermined amount (S222). In the case where amount of the change in the opening degree of the throttle ($\Delta \theta th$) is larger than the predetermined amount ($\Delta \theta th > k$), i.e., at the time of acceleration by middle-opening the throttle or wide-opening the throttle, the controller judges whether or not respective injectors 41 are stopped (S223).

With regard to the injector 41 or the injectors 41, which is/are actuated, the injection time Ti of the raw liquid fuel FL is calculated from the respective correction terms (S224), an injector increase map 2 is read to determine the injection amount (injection time) (S225), and the injection amount from the corresponding injector 41 is increased.

On the other hand, with regard to the injector 41 or the injectors 41, which is/are stopped, the injection time Ti of the raw liquid fuel FL is calculated from the respective correction terms (S227), an injector increase map 3 is read to determine the injection amount (injection time) (S228), the injector 41 or the injectors 41, which is/are not actuated, is/are actuated to inject the raw liquid fuel FL (S229).

This makes it possible to deal with the requirement for increasing the amount of the raw fuel gas FG at the transition time of acceleration by middle-opening the throttle or wide opening the throttle.

In Step S222, in the case where the change in the opening degree of the throttle ($\Delta \theta th$) is not more than the predetermined level ($\Delta \theta th <= k$), i.e., when the requirement of the vehicle for the acceleration is weak, the controller judges whether or not the injector(s) 41 is/are actuated (make(s) an injection) (S233). An injector 41 which is not injecting the raw liquid fuel FL, remains stopping, and an injector 41, which is now injecting the raw liquid fuel FL, is used to meet the requirement. Specifically, the injector 41 which is not injecting the raw liquid fuel FL, remains stopping (S237).

With regard to the actuating injector(s) 41, the injection time Ti is calculated on the basis of the respective correction terms (S234), the liquid FL is injected on the basis of a map 1 for increasing the injection amount from the injector (S235), to deal with the requirement increasing the raw fuel gas FG for the slight acceleration.

As described above, by starting the actuation of the stopped injector 41, and increasing the amount of the raw liquid fuel FL injected from the actuating injector(s), the requirement for increasing the amount of the raw fuel gas FG in the slight acceleration can be dealt. Specifically, at the time of the acceleration, the heat value to meet the injection amount of the raw liquid fuel is not immediately supplied to the evaporation chamber in the conventional manner, but the time-lag occurs in the supply of the heat value as a rule, resulting in the situation where the conventional fuel evaporator cannot be dealt with the requirement for increasing the amount of the raw fuel gas. In contrast, as in the case of this embodiment, by injecting the raw liquid fuel FL to the portions which does not directly contribute to the evaporation of the raw liquid fuel FL (so-called empty heated evaporation chamber 11 [such as the thermal medium tube 12]), due to the heat value (thermal mass) possessed by such portions like the thermal medium tube 12, the requirement increasing the amount of the raw fuel gas can be readily reposed.

(4) Control by Bypass

The temperature control by bypassing the combustion gas through the temperature control chamber 30 will now be described (at the stationary) (See FIG. 30).

FIG. 33 is a flowchart showing the control where the temperature of the raw fuel gas is controlled by bypassing the combustion gas of the fuel evaporator. This flowchart assumes the case of carrying the fuel cell system FCS on a vehicle.

First, the controller judges whether or not the fuel evaporator is warming up (S251). If the fuel evaporator is warming up, warming up is carried out through a warming up subroutine (S264). Subsequently, the controller judges whether or not there is a change in the opening degree of the throttle ($\Delta\theta$th). If the change in the opening degree of the throttle ($\Delta\theta$th) exists, the acceleration is carried out by acceleration subroutine (S265). The acceleration subroutine carries out the injection of raw liquid fuel FL during the course of the acceleration (during the transition).

If the controller judges that no change in opening degree of the throttle ($\Delta\theta$th) exists in Step S252, injectors 41 are selected based on the basic injection pattern (see FIG. 30(b)), by referring to the speed of the vehicle, the opening degree of the throttle ($\theta$th) and the like (S253). A Ti-Q map is read, and the injection time Ti of raw liquid fuel FL (injection amount Q of the raw liquid fuel) is temporarily assumed (S254). Then, the correction based on various correction terms such as charge into the battery, actuations of accessories, etc., and the injection time Ti of the raw liquid fuel is determined by calculation (S255). Based on the basic injection pattern selected in Step S253 and the injection time Ti determined in Step S255, the fuel is injected from the injectors 41 (S256).

For example, in the case where the throttle ($\theta$th) is somewhat opened, the injector $41_2$ and the injector $41A_3$ are selected, the injection time Ti is then calculated, and the injector $41_2$ and the injector $41A_3$ are controlled to actuate for the calculated period.

Subsequently, the temperature $Tv_2$ of the raw fuel gas at the tube outlet $31_{out}$ of the temperature control chamber 30 is compared with the upper limit $Tv_{high}$ of the aimed temperature range shown in FIG. 30(a) (S257). If the temperature $Tv_2$ of the raw fuel gas is higher, the temperature of the raw fuel gas FL is treated to be decreased. Specifically, the temperature incline of the temperatures $Tv_1$, and $Tv_2$ of the raw fuel gas at the respective measuring points is calculated (S258). Also, the temperature inclines of the temperatures $Tg_{in}$, $Tg_1$, and $Tg_0$ of the combustion gas (temperature inclines between $Tg_{in}$ and $Tg_1$; $Tg_2$ and $Tg_0$) at the respective measuring points are calculated (S259). Furthermore, the temperature $Tg_0$ of the combustion gas is detected and the calculation of the correction terms is carried out (S260). Based on the calculation, a STEP-Q map of the bypass valve BV is read and calculated to determine the opening degree (STEP) of the bypass valve BV (S261). Then, based on the determined opening degree, the bypass valve BV is turned on (S262). By the series of the operations, the amount of the combustion gas HG flowing at the side of the shell 30 in the temperature control chamber 30 is suppressed, whereby the heat value imparted to the raw fuel gas FG is decreased, and the temperature ($Tv_2$) of the raw fuel gas FG is decreased to be within the aimed temperature range.

On the other hand, in Step 257, if the temperature ($Tv_2$) of the raw fuel gas FG is judged to be lower than the upper limit $Tv_{high}$ of the aimed temperature range, the bypass valve BV is turned off to wide-open the valve (S263). This treatment suppresses the heat loss.

As described above, when the combustion gas serving as the heat source is withdrawn and bypasses the temperature control chamber, the temperature control of the raw fuel gas and the control of the amount of the raw fuel gas generated can be accurately carried out. Also, by selectively injecting the raw liquid fuel from three injectors within the evaporation chamber, the temperature and the amount of the raw fuel gas generated can be accurately controlled in much more suitable manner. Consequently, the fuel evaporator according to this embodiment having good response can be utilized as the fuel evaporator used under the condition where extremely large variation in the load.

Figure 34:
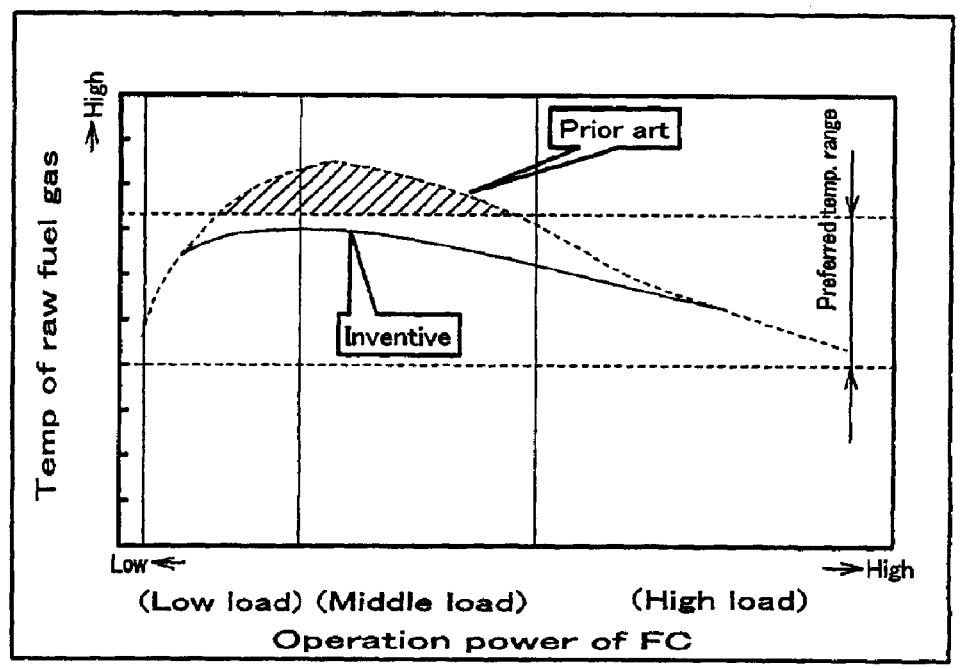
FIG. 34 is a drawing showing the relation between the operation power and the temperature of the raw fuel gas in the fuel cell system using the fuel evaporator according to the fifth embodiment of the present invention.

FIG. 34 is a drawing showing the relation between the operation power and the temperature of the raw fuel gas in the fuel cell system using the fuel evaporator according to the fifth embodiment of the present invention.

The conventional fuel evaporator has been designated so that the temperature of the raw fuel gas (the temperature of the raw fuel gas at the outlet of the apparatus) falls within the suitable range when the operation power of the fuel cell is largely loaded. Consequently, in the case where a relatively low load is applied, which is at a low operation power, or where a middle load is applied, which is a middle operation power, there is a problem in that the temperature of the raw fuel gas (the temperature of the raw fuel gas at the outlet of the apparatus) becomes higher than the upper limit of the suitable temperature range.

However, according to the fifth embodiment of the present invention, a significant effect that the temperature of the raw fuel gas (the temperature of the raw fuel gas at the outlet of the apparatus) can fall within the suitable range over the entire load level of the operation power from a low load to a high load.

<<Sixth Embodiment>>

Next, the fuel evaporator according to the sixth embodiment of the present invention will now be described. The fuel evaporator according to the fifth embodiment allows for positive temperature control of the raw fuel gas by mixing with the combustion gas which is introduced into the temperature control chamber, air (diluted air) as a thermal medium having a temperature lower than this combustion gas.

With regard to the same members and elements as in those utilized in the fifth embodiment, descriptions will be made by referring to the drawings utilized in the first embodiments, or are omitted.

Figure 35:
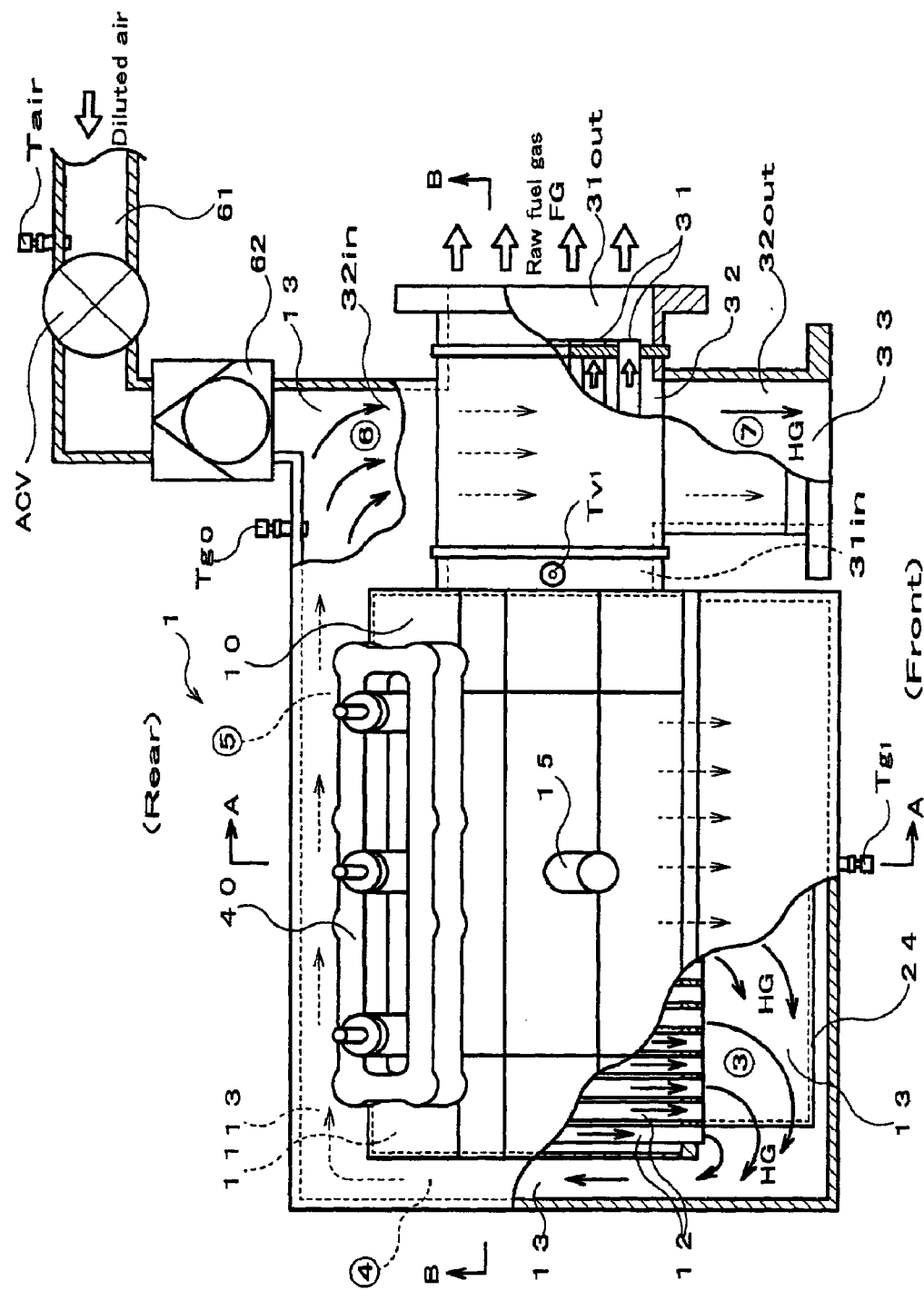
FIG. 35 is a partial cutaway plane view of the fuel evaporator according to the sixth embodiment of the present invention.
Figure 36:
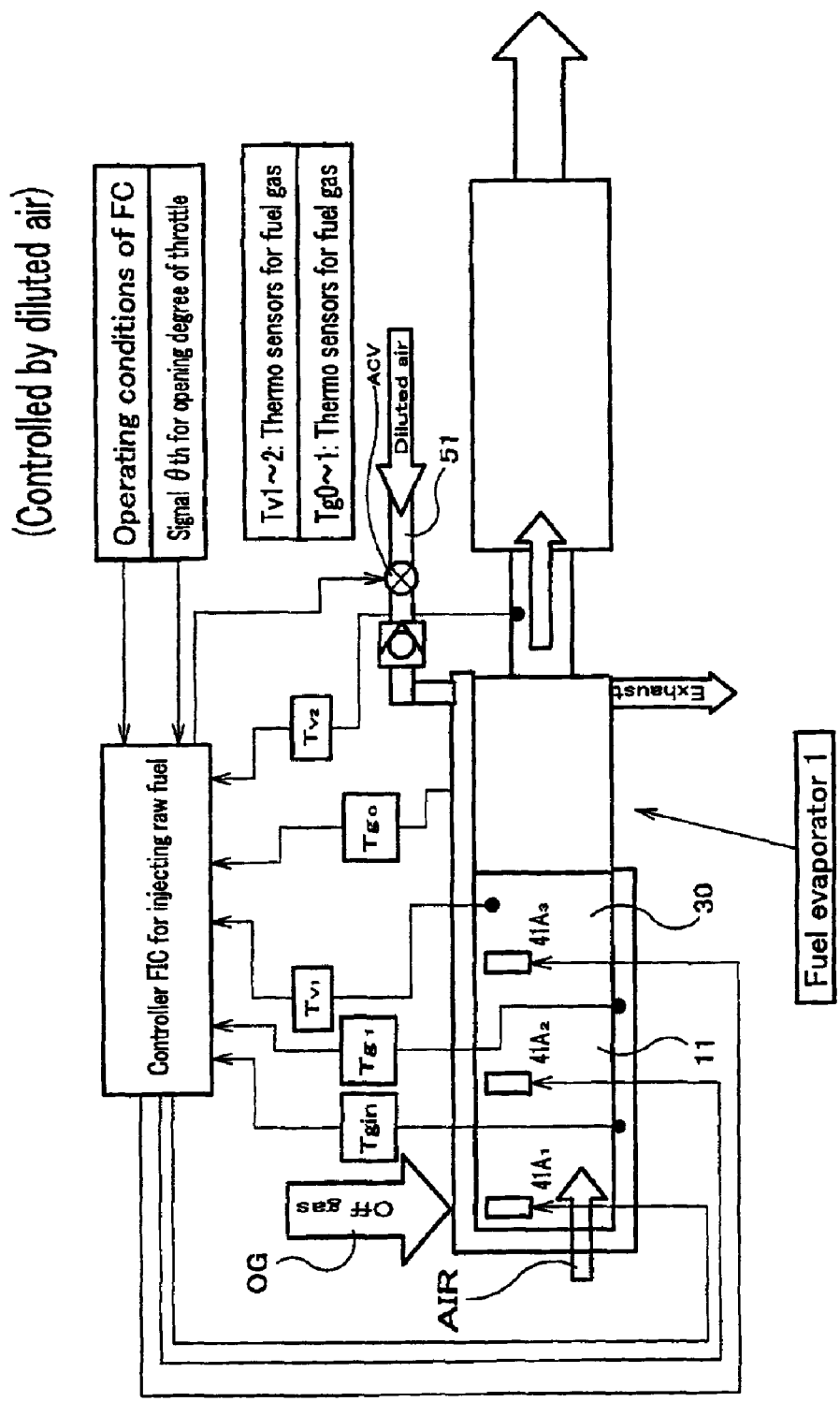
FIG. 36 is a block diagram showing the control system of the fuel evaporator according to the sixth embodiment of the present invention.

FIG. 35 is a partial cutaway plane view of the fuel evaporator according to the sixth embodiment of the present invention. FIG. 36 is a block diagram showing the control system of the fuel evaporator according to the sixth embodiment of the present invention.

[Fuel Cell System]

The fuel cell system according to the sixth embodiment is the same as that according to the fifth embodiment, and the description thereof will be omitted.

[Fuel Evaporator]

The fuel evaporator according to the sixth embodiment has all of the configurations possessed by the fuel evaporator according to the fifth embodiment, except for the configuration for bypassing the combustion gas (bypass valve, bypass channel, bypass controller). In addition, the fuel evaporator according to the sixth embodiment possesses an inlet for diluted air (inlet for low temperature thermal medium), which mixes diluted air with the combustion gas to be introduced into the temperature control chamber, a diluted air passage (low temperature thermal medium passage), a valve for supplying the diluted air (valve for supplying the low temperature thermal medium), and a controller for the valve for supplying the diluted air (valve for supplying the low temperature thermal medium), which controls the opening degree of the valve for supplying the diluted air.

The air compressor 4 shown in FIG. 1 serves as the inlet for the diluted air. More specifically, the diluted air is the air supplied from the compressor 4. A diluted air supply passage 51 is a piping, which connects the air compressor 4 with the shell inlet $32_{in}$ of the temperature control chamber 30, and a raw fuel injection apparatus 40. The temperature of the diluted air is approximately from 10 to 70° C.

A diluted air supply valve ACV according to the second embodiment is a butterfly valve actuated by a stepping motor. The controller FIC for injecting the raw liquid fuel serves as a controller for the valve for supplying the diluted air to control the diluted air supply valve ACV. In FIG. 35, the symbol 62 stands for a check valve, and the symbol $T_{air}$ represents a thermo sensor which detects the temperature of the diluted air.

Utilizing such a configuration as described above, the temperature of the combustion gas HG supplied into the temperature control chamber 30 is varied whereby the temperature of the raw fuel gas FG is controlled.

(General Actuation of the Fuel Evaporator)

Among general control processes of the fuel evaporator 1 according to the sixth embodiment, the control (at stationary state) of the temperature of the raw fuel gas FG by mixing the diluted air with the combustion gas HG inherent to this embodiment will now be described. In the following description, the symbol $T_{air}$ does not represent a thermo sensor which detects the temperature of the diluted air, but represents the temperature of the diluted air detected by this thermo sensor.

Figure 37:
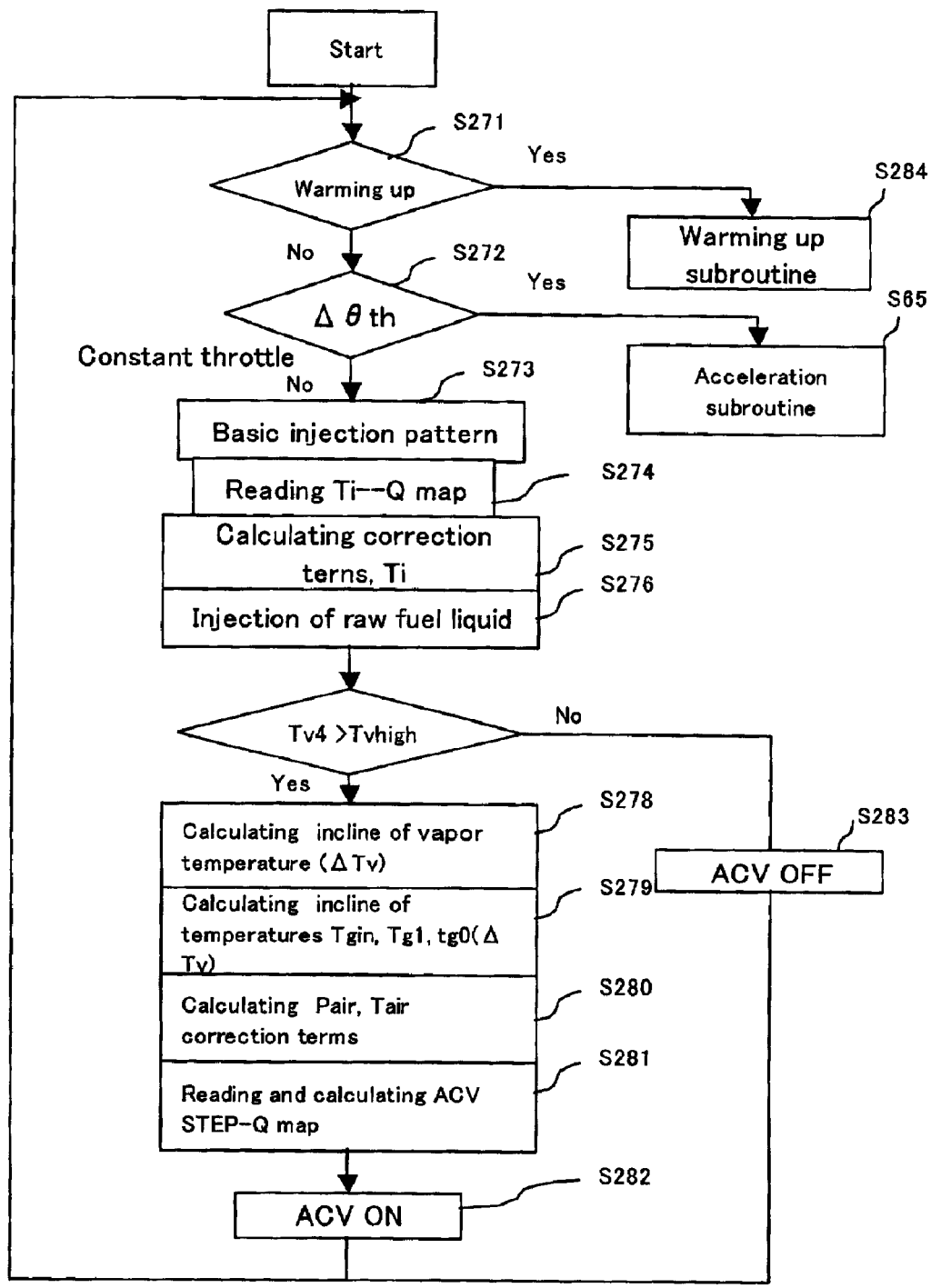
FIG. 37 is a flowchart showing the control where the temperature of the raw fuel gas is controlled by mixing a diluted air with the combustion gas of the fuel evaporator according to the fifth embodiment of the present invention.
Figure 38:
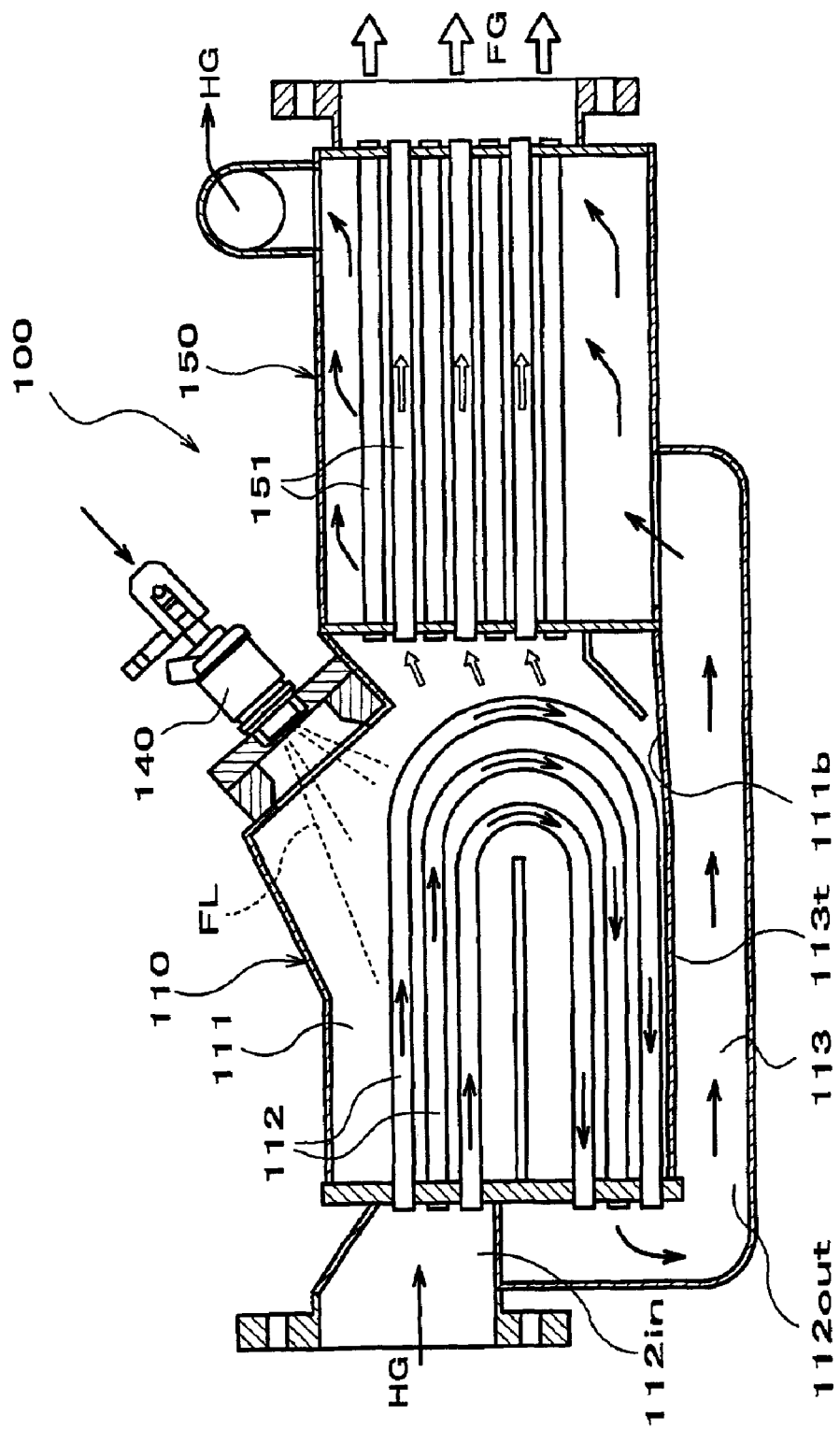
FIG. 38 is a cross-sectional view showing the conventional fuel evaporator.

FIG. 37 is a flowchart showing the control where the temperature of the raw fuel gas is controlled by mixing a diluted air with the combustion gas of the fuel evaporator according to the sixth embodiment of the present invention. This flowchart assumes the case in which the fuel cell system FCS is carried on the vehicle.

First, the controller judges whether or not the fuel evaporator is warming up (S271). If the fuel evaporator is warming up, warming up is carried out through a warming up subroutine (S284). Subsequently, the controller judges whether or not there is a change in the opening degree of the throttle (Δθth) (S272). If the change in the opening degree of the throttle (Δθth) exists, the acceleration is carried out by acceleration subroutine (S275). The acceleration subroutine carries out the injection of raw liquid fuel FL during the course of the acceleration (during the transition).

If the controller judges in Step 272 that no change in opening degree of the throttle (Δθth) exists, injectors 41 are selected based on the basic injection pattern (see FIG. 30(b)), by referring to the speed of the vehicle, the opening degree of the throttle (θth) (S273). A Ti-Q map is read, and the injection time Ti of raw liquid fuel FL (injection amount Q of the raw liquid fuel) is temporarily assumed (S274). Then, the correction based on various correction terms such as charge into the battery, actuations of accessories, etc., and the injection time Ti of the raw liquid fuel is determined by calculation (S275). Based on the basic injection pattern selected in Step S273 and the injection time Ti determined in Step S275, the fuel is injected from the injectors 41 (S276).

For example, in the case where the throttle (θth) is somewhat opened, the injector $41A_3$ and the injector $41A_2$ are selected, the injection time Ti is then calculated, the injector $41_2$ and the injector $41A_3$ are controlled to actuate for the calculated period.

Subsequently, the temperature $Tv_2$ of the raw fuel gas at the tube outlet $31_{out}$ of the temperature control chamber 30 is compared with the upper limit $Tv_{high}$ of the aimed temperature range shown in FIG. 30(a) (S277). If the temperature $Tv_2$ of the raw fuel gas is higher, the temperature of the raw fuel gas FL is treated to be decreased. Specifically, the temperature incline of the temperatures $Tv_1$, and $Tv_2$ of the raw fuel gas at the respective measuring points is calculated (S278). Also, the temperature inclines of the temperatures $Tg_{in}$, $Tg_1$, and $Tg_0$ of the combustion gas (temperature inclines between $Tg_{in}$ and $Tg_1$; $Tg_2$ and $Tg_0$) at the respective measuring points are calculated (S279). Furthermore, the controller detects the pressure $P_{air}$ and the temperature $T_{air}$ of the diluted air and, carries out the calculation of the correction terms (S280). Based on the calculation, STEP-Q map of the diluted air supply valve ACV is read and calculated to determine the opening degree (STEP) of the diluted air supply valve ACV (S271). Then, based on the determined opening degree, the diluted air supply valve ACV is turned on (S282). By the series of the operations, an adequate amount of the diluted air is supplied to the shell side 32 of the temperature control chamber 30 (to mix the combustion gas HG with the diluted air), whereby the temperature ($Tv_2$) of the raw fuel gas FG flowing in the side of the shell 32 is decreased to be within the aimed temperature range.

On the other hand, in Step 277, if the temperature ($Tv_2$) of the raw fuel gas FG is judged to be lower than the upper limit $Tv_{high}$ of the aimed temperature range, the diluted air supply valve ACV is turned off to wide-open the valve (S283). This treatment suppresses the heat loss.

As described above, when the diluted air is mixed with the combustion gas to be supplied into the temperature control chamber 30, the temperature of the raw fuel gas can be controlled similar to that of the fifth embodiment.

While the embodiments of the fuel evaporators according to the present invention have been described, the fuel evaporator according to the fourth embodiment is not restricted to these embodiments, and various modifications can be made.

For example, the combustion gas passages which are passages for the high temperature thermal medium may be provided on the upper surface of the evaporation chamber. By such a configuration, the escape of the heat from the upper surface of the evaporation chamber can be prevented. The catalytic combustor may be replaced by a combustion burner or an electric heater. As the high temperature thermal medium, the combustion gas whose heat is exchanged with air or a liquid, an air or a liquid heated by an electric heater may also be used. Also, the number of the injectors may be two or four or more.

For example, in the case where the heat value of the combustion gas is excess, part of the combustion gas is bypassed at the outlet of the catalytic combustor to be discharged. Conversely, in the case where the heat value of the combustion gas is lacking, auxiliary fuel such as methanol is electrically heated to be evaporated, and the evaporated auxiliary fuel is combusted in the catalytic combustor to increase the heat value of the combustion gas. The fuel cell is not restricted to a macromolecular type and may be a phosphoric acid type fuel cell (PAFC). Also, this embodiment may be performed irrelevant to the shape of the evaporation chamber. Moreover, various embodiments may be combined. Also, the fuel evaporator having the configuration in combination of the fifth embodiments with the sixth embodiment may be put into practical use.

What is claimed is:

1. A fuel evaporator composed of an evaporation chamber which evaporates a raw liquid fuel by a high temperature thermal medium to provide a raw fuel gas, said evaporation chamber comprising a plurality of evaporation chambers serially connected to each other in a ventilation manner, and at least one raw liquid fuel injector for injecting said raw liquid fuel being provided on each of said plurality of evaporation chambers.

2. The fuel evaporator according to claim 1, wherein a plurality of the raw liquid injector are provided on any one of said plurality of evaporation chambers.

3. The fuel evaporator according to claim 1, which further comprise a controller for said raw liquid fuel injector, which, upon receiving a signal for the requirement of said raw fuel gas, selects the raw liquid fuel injector or injectors from which the raw liquid fuel is injected.

4. The fuel evaporator according to claim 2, which further comprise a controller for said raw liquid fuel injector, which, upon receiving a signal for the requirement of said raw fuel gas, selects the raw liquid fuel injector or injectors from which the raw liquid fuel is injected.

5. The fuel evaporator according to claim 1, which has a heat receiving portion for receiving the heat from the heat source, which generates said high temperature thermal medium, provided near the bottom of one of said evaporation chamber, and has a slope downward to said heat receiving portion provided on the bottom of another evaporation chamber or chambers.

6. The fuel evaporator according to claim 2, which has a heat receiving portion for receiving the heat from the heat source, which generates said high temperature thermal medium, provided near the bottom of one of said evaporation chamber, and has a slope downward to said heat receiving portion provided on the bottom of another evaporation chamber or chambers.

7. The fuel evaporator according to claim 3, which has a heat receiving portion for receiving the heat from the heat source, which generates said high temperature thermal medium, provided near the bottom of one of said evaporation chamber, and has a slope downward to said heat receiving portion provided on the bottom of another evaporation chamber or chambers.

8. The fuel evaporator according to claim 5, wherein one of said evaporation chambers is formed so that the thermal conductive area thereof is larger than that or those of another evaporation chamber or chambers, and said heat receiving portion is provided on the bottom of said evaporation chamber having a larger thermal conductive area.

9. The fuel evaporator according to claim 6, wherein one of said evaporation chambers is formed so that the thermal conductive area thereof is larger than that or those of another evaporation chamber or chambers, and said heat receiving portion is provided on the bottom of said evaporation chamber having a larger thermal conductive area.

10. The fuel evaporator according to claim 7, wherein one of said evaporation chamber is formed so that the thermal conductive area thereof is larger than that or those of another evaporation chamber or chambers, and said evaporation chamber having a larger thermal conductive area has said heat receiving portion.

11. A fuel evaporator composed of an evaporation chamber which evaporates a raw liquid fuel by a high temperature thermal medium to provide a raw fuel gas, said evaporation chamber comprising a plurality of evaporation chambers serially connected to each other in a ventilation manner, a chamber for controlling a gas temperature, which controls the temperature of the raw fuel gas transferred from said evaporation chamber by means of heat-exchange with said high temperature thermal medium, and at least one raw liquid fuel injector for injecting said raw liquid fuel being provided on each of said plurality of evaporation chambers.

12. The fuel evaporator according to claim 11, which further comprises:

at least one thermo sensor, which detects the temperature within any of said evaporation chambers; and a controller for said raw liquid fuel injector, which, upon receiving a signal for the requirement of said raw fuel gas, selects the raw liquid fuel injector or injectors from which the raw liquid fuel is injected.

13. The fuel evaporator according to claim 11, which further comprises:

a low temperature thermal medium inlet, which mix the high temperature thermal medium introduced into said chamber for controlling the gas temperature with a low temperature thermal medium, a low temperature thermal medium passage, and a valve for supplying said low temperature thermal medium; and a controller which controls the opening degree of said valve for supplying said low temperature thermal medium.

14. The fuel evaporator according to claim 12, which further comprises:

a low temperature thermal medium inlet, which mix the high temperature thermal medium introduced into said chamber for controlling the gas temperature with a low temperature thermal medium, a low temperature thermal medium passage, and a valve for supplying said low temperature thermal medium; and a controller which controls the opening degree of said valve for supplying said low temperature thermal medium.

15. The fuel evaporator according to claim 11, which further comprises:

a bypass channel, which withdraws and bypasses the high temperature thermal medium to be introduced into said chamber for controlling the gas temperature, and a bypass valve; and a bypass controller which controls the opening degree of said bypass valve.

16. The fuel evaporator according to claim 12, which further comprises:

a bypass channel, which withdraws and bypasses the high temperature thermal medium to be introduced into said chamber for controlling the gas temperature, and a bypass valve; and a bypass controller which controls the opening degree of said bypass valve.

17. The fuel evaporator according to claim 13, which further comprises:

a bypass channel, which withdraws and bypasses the high temperature thermal medium to be introduced into said chamber for controlling the gas temperature, and a bypass valve; and a bypass controller which controls the opening degree of said bypass valve.

18. A fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature;

a bypass channel, which is communicated with said passage for the high temperature thermal medium, and which discharge said high temperature thermal medium bypassing said chamber for controlling the gas temperature, and a bypass valve; and a bypass controller which controls the opening degree of said bypass valve.

19. A fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature;

a passage for a low temperature thermal medium, which is connected to said passage for the high temperature thermal medium, and which mixes a low temperature thermal medium having a temperature lower than that of said high temperature thermal medium with said high temperature thermal medium, a low temperature thermal medium inlet and a valve for supplying said low temperature thermal medium; and a controller which controls the opening degree of said valve for supplying said low temperature thermal medium.

20. A fuel evaporator composed of an evaporation chamber which evaporates a raw liquid fuel by a high temperature thermal medium to provide a raw fuel gas, comprising a chamber for controlling a gas temperature, which is connected to said evaporation chamber and which controls the temperature of the raw fuel gas transferred from said evaporation chamber by means of heat-exchange with said high temperature thermal medium, a passage for a high temperature thermal medium, which is connected to one end of said evaporation chamber, and which introduces said high temperature thermal medium into said chamber for controlling the gas temperature;

a bypass channel, which is communicated with said passage for the high temperature thermal medium, and which discharge said high temperature thermal medium bypassing said chamber for controlling the gas temperature, and a bypass valve;

a bypass controller which controls the opening degree of said bypass valve;

a passage for a low temperature thermal medium, which is connected to said passage for the high temperature thermal medium, and which mixes a low temperature thermal medium having a temperature lower than that of said high temperature thermal medium with said high temperature thermal medium, a low temperature thermal medium inlet and a valve for supplying said low temperature thermal medium; and a controller which controls the opening degree of said valve for supplying said low temperature thermal medium.

21. A process for injecting a raw liquid fuel from a plurality of a raw liquid fuel injector provided on a fuel evaporator from the outlet of vapor to the inner part toward a plurality of heat sources provided the fuel evaporator from the outlet of vapor to the inner part to evaporate the raw liquid fuel; which comprises:

a step for injecting the raw liquid fuel from the raw liquid fuel injector or injectors near the outlet of the vapor, when a required amount of evaporating the raw liquid fuel is relatively small; and a step for injecting the raw liquid fuel from the liquid fuel injector or injectors far from the outlet of the vapor in addition to the injector or injectors near the outlet of the vapor, according to increase in the required amount of evaporating the raw liquid fuel.

22. A process for injecting a raw liquid fuel from a plurality of a raw liquid fuel injectors provided on a fuel evaporator from the outlet of vapor to the inner part toward a plurality of heat sources provided the fuel evaporator from the outlet of vapor to the inner part to evaporate the raw liquid fuel; which comprises:

setting at least one raw liquid fuel injector, which is not actuated at the stationary operation to set at least one corresponding empty burned heat source, while injecting the raw liquid fuel from other raw liquid fuel injector or injectors; and injecting the liquid fuel from said raw liquid fuel injector, which is not actuated at the stationary operation, in addition to the other raw liquid fuel injector or injectors.

* * * * *